US011879243B2

(12) United States Patent
Gupta et al.

(10) Patent No.: US 11,879,243 B2
(45) Date of Patent: Jan. 23, 2024

(54) BIDET WASHING APPARATUS WITH DISINFECTANT WASH FEATURE

(71) Applicant: 2 GO PRODUCTS, LLC, San Diego, CA (US)

(72) Inventors: Anjum Gupta, San Diego, CA (US); Theo Duffaut, San Diego, CA (US)

(73) Assignee: 2 Go Products, LLC, San Diego, CA (US)

( * ) Notice: Subject to any disclaimer, the term of this patent is extended or adjusted under 35 U.S.C. 154(b) by 0 days.

(21) Appl. No.: 17/863,198

(22) Filed: Jul. 12, 2022

(65) Prior Publication Data

US 2022/0341146 A1 Oct. 27, 2022

Related U.S. Application Data

(63) Continuation-in-part of application No. 17/738,469, filed on May 6, 2022, which is a continuation-in-part of application No. 17/555,879, filed on Dec. 20, 2021, which is a continuation-in-part of application No. 17/473,211, filed on Sep. 13, 2021, now abandoned, which is a continuation of application No. 16/567,107, filed on Sep. 11, 2019, now Pat. No. 11,155,987, which is a continuation-in-part of application No. 16/374,970, filed on Apr. 4, 2019, now Pat. No. 10,844,586, and a continuation of application No. 16/374,970, filed on Apr. 4, 2019, now Pat. No. 10,844,586.

(51) Int. Cl.

| | |
|---|---|
| ***E03D 9/08*** | (2006.01) |
| ***B05B 9/03*** | (2006.01) |
| ***B05B 15/55*** | (2018.01) |
| ***E03D 9/00*** | (2006.01) |

(52) U.S. Cl.

CPC .................. *E03D 9/08* (2013.01); *B05B 9/03* (2013.01); *B05B 15/55* (2018.02); *E03D 9/005* (2013.01)

(58) Field of Classification Search

CPC .. E03D 9/08; E03D 9/005; B05B 9/03; B05B 15/55; B05B 7/2464; B05B 7/2467; B05B 15/74; B05B 15/16

USPC .................................. 4/447–448, 443, 420.4

See application file for complete search history.

(56) References Cited

U.S. PATENT DOCUMENTS

| | | | | |
|---|---|---|---|---|
| 2020/0208390 | A1 * | 7/2020 | Liao | E03D 9/002 |
| 2020/0318335 | A1 * | 10/2020 | Gupta | B05B 9/03 |
| 2022/0039610 | A1 * | 2/2022 | Nowotarski | B05B 7/2464 |

(Continued)

FOREIGN PATENT DOCUMENTS

| | | | | |
|---|---|---|---|---|
| CN | WO-2013098817 A2 * | 4/2022 | | A47K 3/281 |
| WO | WO-2020088335 A1 * | 5/2020 | | A47K 3/281 |

*Primary Examiner* — Lori L Baker

(74) *Attorney, Agent, or Firm* — Edward D. Robinson

(57) ABSTRACT

A reservoir dispenser for a bidet washing apparatus includes a housing unit having at least one chamber, wherein the at least one chamber is capable of holding a liquid wash solution; a water inlet, a connecting tube, and a water outlet, wherein the water inlet, connecting tube and water outlet are in fluid communication, wherein the connecting tube is located between the water inlet and the water outlet, wherein the connecting tube includes a choke, and wherein the water inlet, connecting tube, and the water outlet are connectable to the housing unit; and a suction tube located between and in fluid communication with the at least one chamber and the choke.

40 Claims, 43 Drawing Sheets

(56) References Cited

U.S. PATENT DOCUMENTS

| | | | | |
|---|---|---|---|---|
| 2022/0162843 | A1* | 5/2022 | Gupta | B05B 9/03 |
| 2022/0274771 | A1* | 9/2022 | Sylvia | B05B 15/70 |
| 2022/0341146 | A1* | 10/2022 | Gupta | B05B 9/03 |
| 2023/0100608 | A1* | 3/2023 | Smith | E03D 9/08<br>4/448 |

* cited by examiner

BIDET WASHING APPARATUS WITH DISINFECTANT WASH FEATURE

CROSS-REFERENCE TO RELATED APPLICATIONS

This application is a continuation-in-part of and claims the benefit of priority under 37 USC § 120 to U.S. patent application Ser. No. 17/738,469, titled: "BIDET WASHING APPARATUS WITH DISINFECTANT WASH FEATURE," filed on May 6, 2022, which is a continuation-in-part of U.S. patent application Ser. No. 17/555,879, titled: "BIDET WASHING APPARATUS WITH DISINFECTANT WASH FEATURE," filed on Dec. 20, 2021, which is a continuation-in-part of U.S. patent application Ser. No. 17/473,211, titled: BIDET WASHING APPARATUS WITH DISINFECTANT WASH FEATURE," filed on Sep. 13, 2021, which is a continuation of and claims the benefit of priority to U.S. patent application Ser. No. 16/567,107, titled: BIDET WASHING APPARATUS WITH DISINFECTANT WASH FEATURE," filed on Sep. 11, 2019, now U.S. Pat. No. 11,155,987, which is a continuation-in-part of and claims the benefit of priority to U.S. patent application Ser. No. 16/374,970, titled: "BIDET WASHING APPARATUS WITH DISINFECTANT WASH FEATURE," filed on Apr. 4, 2019, now U.S. Pat. No. 10,844,586, the disclosure of each of which is hereby incorporated by reference in their entireties for all purposes.

FIELD OF THE INVENTION

The disclosure generally relates to a bidet washing apparatus, and more particularly to a bidet washing apparatus having a disinfectant wash feature that can store and dispense a cleaning disinfectant with a bidet washing stream.

BACKGROUND OF THE INVENTION

A bidet apparatus for washing and cleaning body parts were initially developed in the form of a bidet that provided a single spray of water and was permanently built into the toilet bowl. However, such bidets were expensive, and a new generation of bidets was developed that was attachable to the toilet and included a plurality of nozzles for multiple water sprays. Such bidets can be attached to the seat of an existing toilet bowl for washing the private parts of a person.

Various bidet designs have addressed some of the desired effects, such as washing, washing with temperature-regulated water, and drying, However, existing bidets tail to address all concerns related to the designs and functions in the general field of bidets. For example, pollution of the outer surface of the nozzles, the bidet, and the toilet during utilization is a common problem and causes aesthetic and hygienic issues. This is particularly important in bidets used, for example, by infirm or sick people who have to be especially cautious about maintaining hygiene and preventing infections.

Currently, there aren't any bidets that include a disinfectant wash feature. Many bidets have a feature to clean the nozzle of the bidet, however, cleaning the nozzle with water causes problems as it could leave behind hard water deposits and not provide adequate cleaning. Hard water deposits on the nozzle could affect the flow of the bidet as it blocks the nozzle holes and not adequately cleaning the bidet raises sanitary concerns. Consumers may also feel that normal water may not provide adequate washing of their body parts. Therefore, there remains a need to provide bidets with a disinfectant wash feature.

SUMMARY OF THE INVENTION

The disclosed embodiments are directed to solving one or more of the problems presented in the prior art, described above, as well as providing additional features that will become readily apparent by reference to the following detailed description when taken in conjunction with the accompanying drawings.

In an embodiment, the disclosure provides a reservoir dispenser for a bidet washing apparatus, which include a housing unit having at least one chamber, wherein the at least one chamber is capable of holding a liquid wash solution; a water inlet, a connecting tube, and a water outlet, wherein the water inlet, connecting tube and water outlet are in fluid communication, wherein the connecting tube is located between the water inlet and the water outlet, wherein the connecting tube includes a choke, and wherein the water inlet, connecting tube, and the water outlet are connectable to the housing unit; and a suction tube located between and in fluid communication with the at least one chamber and the choke.

In one aspect, the disclosure provides a reservoir dispenser, wherein the connecting tube is a linear connecting tube located between the water inlet and the water outlet.

In another aspect, the disclosure provides a reservoir dispenser, wherein the connecting tube is a non-linear connecting tube located between the water inlet and the water outlet.

In another aspect, the disclosure provides a reservoir dispenser, wherein the connecting tube is a circular connecting tube located between the water inlet and the water outlet.

In another aspect, the disclosure provides a reservoir dispenser, wherein the suction tube is vertically inclined or horizontally inclined relative to the choke.

In another aspect, the disclosure provides a reservoir dispenser, wherein a ratio of a constriction diameter of the choke to a general diameter of the connecting tube is from about 0.15 to about 0.70.

In another aspect, the disclosure provides a reservoir dispenser, wherein a length, and/or a constriction angle ($\alpha$), and/or a diffusion angle ($\beta$) of the choke can be modified to adjust how much reduced pressure is achieved in the choke.

In another aspect, the disclosure provides a reservoir dispenser, wherein when water flows through the choke, a resulting reduced pressure in the choke causes a liquid wash solution present in the at least one chamber to be pulled into the choke through the suction tube.

In another embodiment, the disclosure provides a reservoir dispenser for a bidet washing apparatus, which includes a housing unit having a first chamber and a second chamber, wherein the first chamber is capable of holding a liquid wash solution separate from the second chamber; a lid attachable to the first chamber; an activator, wherein the activator includes the lid and the first chamber; a water inlet, a connecting tube, and a water outlet, wherein the water inlet, connecting tube and water outlet are in fluid communication, wherein the connecting tube is located between the water inlet and the water outlet, wherein the connecting tube includes a choke, and wherein the water inlet, connecting tube, and the water outlet are connectable to the housing unit; a check valve located between the first chamber and the choke; and a suction tube located between the check valve and the choke.

In one aspect, the disclosure provides a reservoir dispenser, wherein the suction tube is vertically inclined relative to the choke.

In another aspect, the disclosure provides a reservoir dispenser, wherein the second chamber includes a piston, a spring, and a cylinder.

In another aspect, the disclosure provides a reservoir dispenser, wherein engaging or disengaging the activator causes the piston to go into or out of the cylinder and compresses or decompresses the spring, respectively.

In another aspect, the disclosure provides a reservoir dispenser, wherein the check valve is a spring-loaded check valve, a ball and seat check valve, a diaphragm check valve, an umbrella check valve, or a duckbill check valve.

In another aspect, the disclosure provides a reservoir dispenser, wherein the check valve includes: a check valve body; a T-bar shaped check valve disc, wherein the disc includes a proximal pole end and a distal bar end; and a check valve spring.

In another aspect, the disclosure provides a reservoir dispenser, which further includes at least one post located below the distal bar end of the T-bar shaped check valve disc.

In another aspect, the disclosure provides a reservoir dispenser, wherein the proximal pole end of the disc closes off the first chamber from the check valve when the activator is disengaged, and wherein the distal bar end of the disc engages with the at least one post and the proximal pole end of the disc opens the first chamber to check valve and suction tube when the activator is engaged.

In another aspect, the disclosure provides a reservoir dispenser, wherein engaging the activator allows transfer of the liquid wash solution from the first chamber through the check valve to the suction tube and choke.

In another aspect, the disclosure provides a reservoir dispenser, wherein disengaging the activator blocks transfer of the liquid wash solution from the first chamber to the check valve, suction tube and choke.

In another embodiment, the disclosure provides a reservoir dispenser for a bidet washing apparatus, which includes at least one chamber capable of holding a liquid wash solution; a lid attachable to the at least one chamber; an activator, wherein the activator includes a hollow closed ended upper tube, a hollow open ended lower tube that extends into the at least one chamber, and an outlet tube; a pump chamber, wherein the pump chamber connects the hollow closed ended upper tube and the hollow open ended lower tube; a housing unit, wherein the outlet tube is connectable to the housing unit; a water inlet, a connecting tube, and a water outlet, wherein the water inlet, connecting tube and water outlet are in fluid communication, wherein the connecting tube is a non-linear connecting tube located between the water inlet and the water outlet, wherein the connecting tube includes a choke, and wherein the water inlet, connecting tube, and the water outlet are connectable to the housing unit; a check valve located in the housing unit between the outlet tube and the choke; and a suction tube located between the check valve and the choke.

In one aspect, the disclosure provides a reservoir dispenser, wherein the pump chamber includes a spring and a ball located between the hollow closed ended upper tube and the hollow open ended lower tube, respectively.

In another aspect, the disclosure provides a reservoir dispenser, wherein the check valve includes: a check valve body; a check valve disc; and a check valve spring.

In another aspect, the disclosure provides a reservoir dispenser, wherein engaging the activator transfers the liquid wash solution from the pump chamber to the outlet tube, housing unit, check valve, suction tube and choke.

In another aspect, the disclosure provides a reservoir dispenser, wherein disengaging the activator blocks transfer of the liquid wash solution from the pump chamber to the outlet tube, housing unit, check valve, suction tube and choke.

In another embodiment, the disclosure provides a reservoir dispenser for a bidet washing apparatus, which includes a housing unit having at least one chamber, wherein the at least one chamber is capable of holding a liquid wash solution; a water inlet, a connecting tube, and a water outlet, wherein the water inlet, connecting tube and water outlet are in fluid communication, wherein the connecting tube is a non-linear connecting tube located between the water inlet and the water outlet, wherein the connecting tube includes a choke, and wherein the water inlet, connecting tube, and the water outlet are connectable to the housing unit; a lid attachable to the at least one chamber; an activator having a stem and a stem end; an activator guide surrounding the activator stem; a check valve located between the at least one chamber and the choke; and a suction tube located between the check valve and the choke.

In one aspect, the disclosure provides a reservoir dispenser, wherein the suction tube is horizontally inclined relative to the choke.

In another aspect, the disclosure provides a reservoir dispenser, wherein the connecting tube is a non-linear or circular connecting tube located between the water inlet and the water outlet.

In another aspect, the disclosure provides a reservoir dispenser, wherein the lid includes an opening therein, and the activator is within the opening of the lid.

In another aspect, the disclosure provides a reservoir dispenser, wherein the activator is a push-button, a twist-button, a pull up and push down button, a slide button, a plunger button, a lever, or a knob.

In another aspect, the disclosure provides a reservoir dispenser, wherein the check valve is a spring-loaded check valve, a ball and seat check valve, a diaphragm check valve, an umbrella check valve, or a duckbill check valve.

In another aspect, the disclosure provides a reservoir dispenser, wherein the activator guide includes an activator stopper and a spring, wherein the activator compresses and decompresses the spring against the activator stopper when engaging and disengaging the activator, respectively.

In another aspect, the disclosure provides a reservoir dispenser, wherein the check valve includes a check valve body a check valve disc having a proximal end and a distal end shaped piston; and a check valve spring.

In another aspect, the disclosure provides a reservoir dispenser, which further includes a cylinder, wherein the cylinder is located under the distal end shaped piston of the check valve disc, and wherein the piston slides into and out of the cylinder upon engaging and disengaging the activator, respectively.

In another aspect, the disclosure provides a reservoir dispenser, wherein engaging the activator allows transfer of the liquid wash solution from the at least one chamber through the check valve to the suction tube and choke.

In another aspect, the disclosure provides a reservoir dispenser, wherein disengaging the activator blocks transfer of the liquid wash solution from the at least one chamber to the check valve, suction tube and choke.

Further features and advantages of the disclosure, as well as the structure and operation of various embodiments of the disclosure, are described in detail below concerning the accompanying drawings.

BRIEF DESCRIPTION OF THE DRAWINGS

The disclosure, by one or more various embodiments, is described in detail concerning the following figures, The drawings are provided for purposes of illustration only and merely depict exemplary embodiments of the disclosure. These drawings are provided to facilitate the reader's understanding of the disclosure and should not be considered limiting the breadth, scope, or applicability of the disclosure. It should be noted that for clarity and ease of illustration these drawings are not necessarily made to scale.

Figure 14:
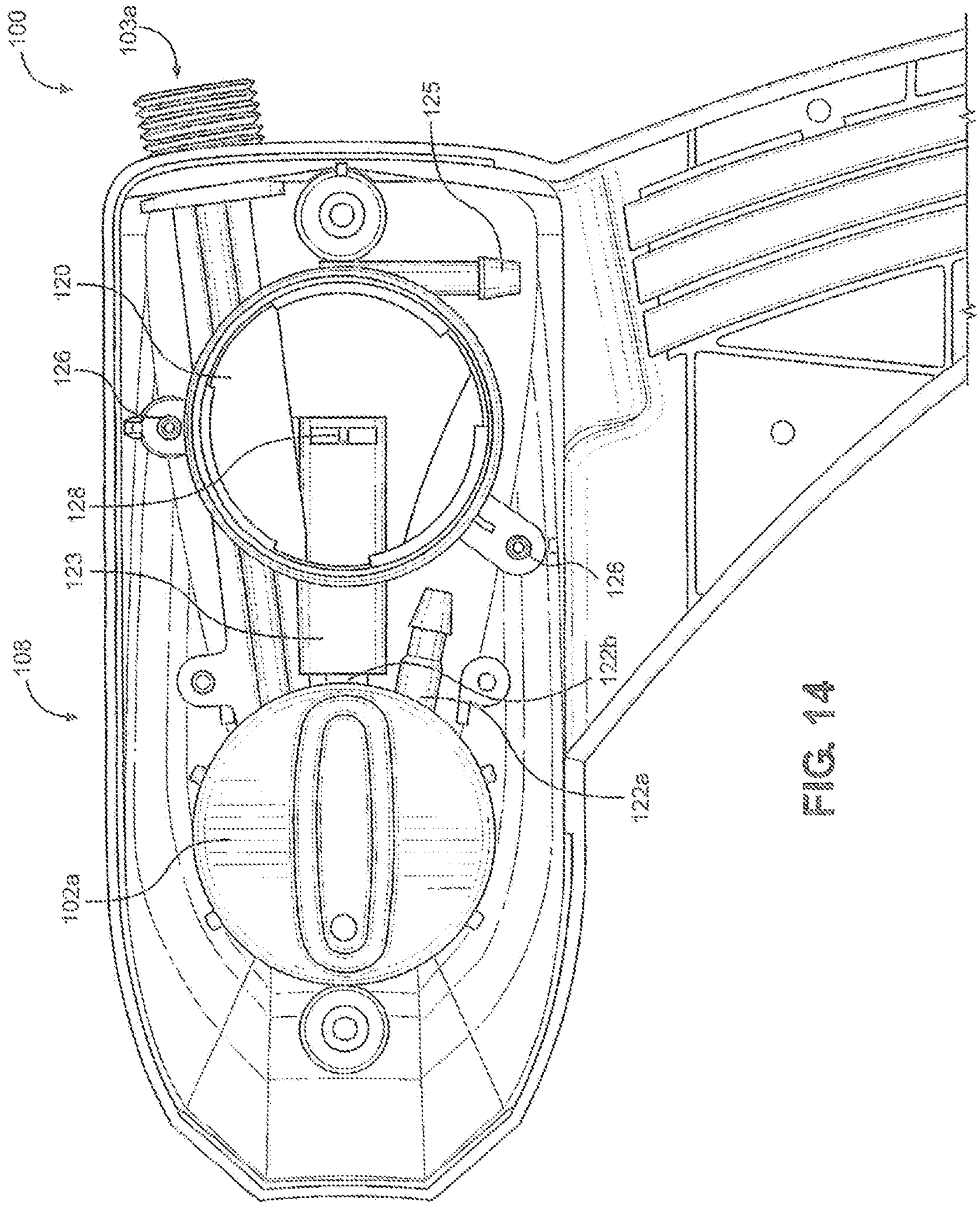
Figure 15:
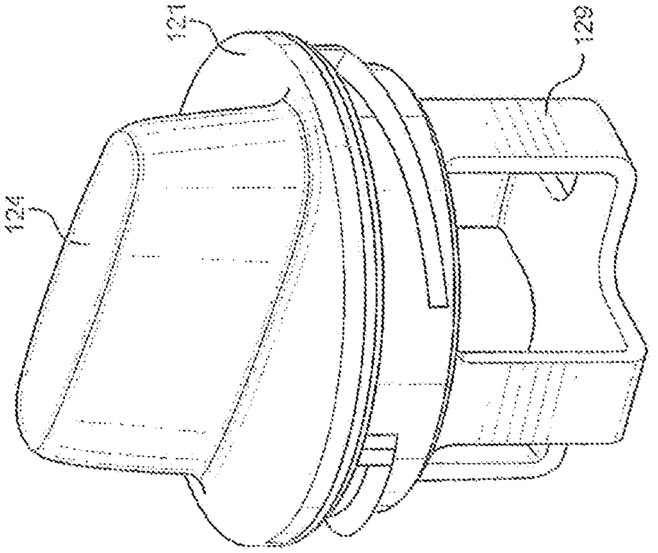
Figure 16:
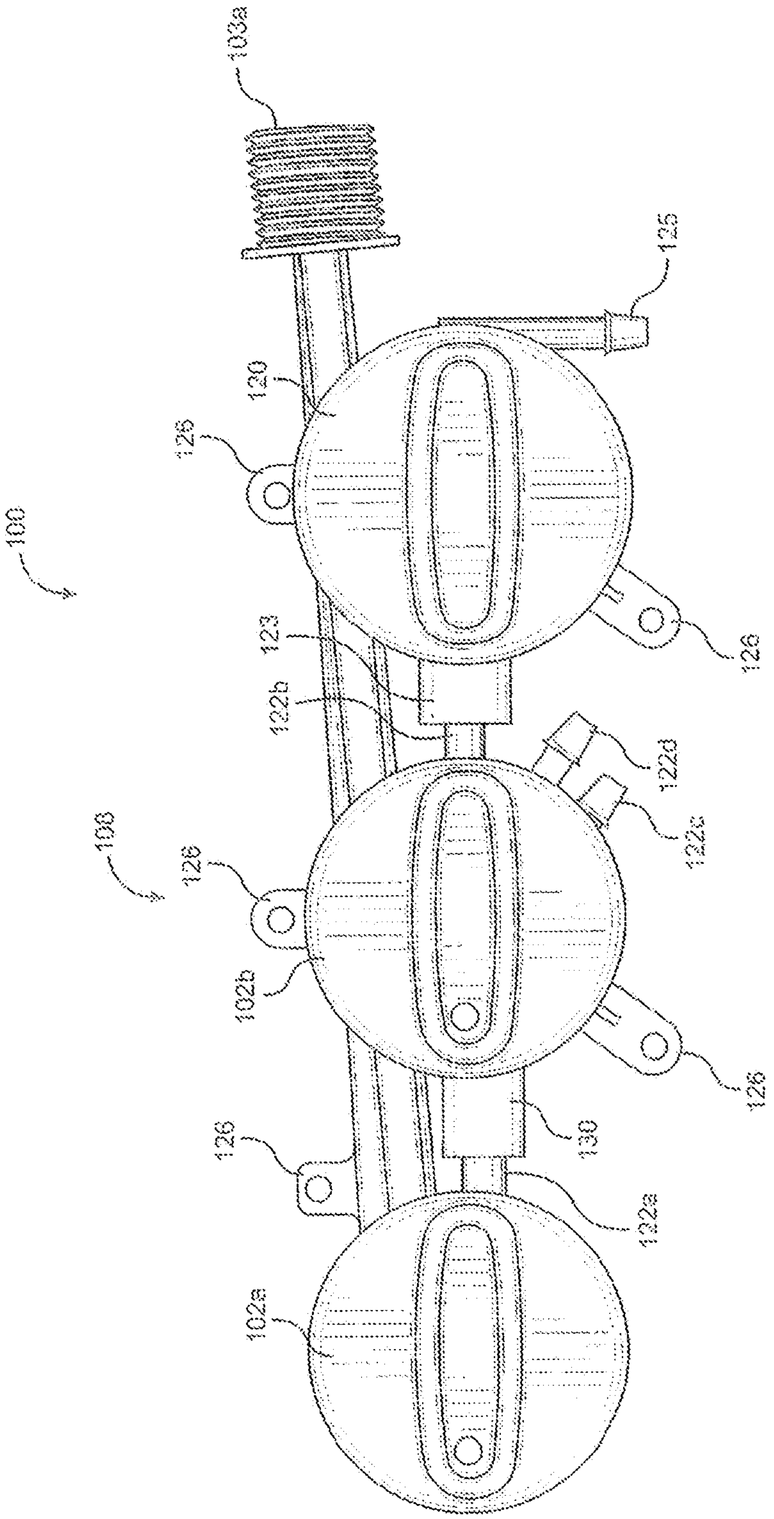
Figure 17:
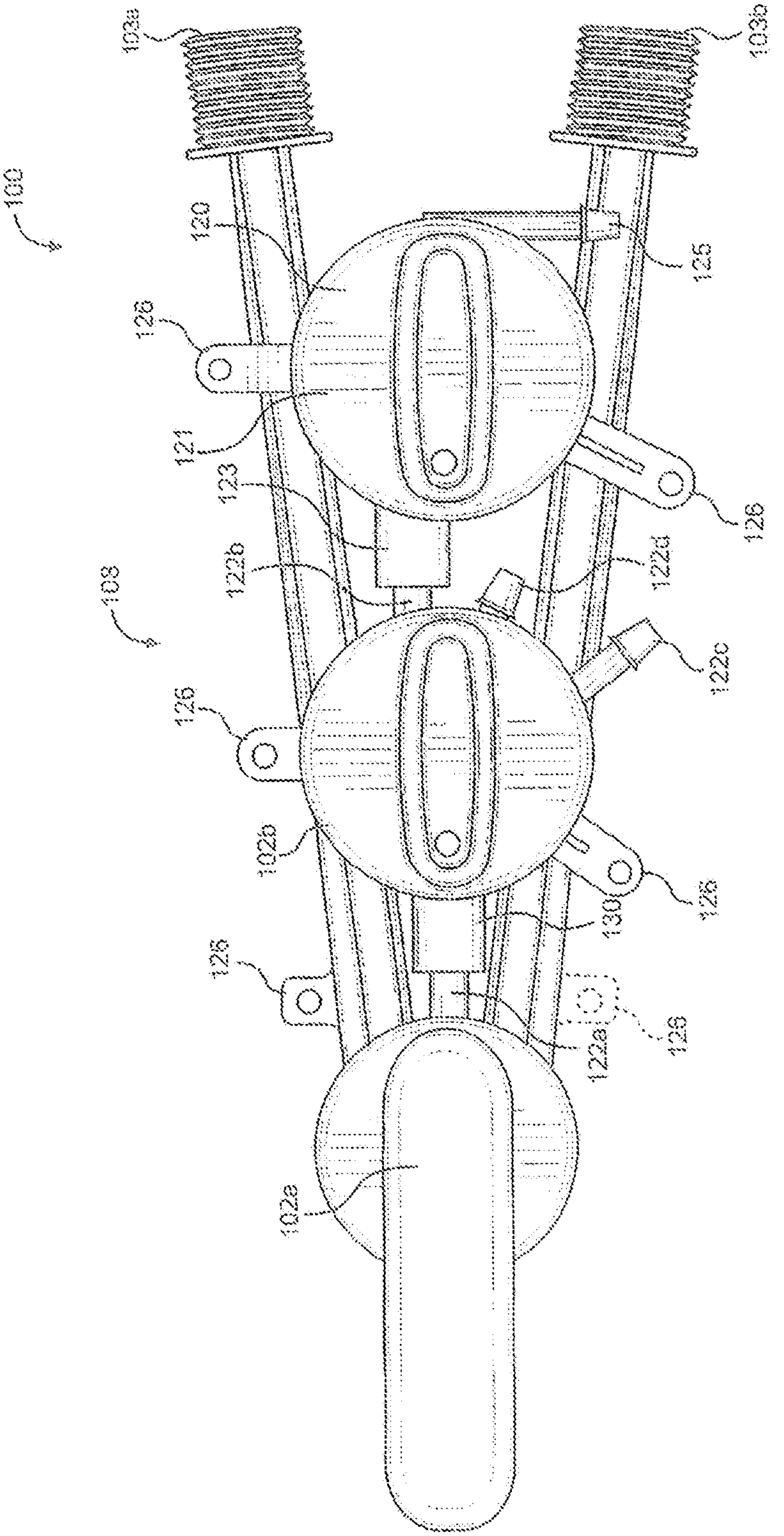
Figure 18:
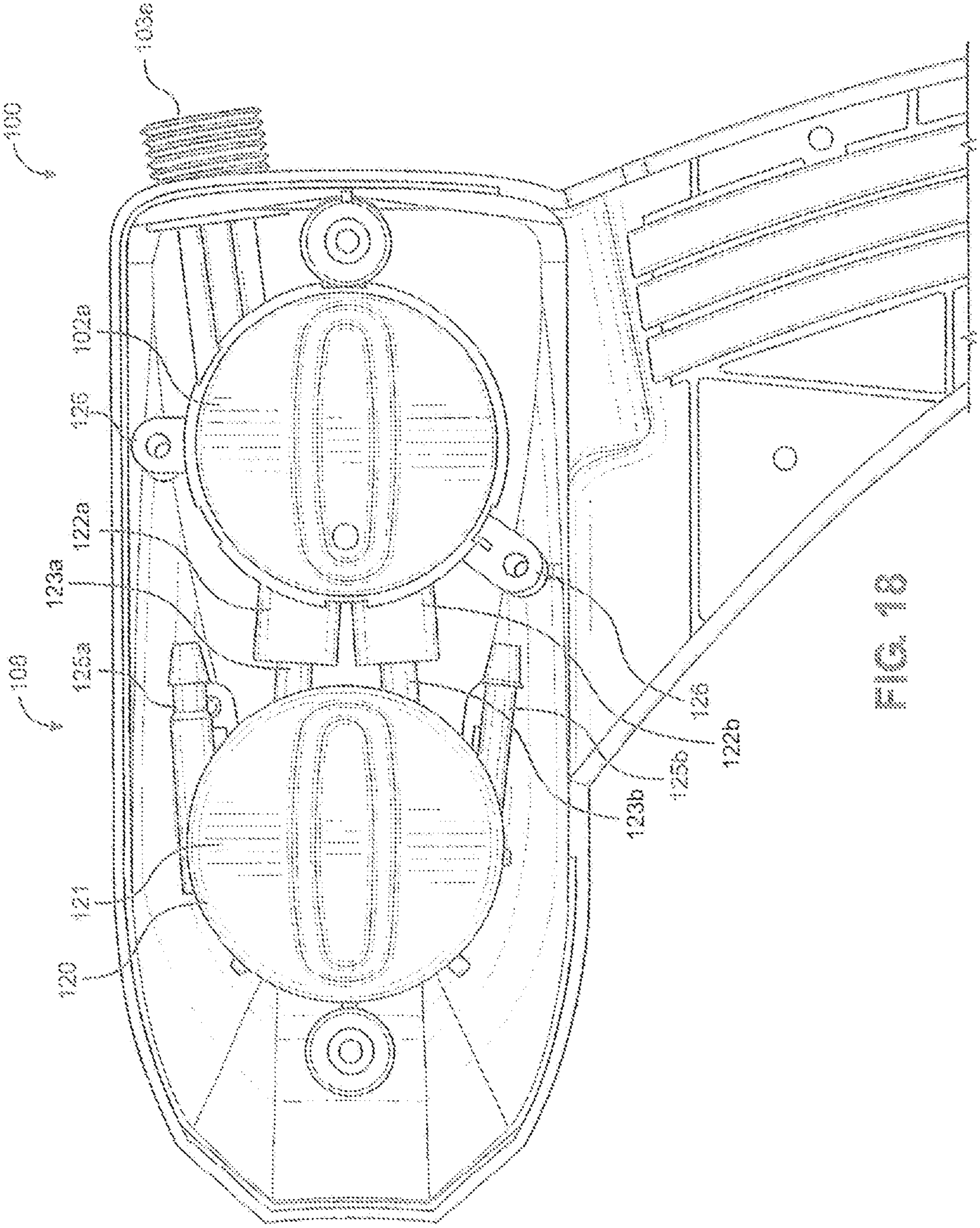
Figure 19:
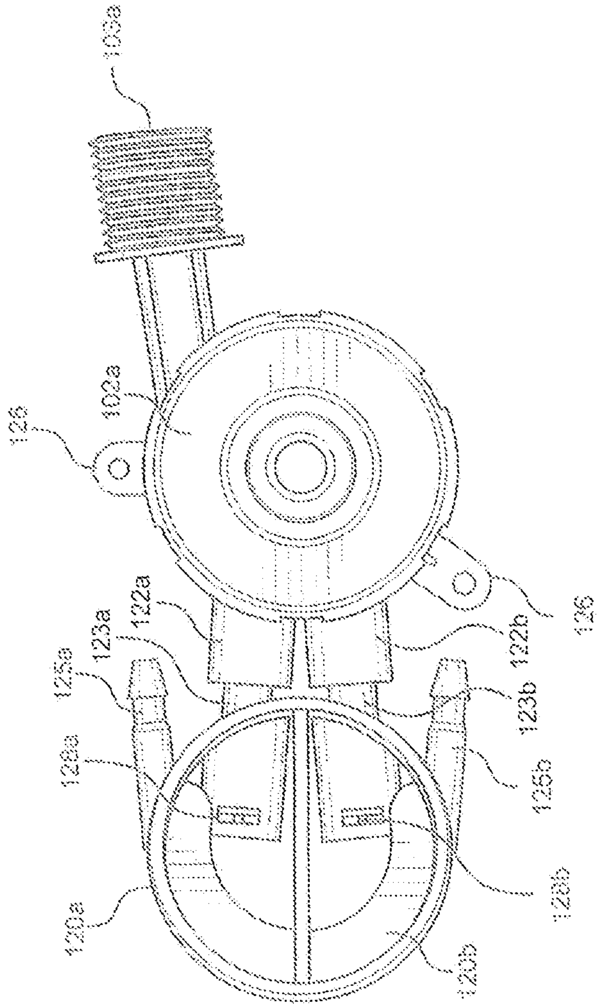
Figure 20:
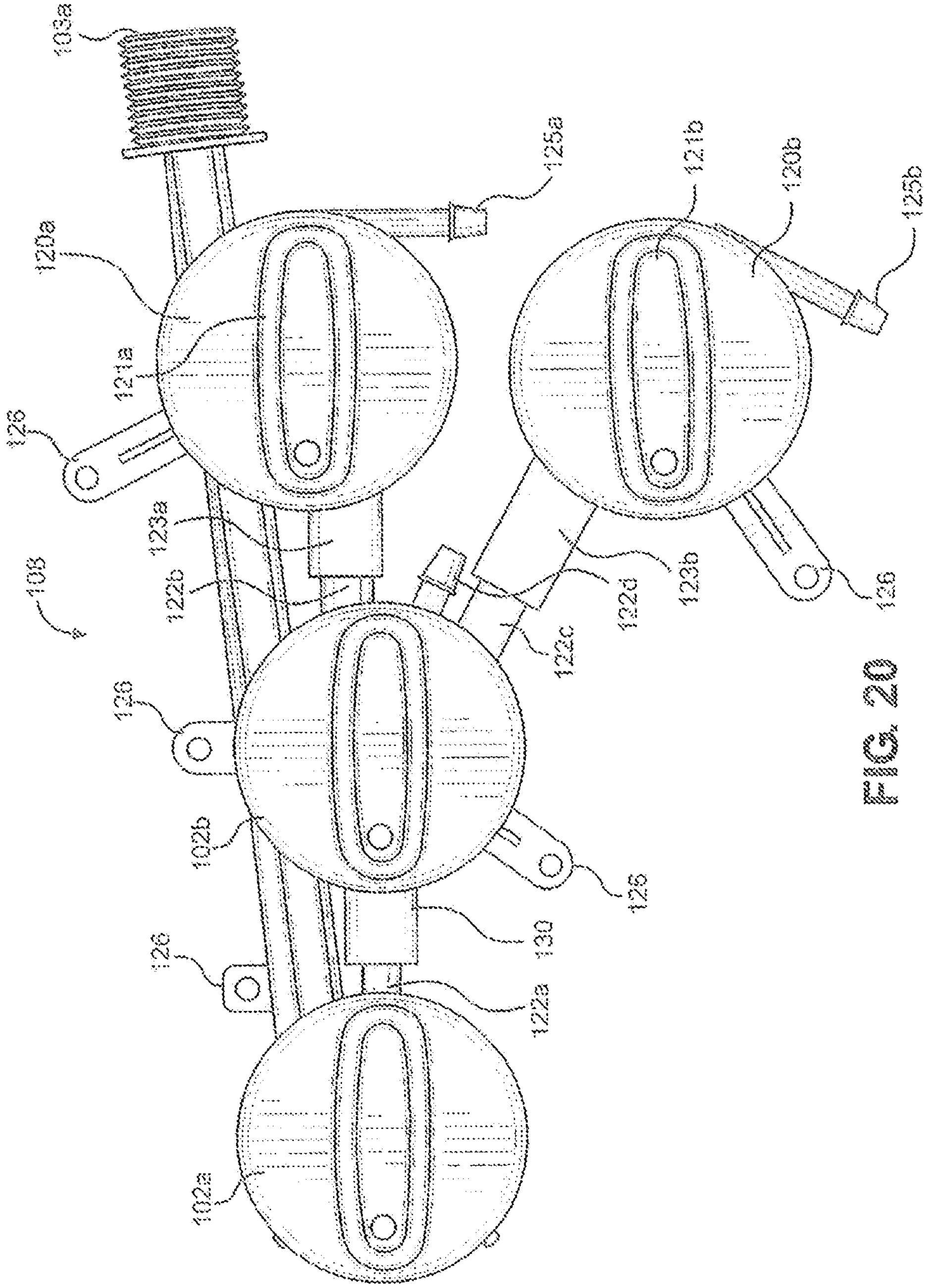
Figure 21:
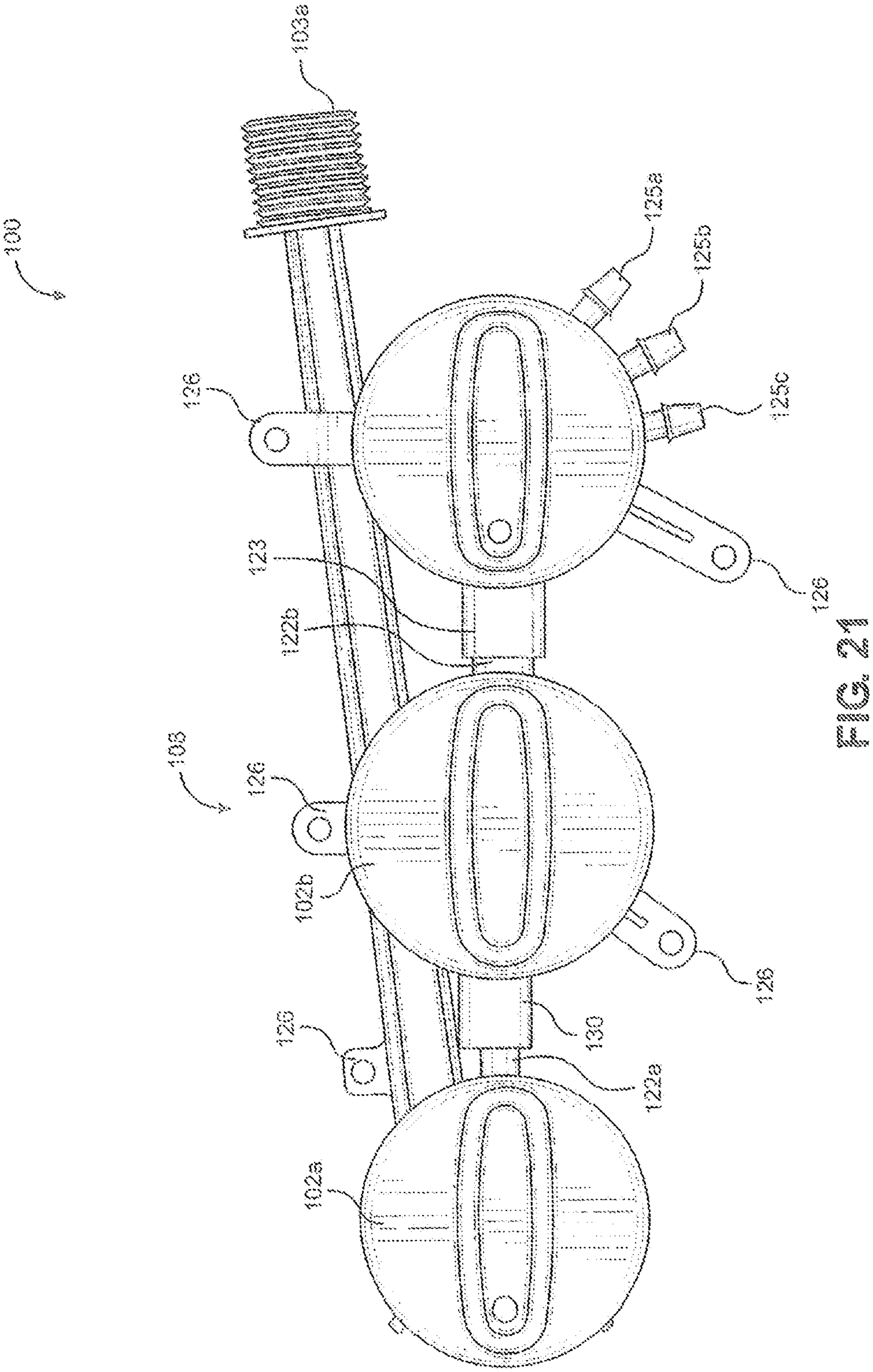
Figure 22:
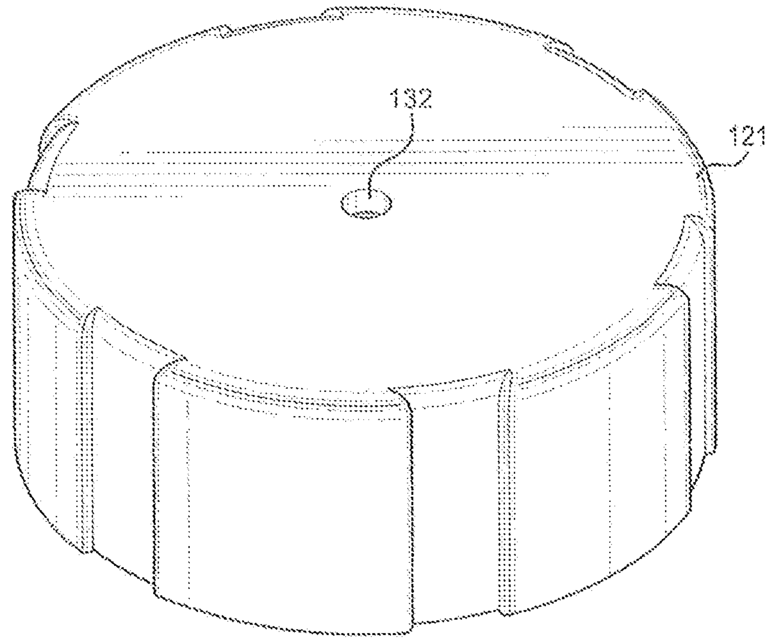
Figure 23:
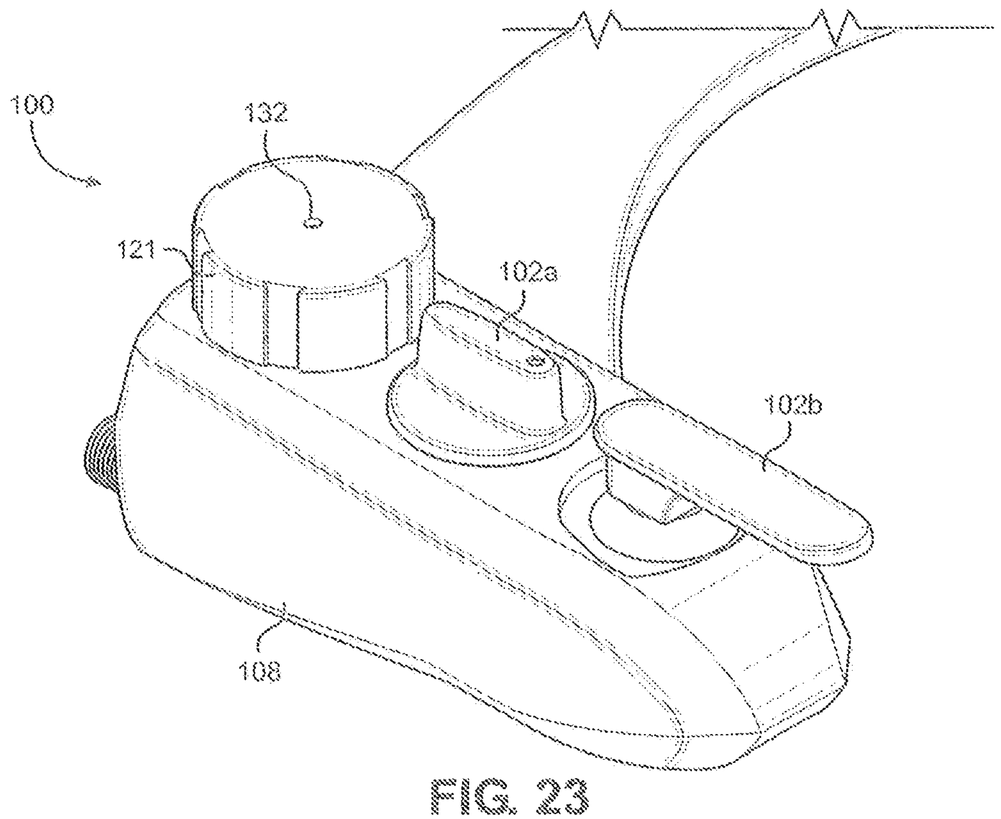
Figure 24:
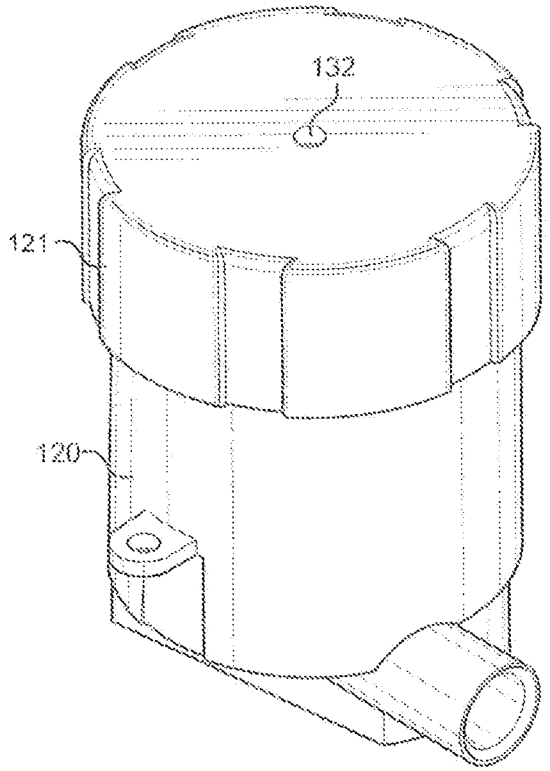
Figure 25A:
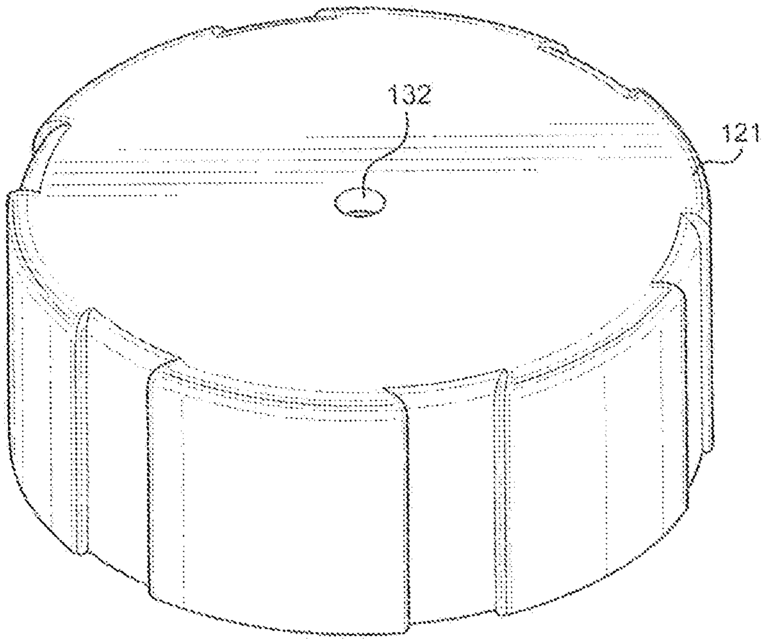
Figure 25B:
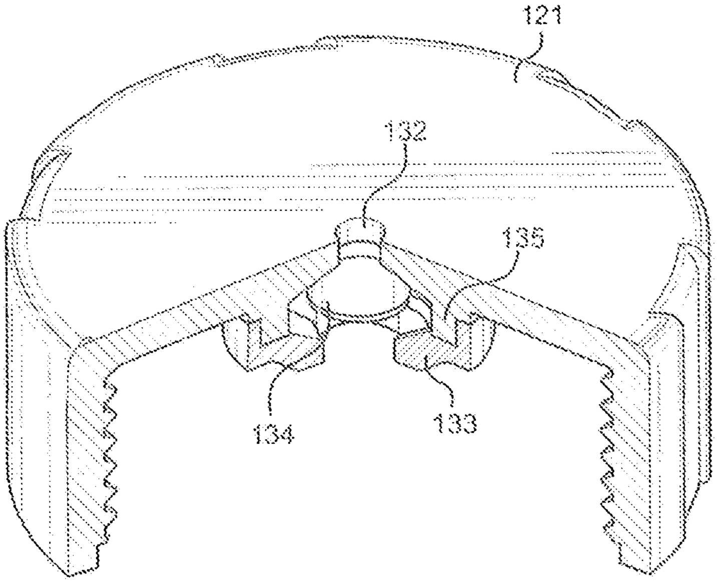
Figure 26:
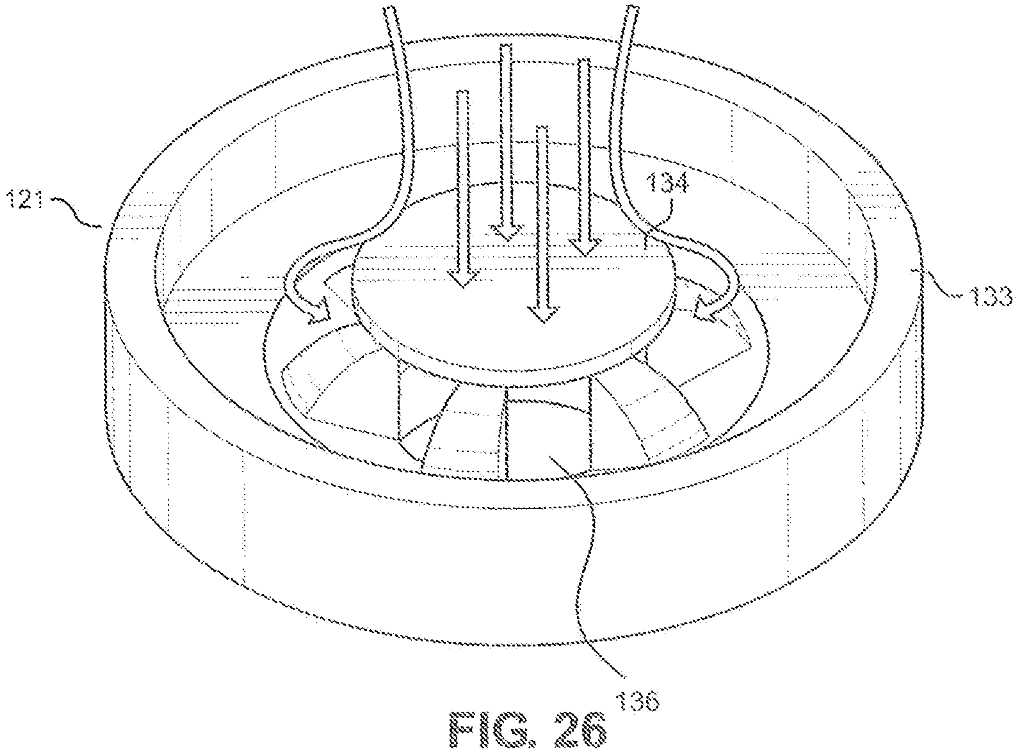
Figure 27:
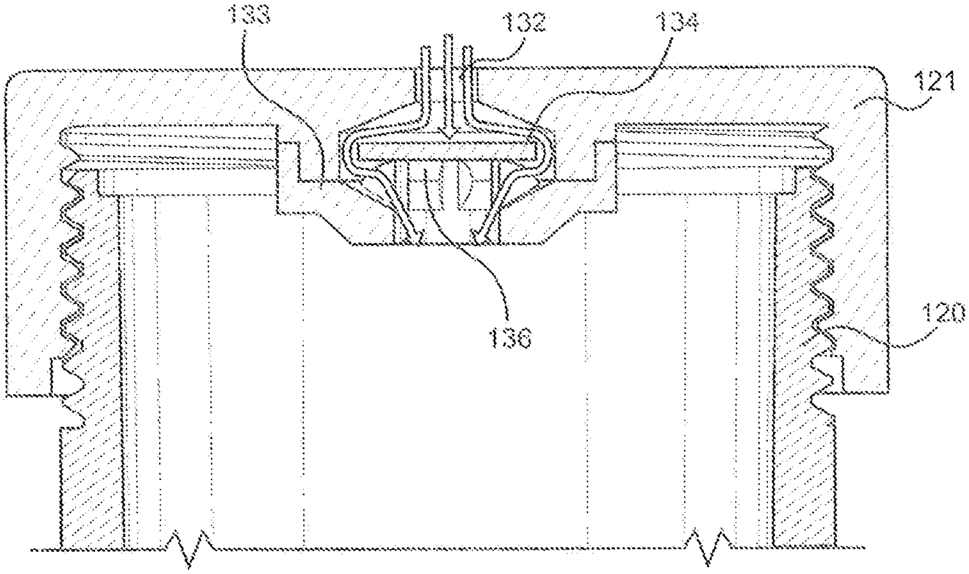
Figure 28:
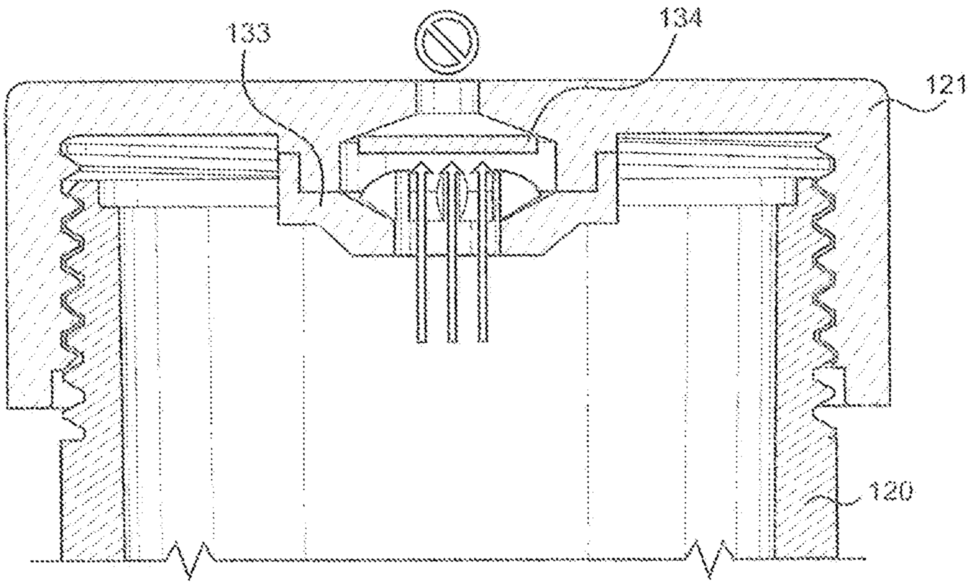
Figure 29:
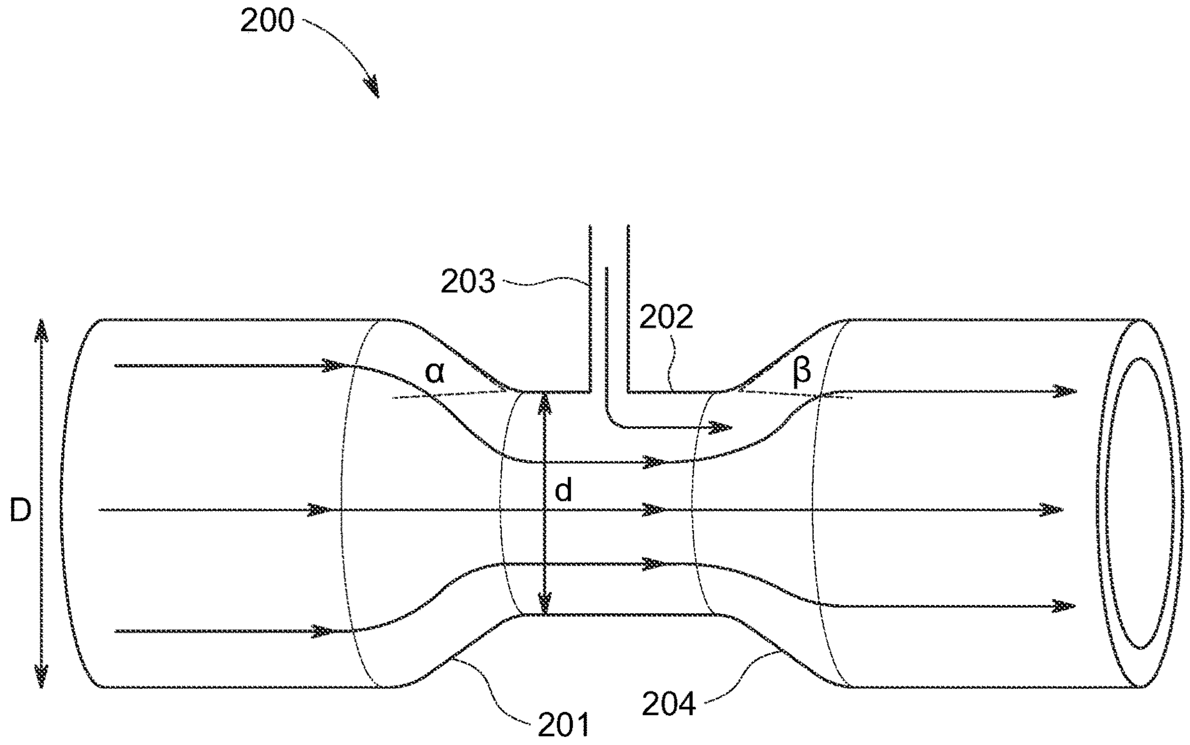
Figure 30:
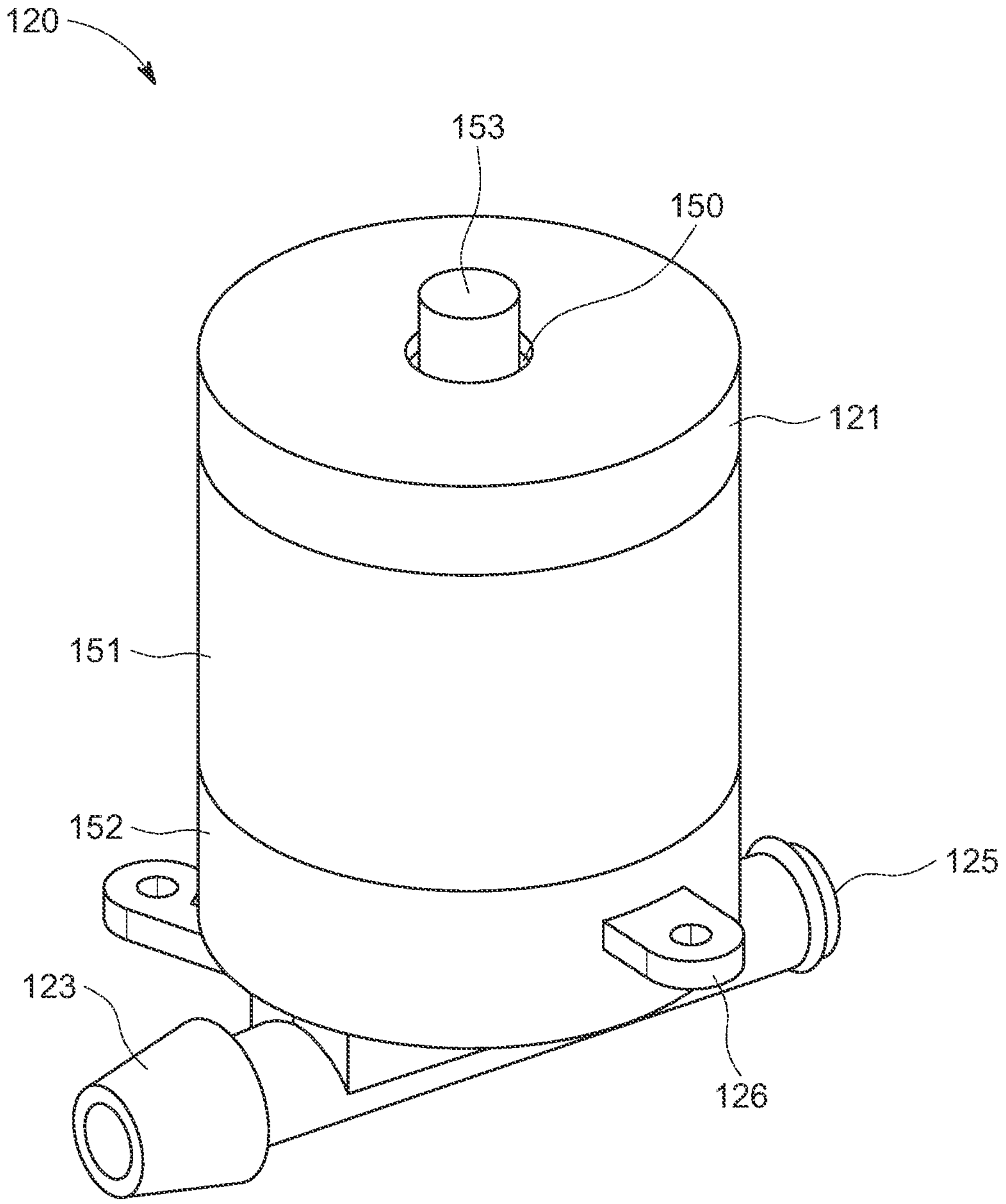
Figure 31:
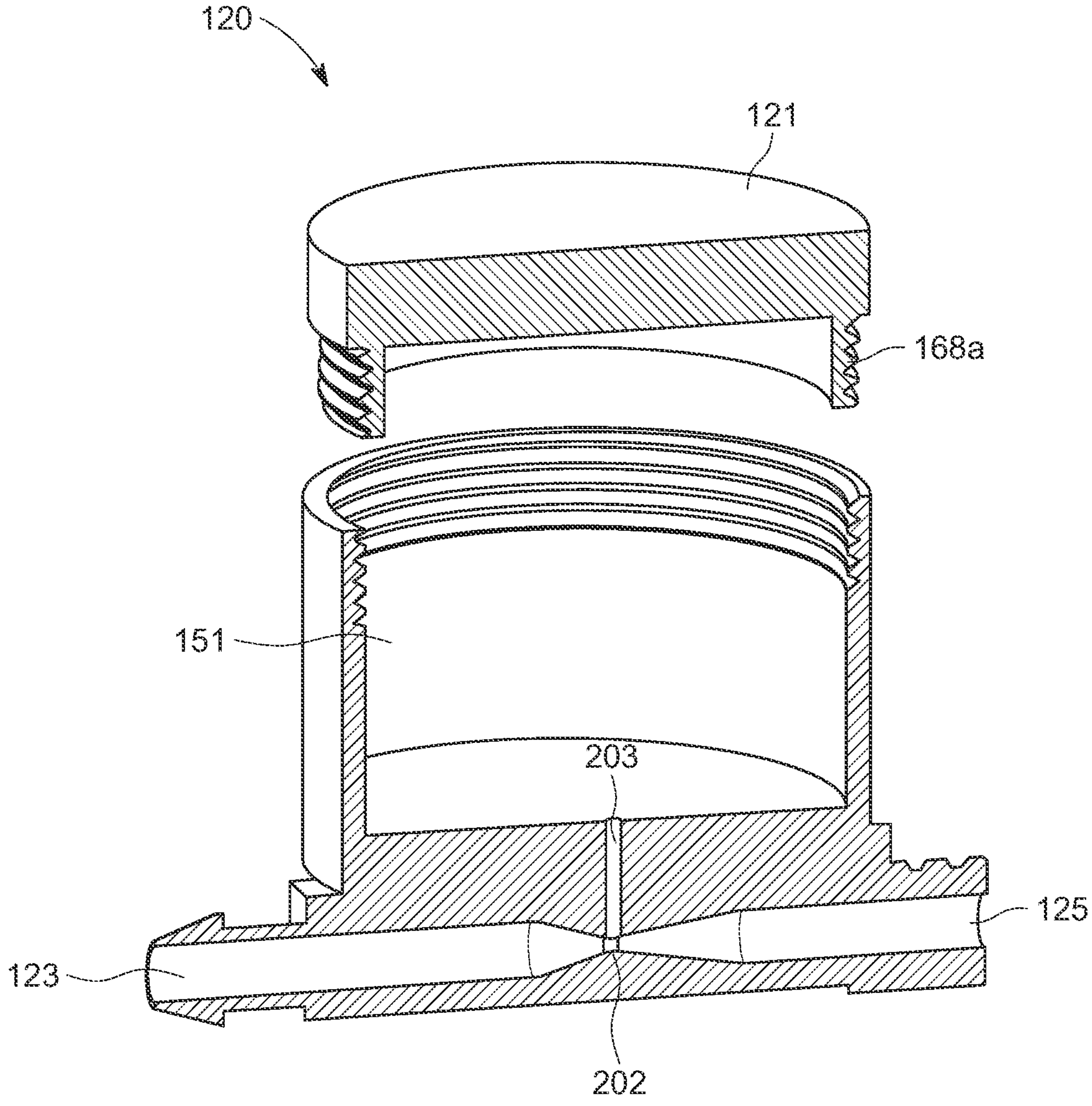
Figure 32:
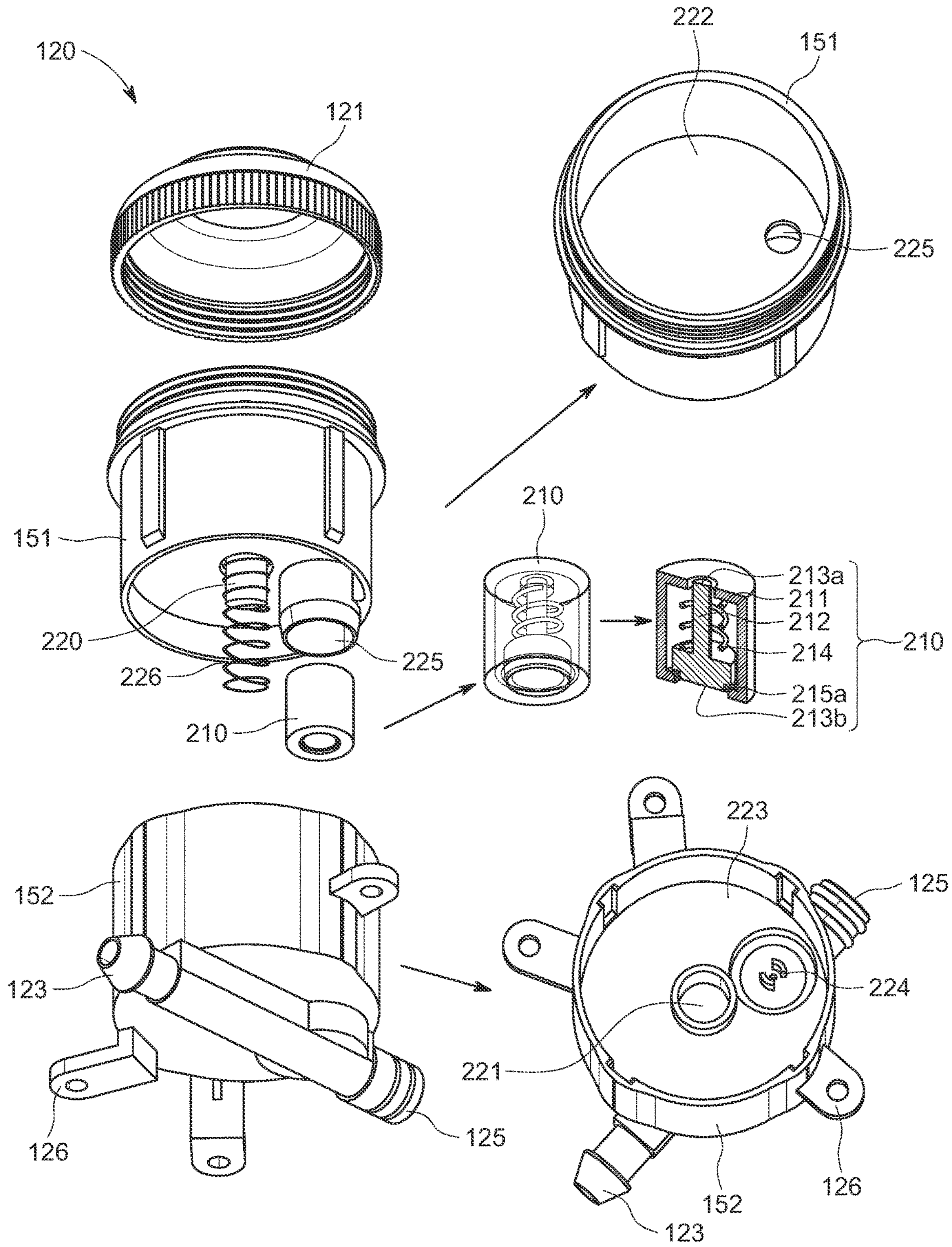
Figure 33:
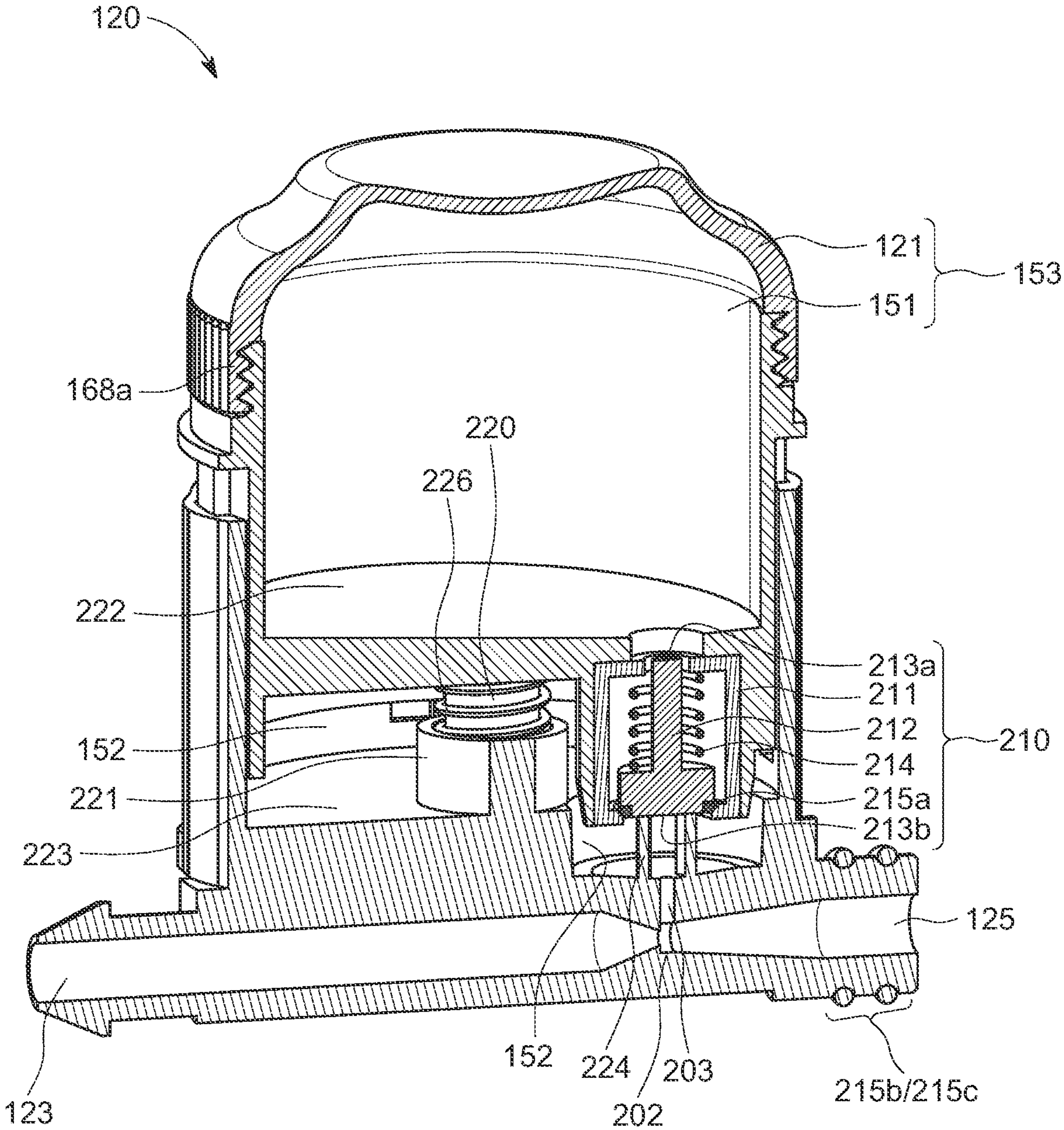
Figure 34:
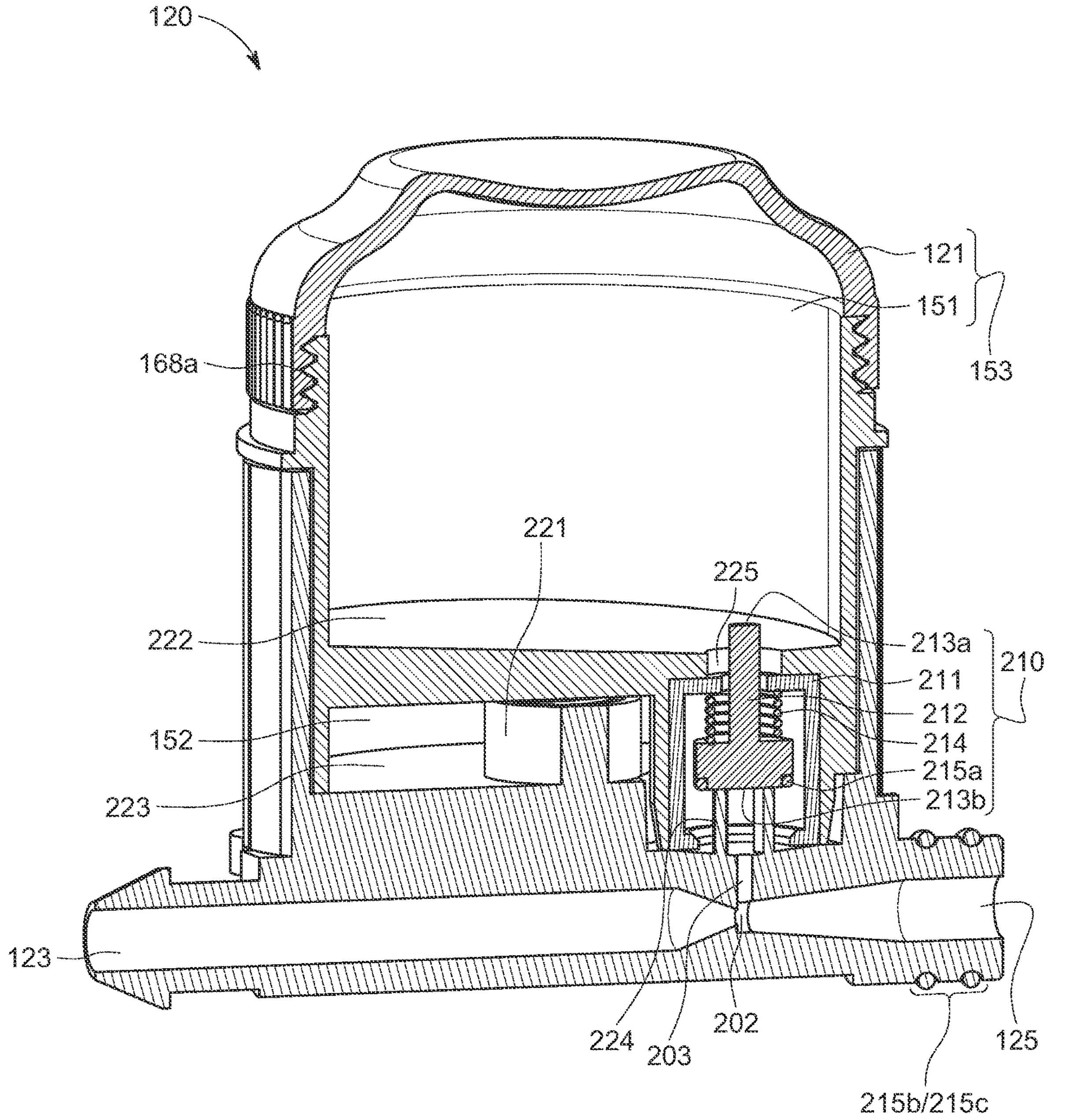
Figure 35:
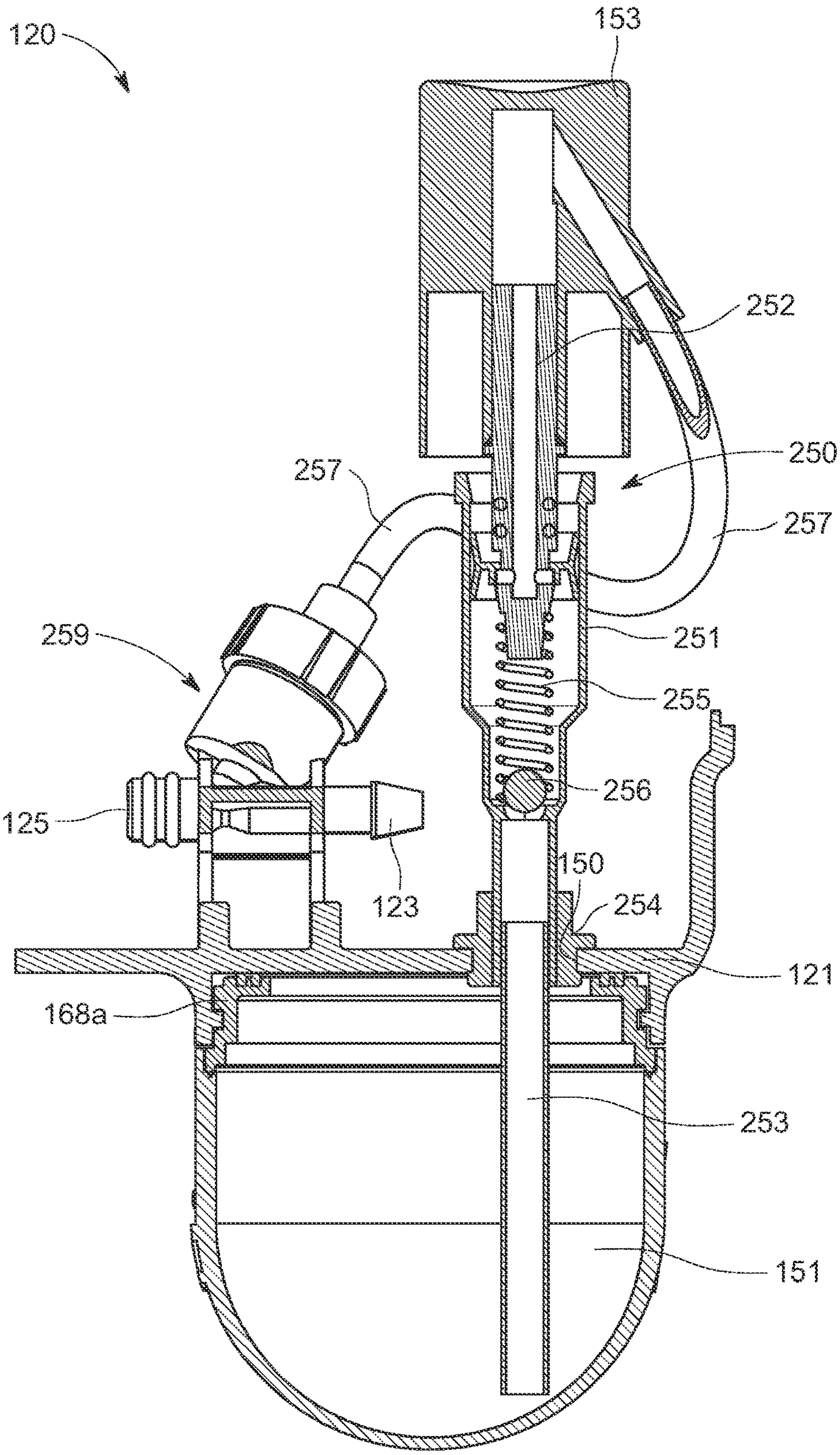
Figure 36:
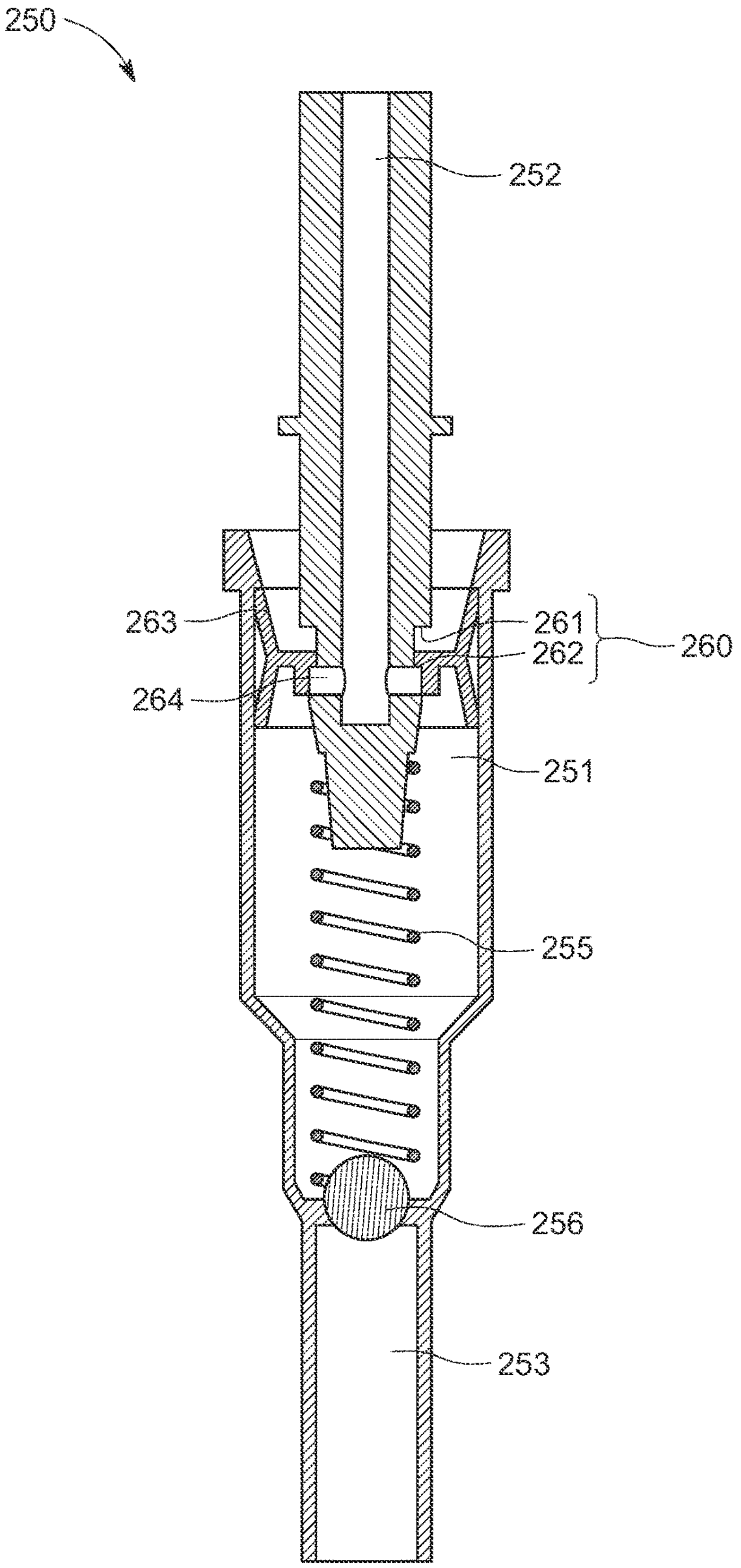
Figure 37:
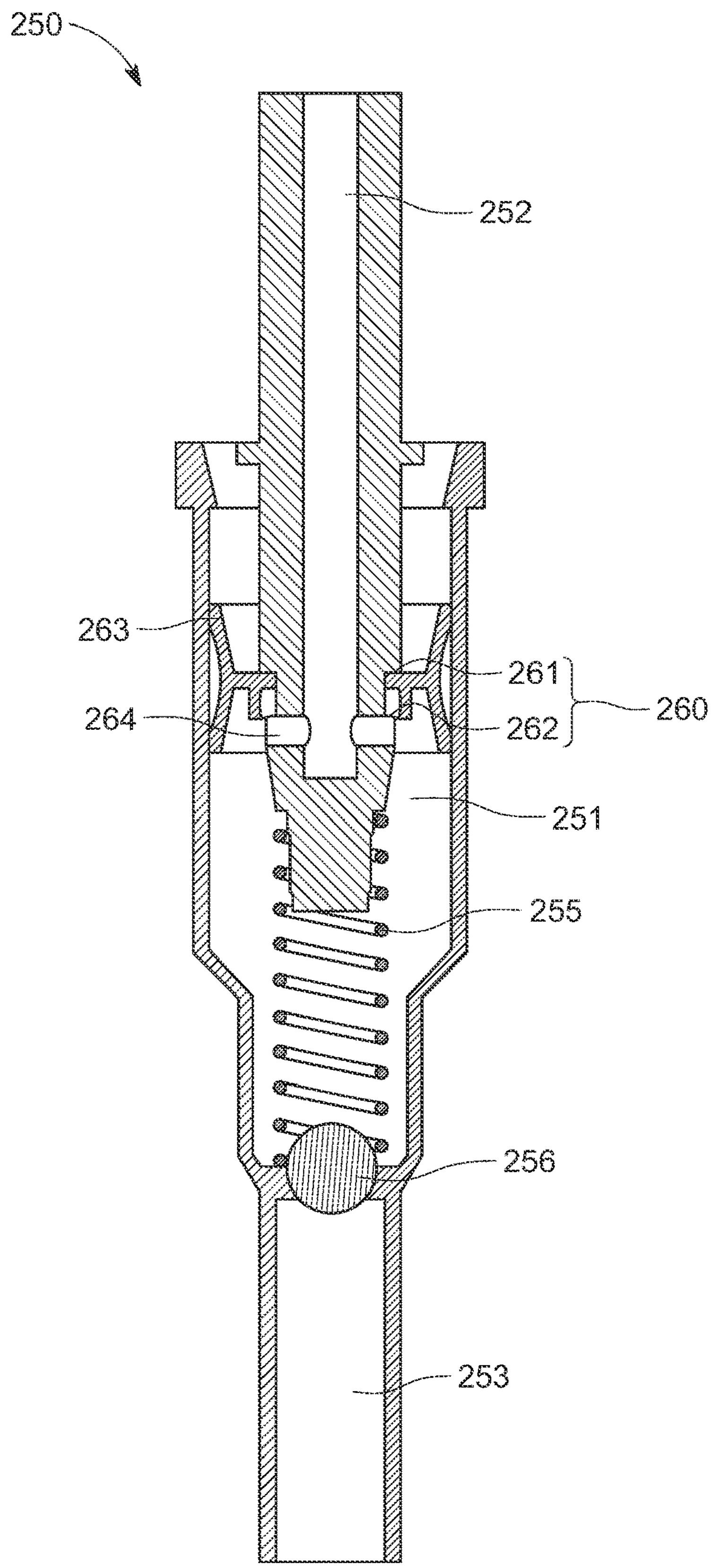
Figure 38:
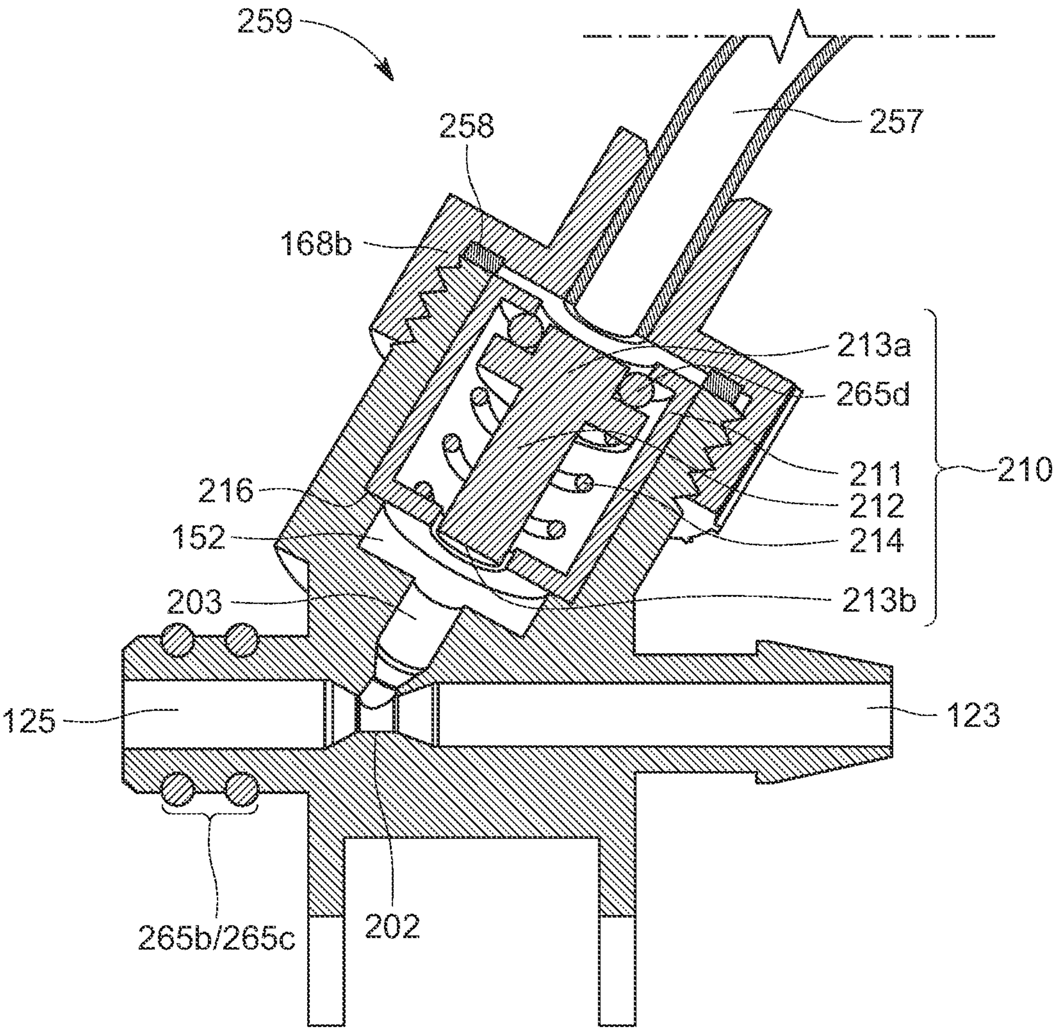
Figure 39:
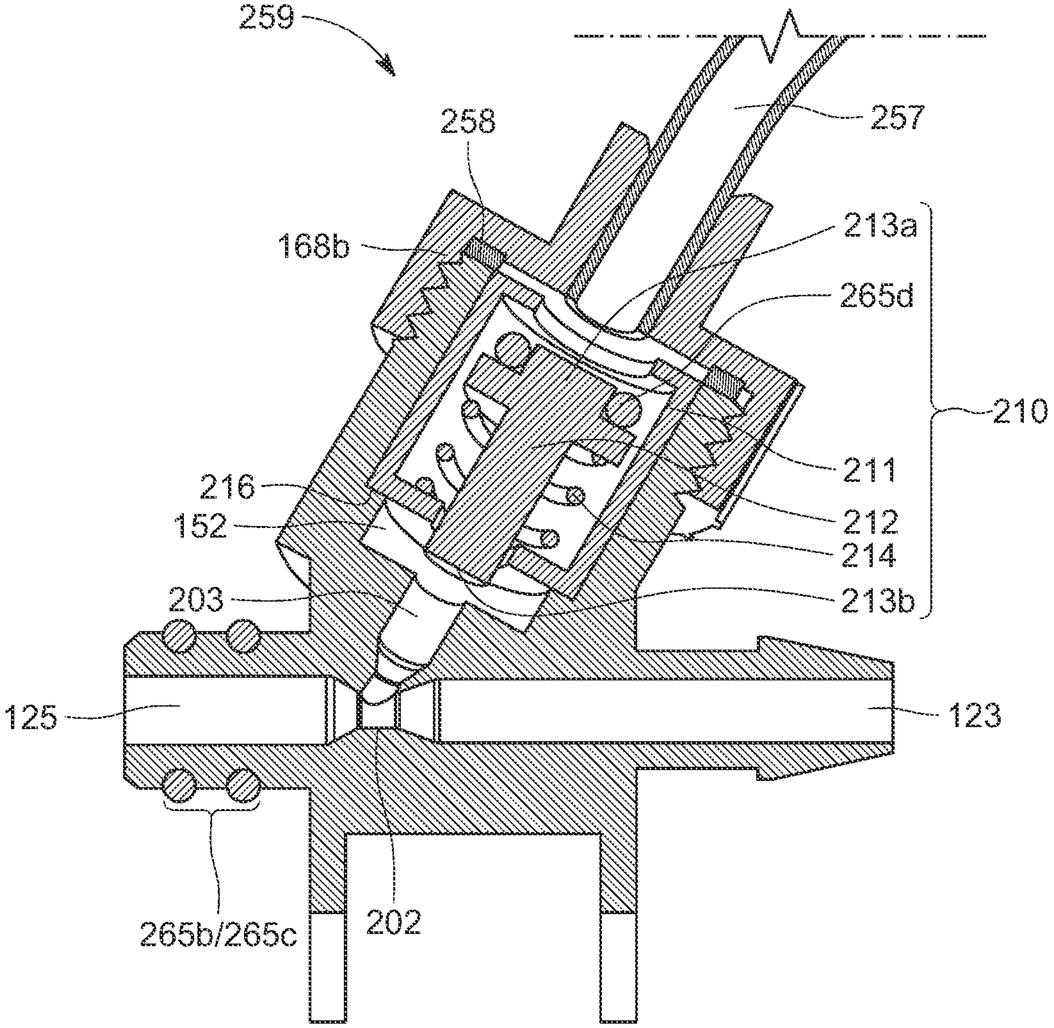
Figure 40:
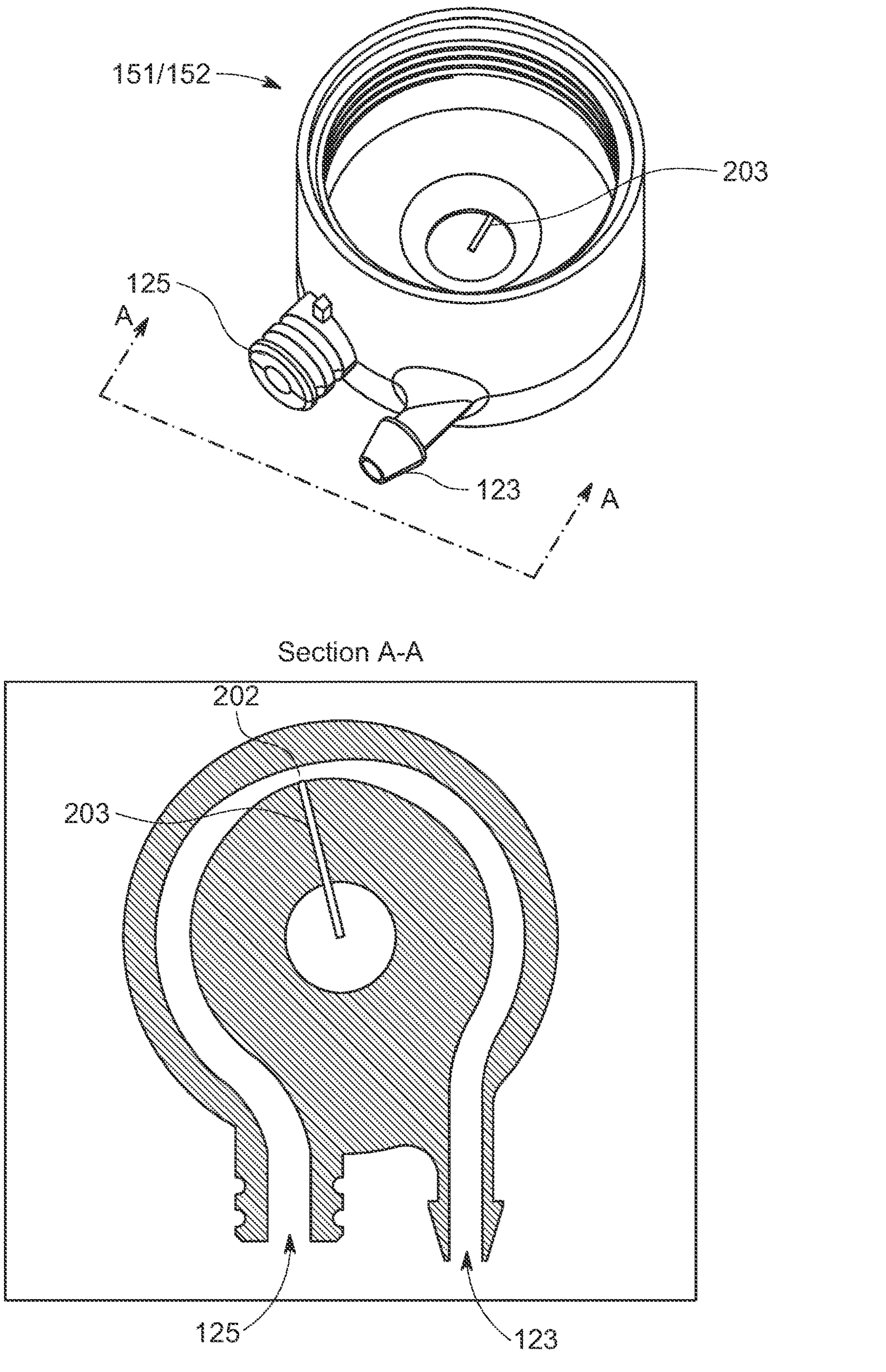
Figure 41:
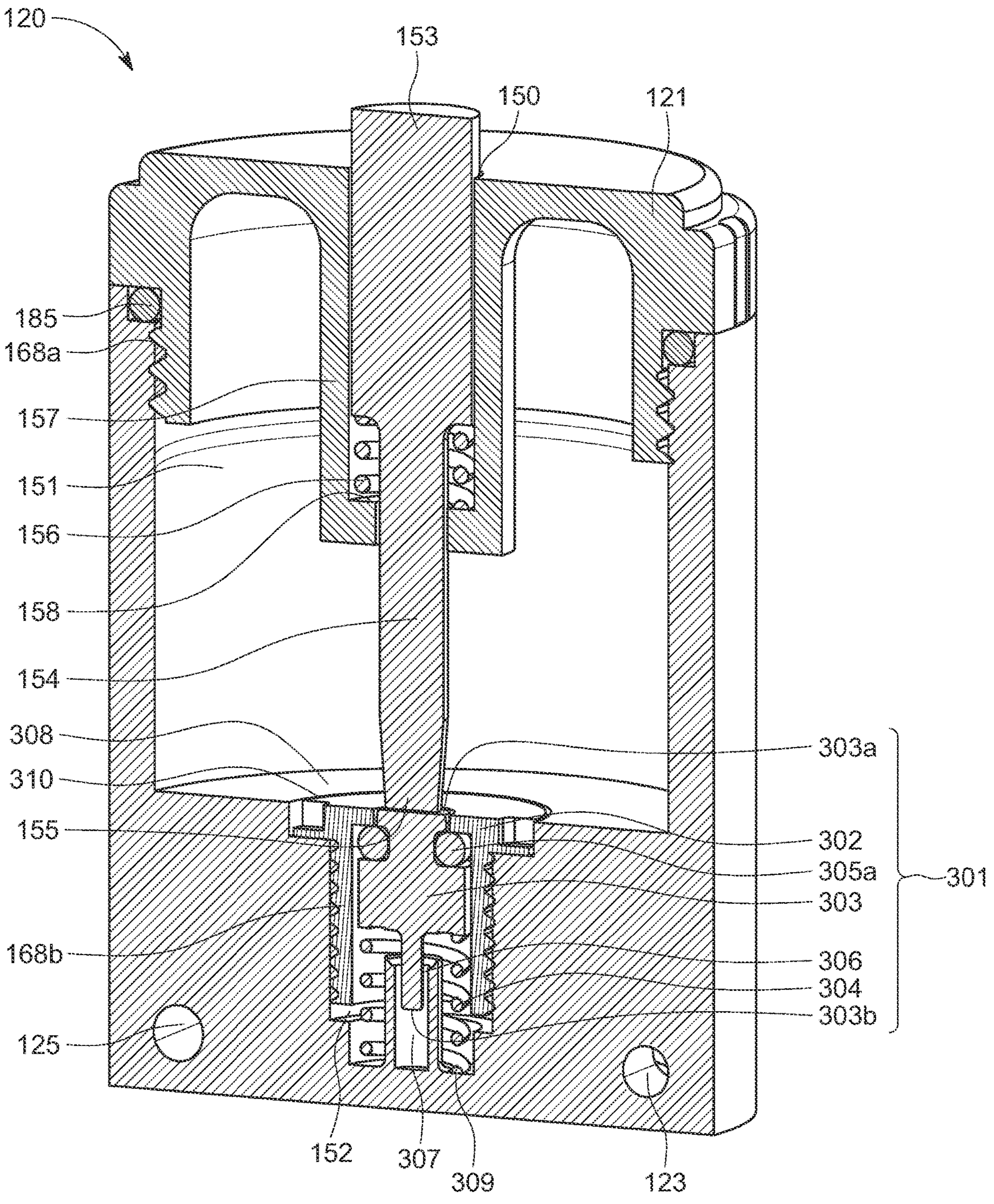
Figure 42:
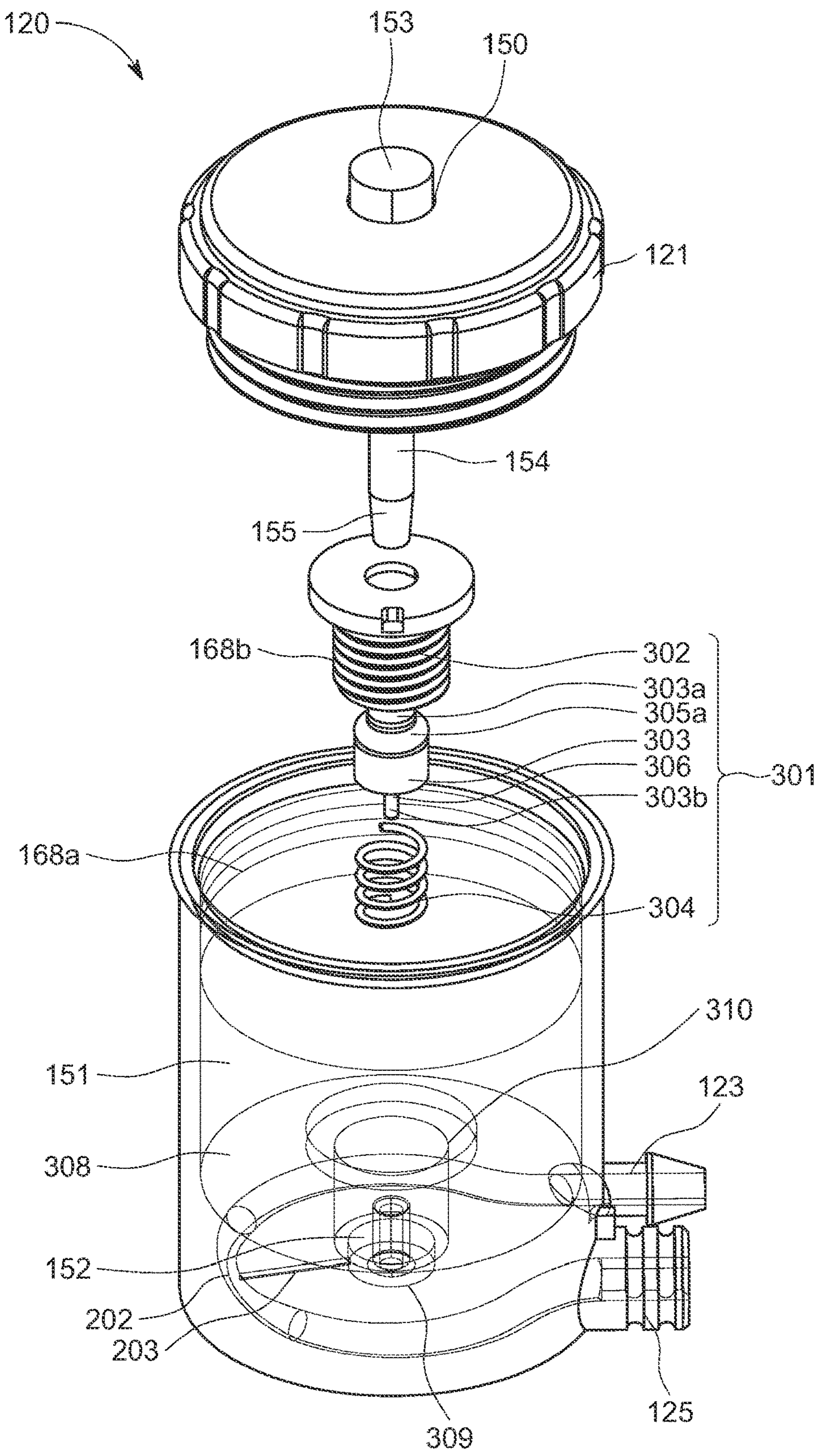
Figure 43:
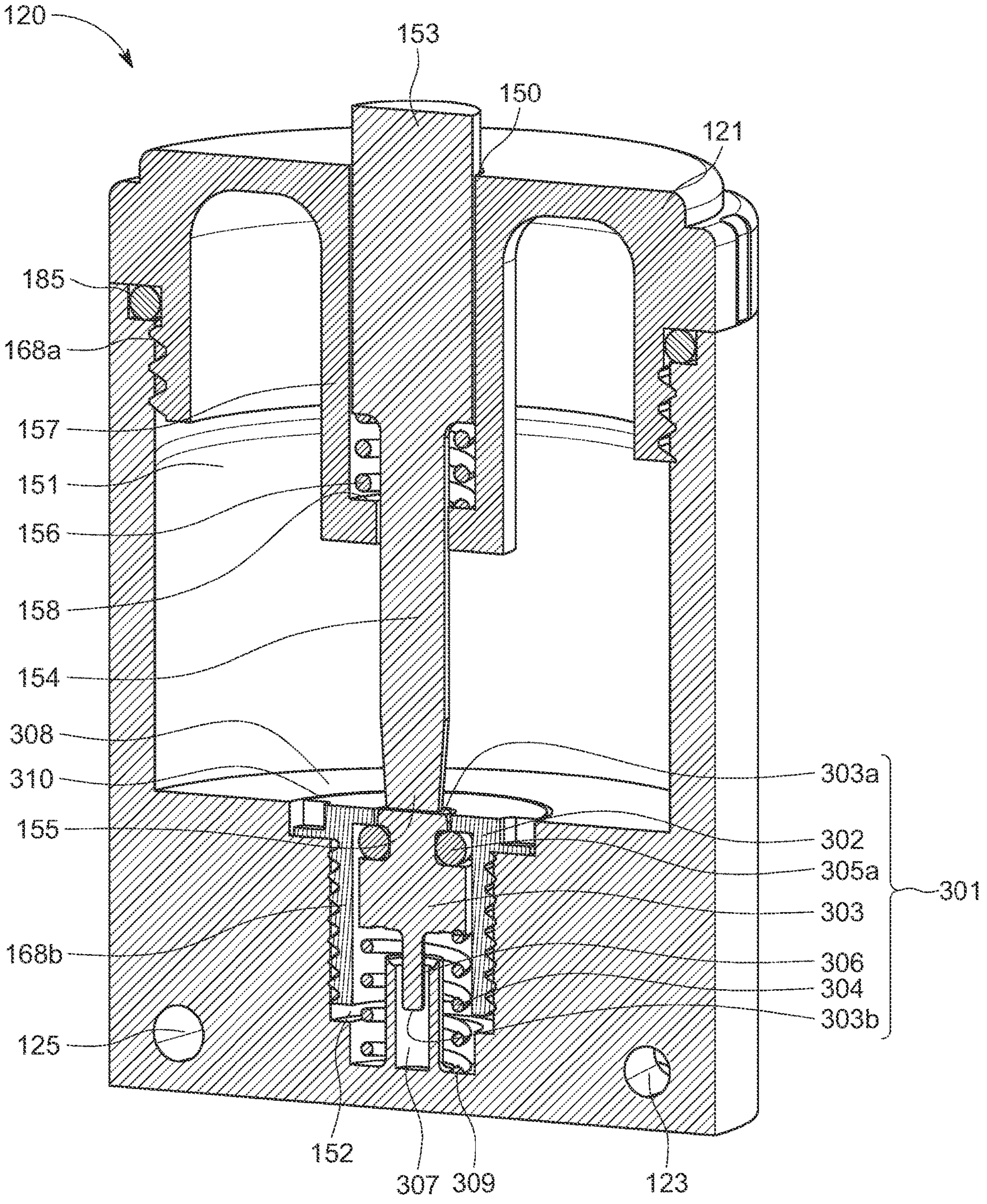
Figure 44:
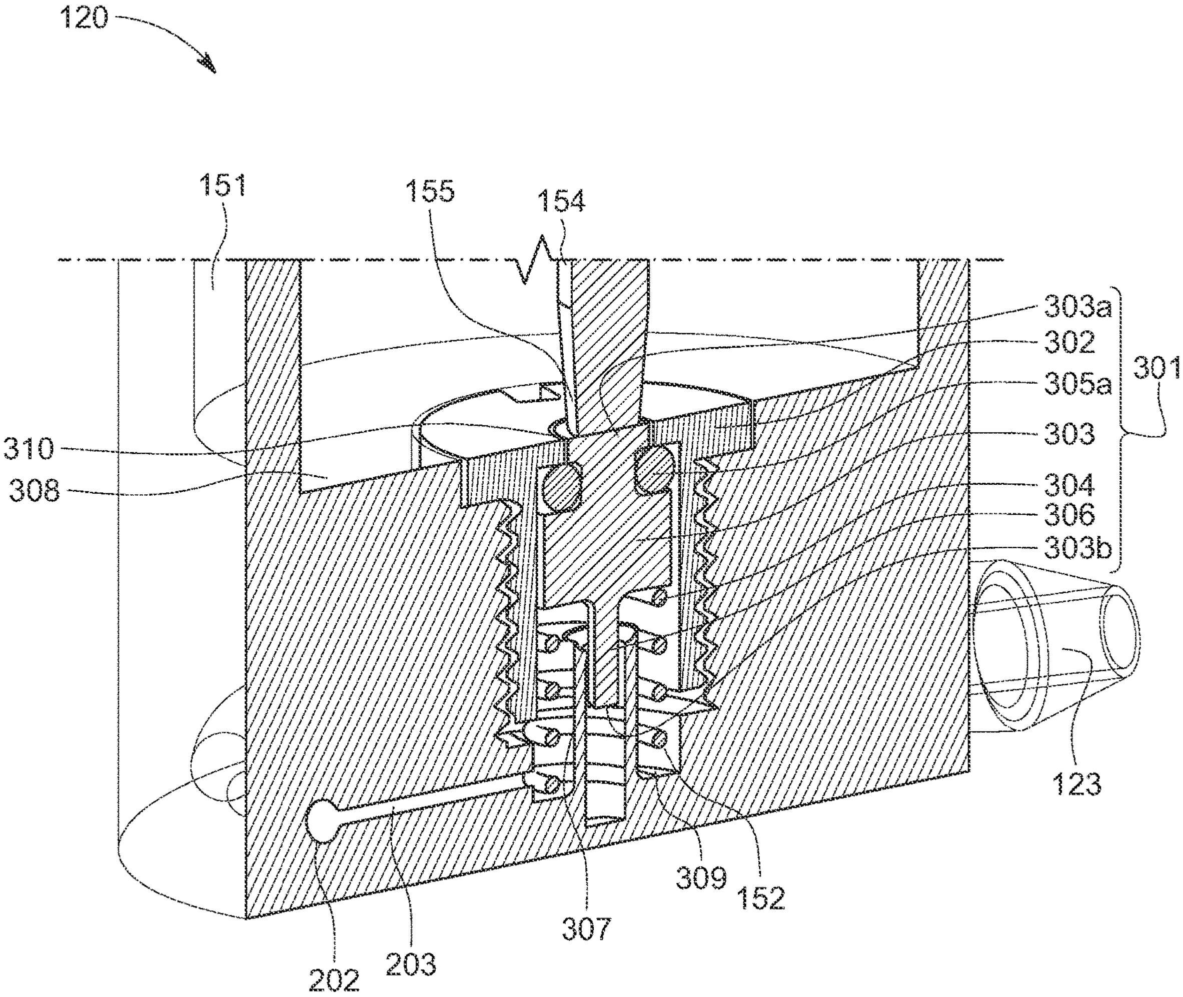
Figure 45:
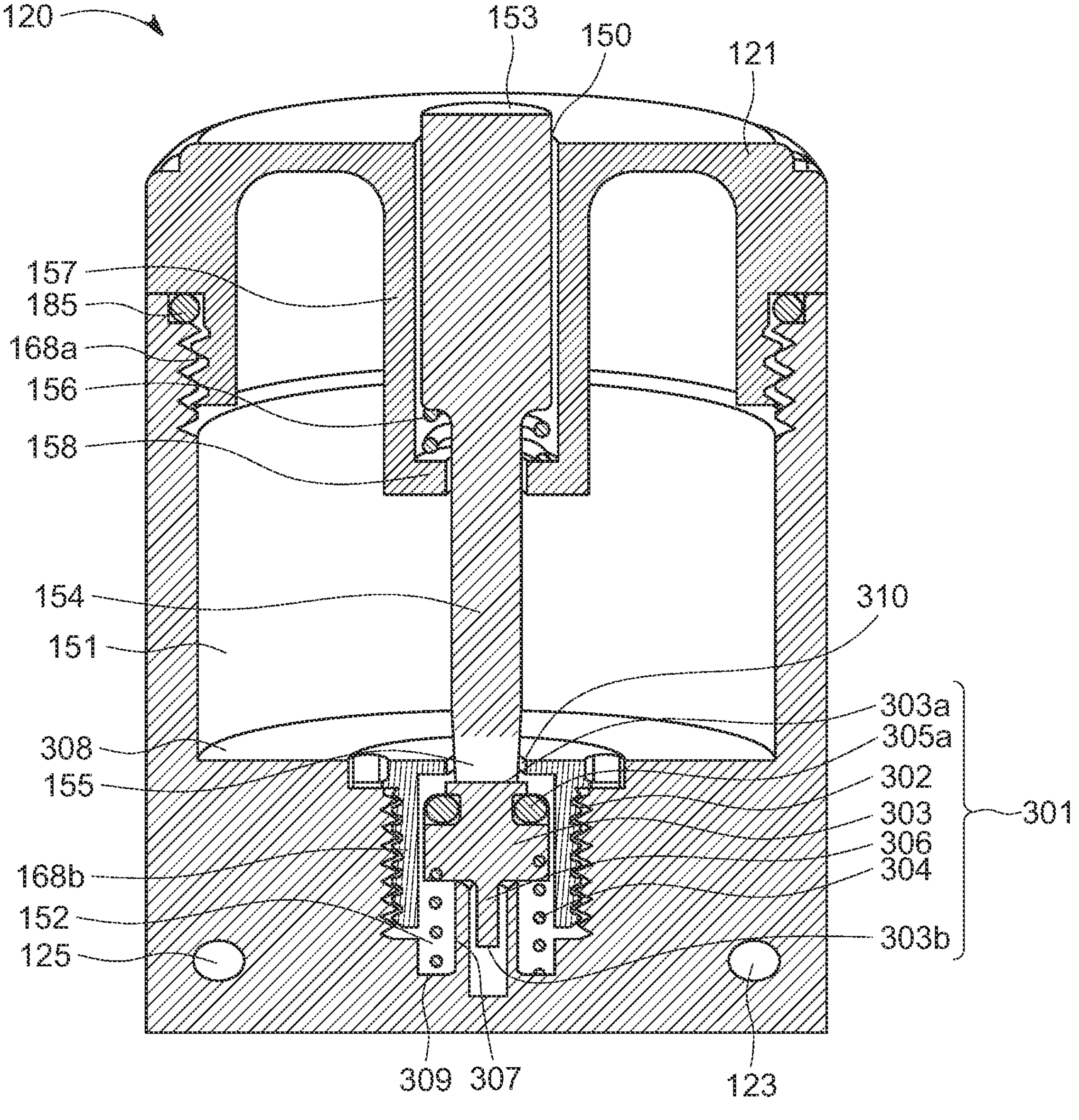
Figure 46:
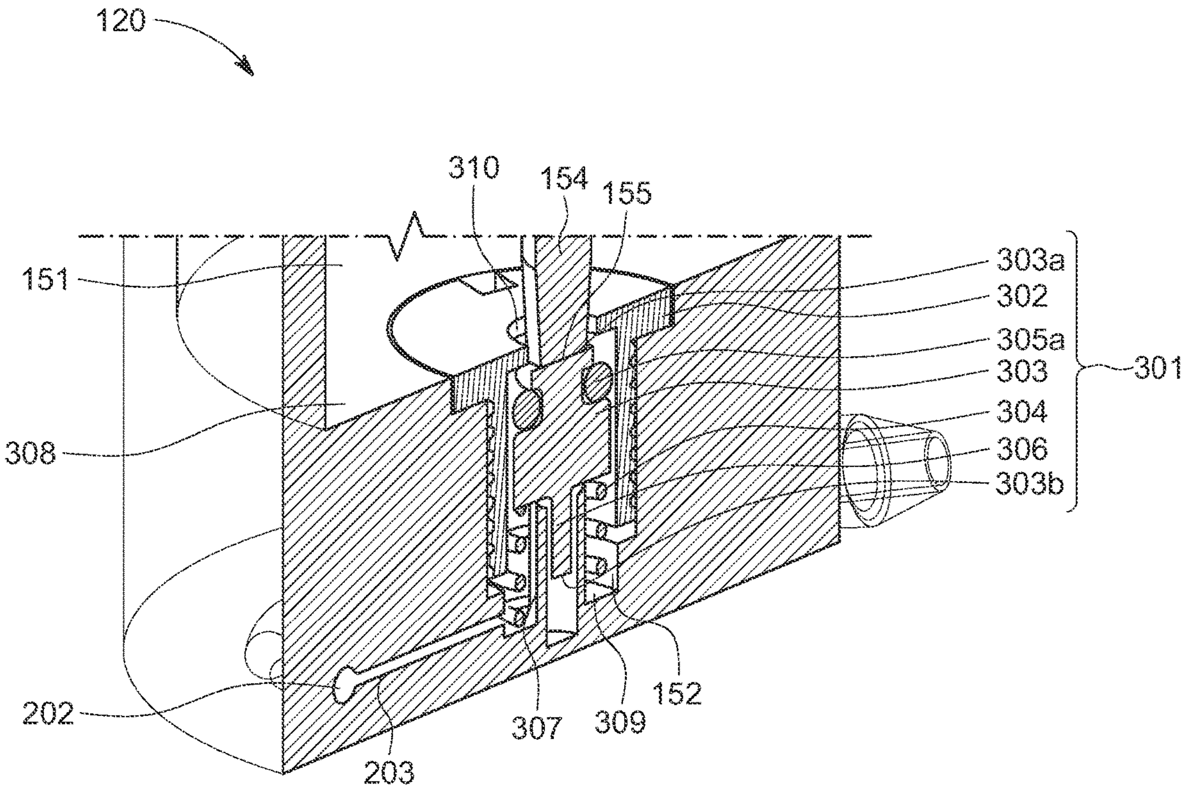

FIGS. **13*a* and 13*b*** illustrate a cut-away view of an embodiment of a bottom view of the nozzle assembly, washing nozzles, and one or more openings with and without a shield gate;

FIG. 14 illustrates a cut-away view of an embodiment of a top view of a bidet washing apparatus, showing a one compartment reservoir dispenser with a lid removed;

FIG. 15 illustrates a view of a lid, which can be removably attached to a reservoir dispenser;

FIG. 16 illustrates a cut-away view of an embodiment of a bidet washing apparatus with a reservoir dispenser and, a removable lid;

FIG. 17 illustrates a cut-away view of an embodiment of a bidet washing apparatus with a reservoir dispenser and a removable lid;

FIG. 18 illustrates, a cut-away view of an embodiment of a bidet washing apparatus with a reservoir dispenser and a removable lid;

FIG. 19 illustrates a cut-away view of an embodiment of a bidet washing apparatus with a reservoir dispenser without a removable lid;

FIG. 20 illustrates a cut-away view of an embodiment of a bidet washing apparatus with two reservoir dispensers with removable lids;

FIG. 21 illustrates a cut-away view of an embodiment of a bidet washing apparatus with a reservoir dispenser with a removable lid;

FIG. 22 illustrates an embodiment of a reservoir dispenser lid with a built-in check valve and air vent for securing a reservoir dispenser of a bidet washing apparatus;

FIG. 23 illustrates an embodiment of a bidet washing apparatus having a reservoir dispenser lid with a built-in check valve and air vent for securing to a reservoir dispenser, a control unit, and control switches of a bidet washing apparatus;

FIG. 24 illustrates an embodiment of a reservoir dispenser lid with a built-in check valve and air vent secured to a reservoir dispenser by being screwed onto or attached to a dispenser;

FIG. 25A illustrates an embodiment of an exterior view of a reservoir dispenser lid with a built-in check valve and air vent; and FIG. 25B illustrates an embodiment of a cut-away view of a lid and air vent;

FIG. 26 illustrates an embodiment of a built-in check valve having a moveable rubber disk;

FIG. 27 illustrates an embodiment of a cut-away cross-sectional view of a reservoir dispenser lid with a built-in check valve and air vent with a valve in an opened position;

FIG. 28 illustrates an embodiment of a cut-away cross-sectional view of a reservoir dispenser lid with a built-in check valve and air vent with a valve in a closed position;

FIG. 29 illustrates an embodiment of the Venturi effect relating to reduction in fluid pressure that results when a fluid flow through a constricted section of a pipe;

FIG. 30 illustrates an embodiment of a front view of a reservoir dispenser with a water inlet and water outlet, a choke and a suction tube therein;

FIG. 31 illustrates an embodiment of a side cut-away view of a reservoir dispenser, which uses a suction tube to pull in a liquid wash solution present in a first chamber to water flowing between a water inlet and a water outlet;

FIG. 32 illustrates an embodiment of an exploded view of a reservoir dispenser, which uses a suction tube to pull in a liquid wash solution present in a first chamber to water flowing between the water inlet and the water outlet;

FIG. 33 illustrates an embodiment of a side cut-away view of a reservoir dispenser when in an inactivated position;

FIG. 34 illustrates an embodiment of a side cut-away view of a reservoir dispenser when in an activated position;

FIG. 35 illustrates an embodiment of a side cut-away view of a reservoir dispenser, which uses a pump and a check valve to deliver a liquid wash solution;

FIG. 36 illustrates an embodiment of a side cut-away view of a pump chamber when in an inactivated position;

FIG. 37 illustrates an embodiment of a side cut-away view of a pump chamber when in an activated position;

FIG. 38 illustrates an embodiment of a side cut-away view of a check valve located between the first chamber and the second chamber;

FIG. 39 illustrates an embodiment of a side cut-away view of a check valve when in an activated position;

FIG. 40 illustrates an embodiment of a cut-away view of the lower half of a chamber of a reservoir dispenser, which uses a suction tube to pull in a liquid wash solution;

FIG. 41 illustrates an embodiment of a cross-sectional view of a reservoir dispenser, which uses a suction tube to pull in a liquid wash solution;

FIG. 42 illustrates an embodiment of an exploded view of a reservoir dispenser, which uses a suction tube to pull in a liquid wash solution;

FIG. 43 illustrates an embodiment of a side cut-away view of a reservoir dispenser when in an inactivated position;

FIG. 44 illustrates an embodiment of a side cut-away view of a check valve in a reservoir dispenser when in a closed or an inactivated position;

FIG. 45 illustrates an embodiment of a side cut-away view of a reservoir dispenser when in an activated position; and FIG. 46 illustrates an embodiment of a side cut-away view of a check valve in a reservoir dispenser when in an open or activated position.

DETAILED DESCRIPTION OF EXEMPLARY EMBODIMENTS

The following description is presented to enable a person of ordinary skill in the art to make and use embodiments described herein. Descriptions of specific devices, techniques. and applications are provided only as examples. Various modifications to the examples described herein will be readily apparent to those of ordinary skill in the art, and the general principles defined herein may be applied to other examples and applications without departing from the spirit and scope of the disclosure. Thus, the disclosure is not intended to be limited to the examples described herein and shown but is to be accorded the scope consistent with the claims.

The word "exemplary" is used herein to mean "serving as an example illustration," Any aspect or design described herein as "exemplary" is not necessarily to be construed as preferred or advantageous over other aspects or designs.

Reference will now be made in detail to aspects of the subject technology, examples of which are illustrated in the accompanying drawings, wherein reference numerals refer to like elements throughout.

It should be understood that the specific order or hierarchy of steps in the process disclosed herein is an example of exemplary approaches. Based upon design preferences, it is understood that the specific order or hierarchy of steps in the processes can be rearranged while remaining within the scope of the disclosure. Any accompanying method claims present elements of the various steps in, a sample order, and are not meant to be limited to the specific order or hierarchy presented.

The embodiments disclosed herein describe a new, clean and hygienic washing bidet. The various embodiments include one or a plurality of water inlets, a control means housing one or a plurality of control valves to control the flow of water from the water inlets to one or a plurality of water tubes, one or a plurality of washing nozzles, a protective shield gate, and securing unit configured to securing the sanitary washing device to the toilet seat.

The disclosed embodiments directed to clean and hygienic bidet washing apparatus 100 attachable to an existing toilet, for cleaning the body parts of the user sitting on or near the toilet.

As described herein, a "bidet" is a toilet attachment for cleaning the body parts of the user.

As described herein, the term "water inlet" means any structure that may provide water to the bidet washing apparatus.

As described herein, a "control unit" (aka "control panel") is the housing which has "control switch(s)" thereon controlling the various functionalities of the bidet, including but, not limited to, the flow of water, adjusting the angle of the nozzles, and opening and closing the protective shield gate.

As described herein, "control valves" are, controller parts located inside the control panel housing which control the flow of water or other fluids from the water inlet(s) to one or more "water tubes" by opening, closing, or partially obstructing various passageways.

As described herein, "water tubes" are channels that connect the control valves to a "nozzle assembly," wherein, the "nozzle assembly" includes a single nozzle or a collection of nozzles including at least one "washing nozzle."

As described herein, a "nozzle" is a device designed to eject water or other fluids into the surrounding medium as a coherently controlled spray.

As described herein, the "washing nozzle" is the nozzle that can be used to wash the body parts of a user.

As described herein, the "nozzle assembly" may also have other types of nozzles such as a "self-cleaning nozzle," which is used to clean the nozzle assembly itself, a "toilet cleaning nozzle," which is used to clean the bidet and/or the toilet, and a "shield cleaning nozzle," which is used for cleaning the "protective shield gate."

As described herein, the "protective shield gate" is a structure placed at least partially in front of the nozzle assembly (e.g., between the user and the nozzle assembly) to protect the nozzle assembly from pollutants.

As described herein, the "protective shield gate" has a "hinged" edge. The term "hinged" here means a joint that allows the turning or pivoting of the gate, by any conventional turning or pivoting mechanism.

As described herein, the term "fluidically coupled" means a connection or a passageway that allows fluid to flow therethrough.

As described herein, the term "reservoir" means a fluid holding tank.

Accordingly, in one embodiment the disclosure provides a bidet washing apparatus attachable to a toilet bowl for cleaning one or more body parts of a user. The apparatus can include one or more water inlets configured to supply water, and a control unit, housing one or more valves fluidically connected to the one or more water inlets, including one or more control switches configured to operate the one or more valves. As such, one or more valves can control water flow from one or more water inlets. The apparatus can further include a nozzle assembly including at least one washing nozzle, fluidically connected to at least one of the one or more valves with one or more water tubes. At least one washing nozzle can be positioned for directing water to one or more body parts of the user. The apparatus can also include a protective shield gate covering at least a portion of at least one washing nozzle, where the protective shield gate is rotatably coupled to the bidet washing apparatus.

According to various embodiments, the protective shield gate can be rotatably coupled to the apparatus along a side or top edge via a hinge, for example, to allow for the manual or electrical opening and closing of the protective shield gate. In this matter, the nozzle(s) are easily accessible for cleaning, removal, replacement, or another adjustment while the protective shield gate is open. In an alternative embodiment, the protective shield gate can be completely removed to similarly provide access to the nozzle(s).

According to another embodiment, the water inlet(s) can be fluidically connected to one or more valves via a single-body connector without any intervening parts or joints, which results in a more robust, long-lasting, bidet washing apparatus, since leaks or other damage to the fluidic couplings are less likely to occur.

Figure 1:
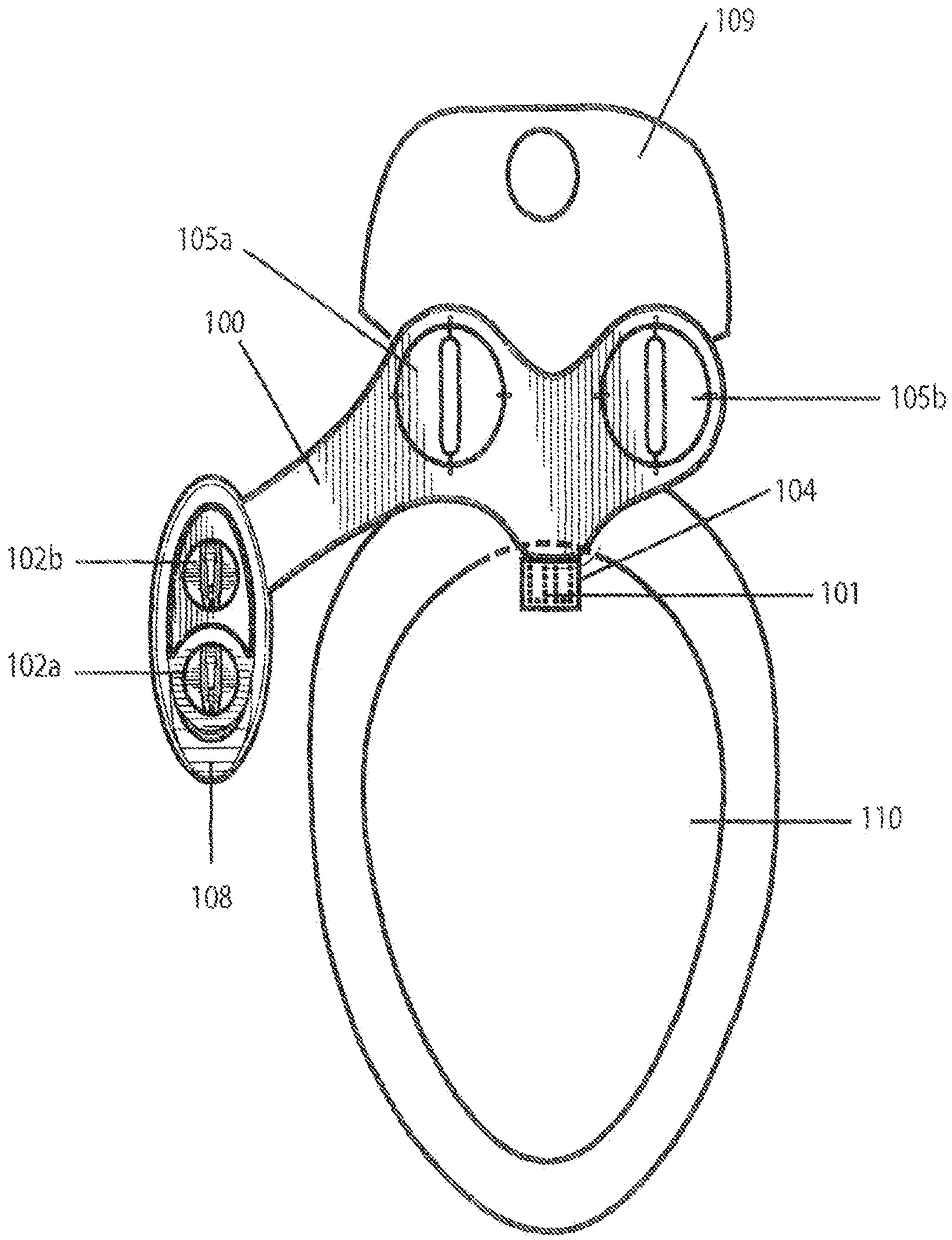
FIG. 1 illustrates an embodiment of a perspective view of an exemplary bidet washing apparatus installed on an existing toilet seat, with a seat cover-up.
Figure 2:
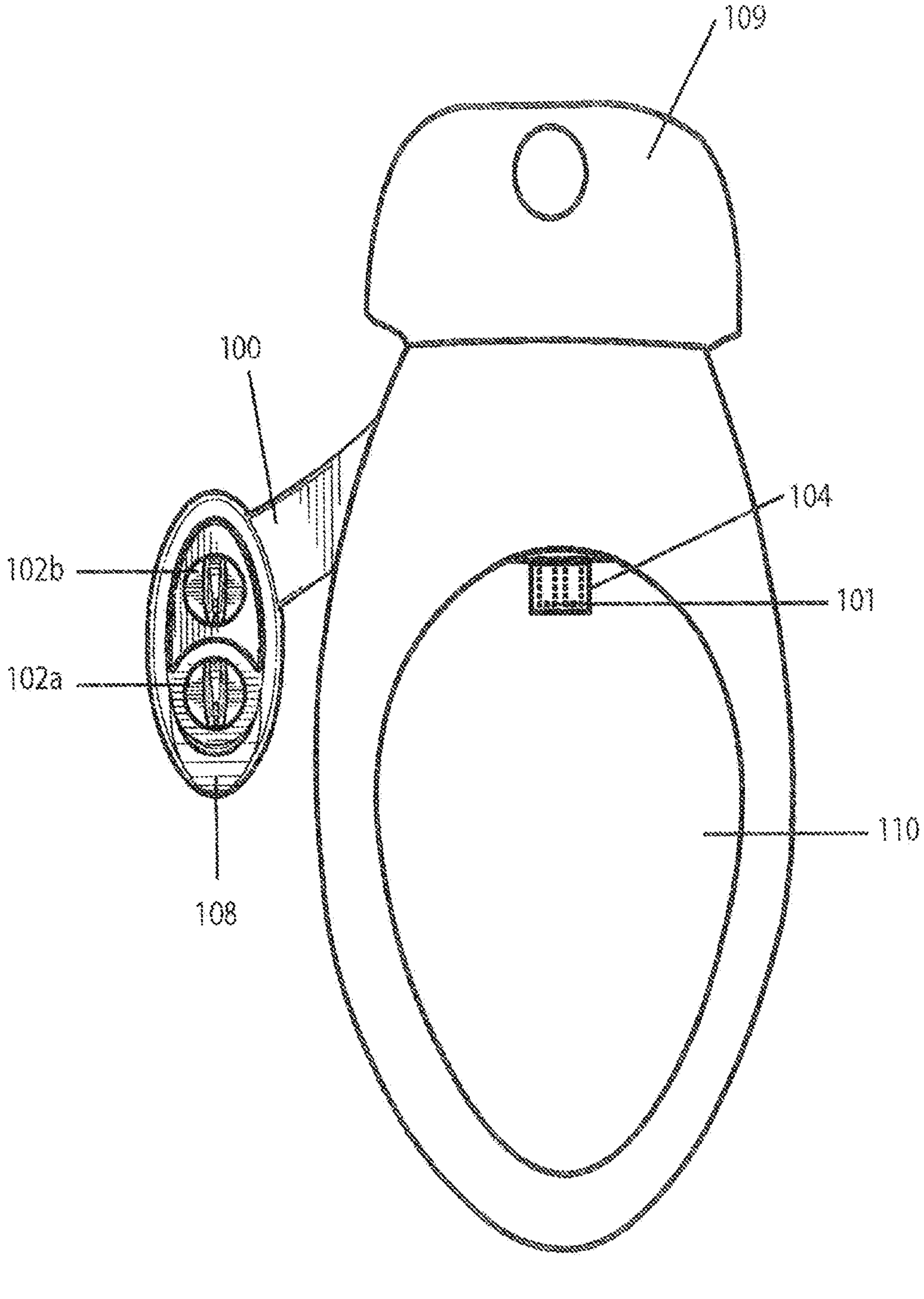
FIG. 2 illustrates an embodiment of a perspective view of a bidet washing apparatus installed on an existing toilet seat, with a seat cover down.

Referring to FIG. 1 and FIG. 2, the bidet washing apparatus 100 of the disclosure can be mounted on a toilet bowl 110 using securing mechanisms 105*a* and 105*b*. Any conventional securing unit can be implemented, e.g., one or more screws. A toilet seat 112 can pivot around and can be connected to a rear portion of the toilet bowl 110. On the rear portion of the toilet bowl, 110 can be mounted a refillable toilet tank 109, in which an amount of water can be stored. In certain embodiments, toilet tank 109 can be used as the water source for the bidet washing apparatus 100 by a fluidic connection. On the bidet washing apparatus, 100 can be mounted a nozzle assembly 101, which includes at least one washing nozzle (not shown) for washing the body parts of the user sitting on or near the toilet bowl 110. The body of the bidet washing apparatus can be made of any suitable material, including but not limited to, plastics, polymers, reinforced polymeric materials, wood, metal and the like, and any combination thereof.

Figure 3:
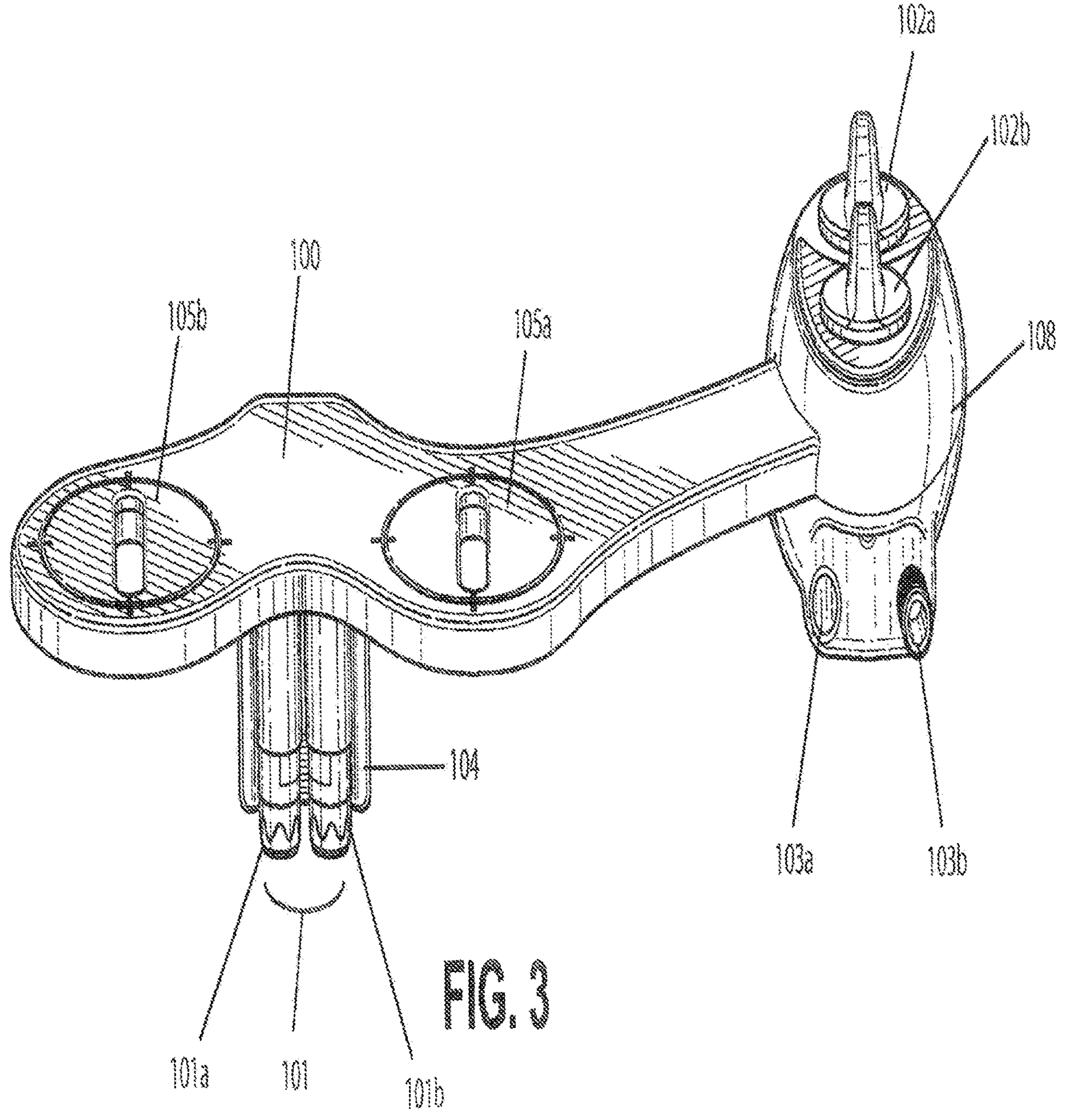
FIG. 3 illustrates an embodiment of a perspective view of an exemplary bidet washing apparatus.

FIG. 3 shows one exemplary embodiment of a bidet washing apparatus 100 with two washing nozzles 101*a* and 101*b*, respectively. However, in an installation, a lesser or greater number of nozzles can be used. Each washing nozzle can spray a stream of water upwardly and inwardly, according to various embodiments.

As shown in FIG. 2 and FIG. 3, a control unit 108 can be provided the easy access for the user, and houses control switches 102*a* and 102*b* for providing operational instructions to the bidet washing apparatus 100. The depicted example shows two switches 102*a* and 102*b*; however, one of ordinary skill in the art would realize that any number of switches can be provided for performing various operations without departing from the scope of the disclosure. Some examples of operational instructions include, but are not limited to, controlling the flow of water from the water inlet, changing the angle of the washing nozzles, and opening and closing the protective shield gate (described in further detail below). The type of control switches can be selected from a group including knobs, dials, levers, depressible buttons, or any conventional control mechanism, An installation may have all similar control switches where both control switches 102*a* and 102*b* are knobs.

Figure 9:
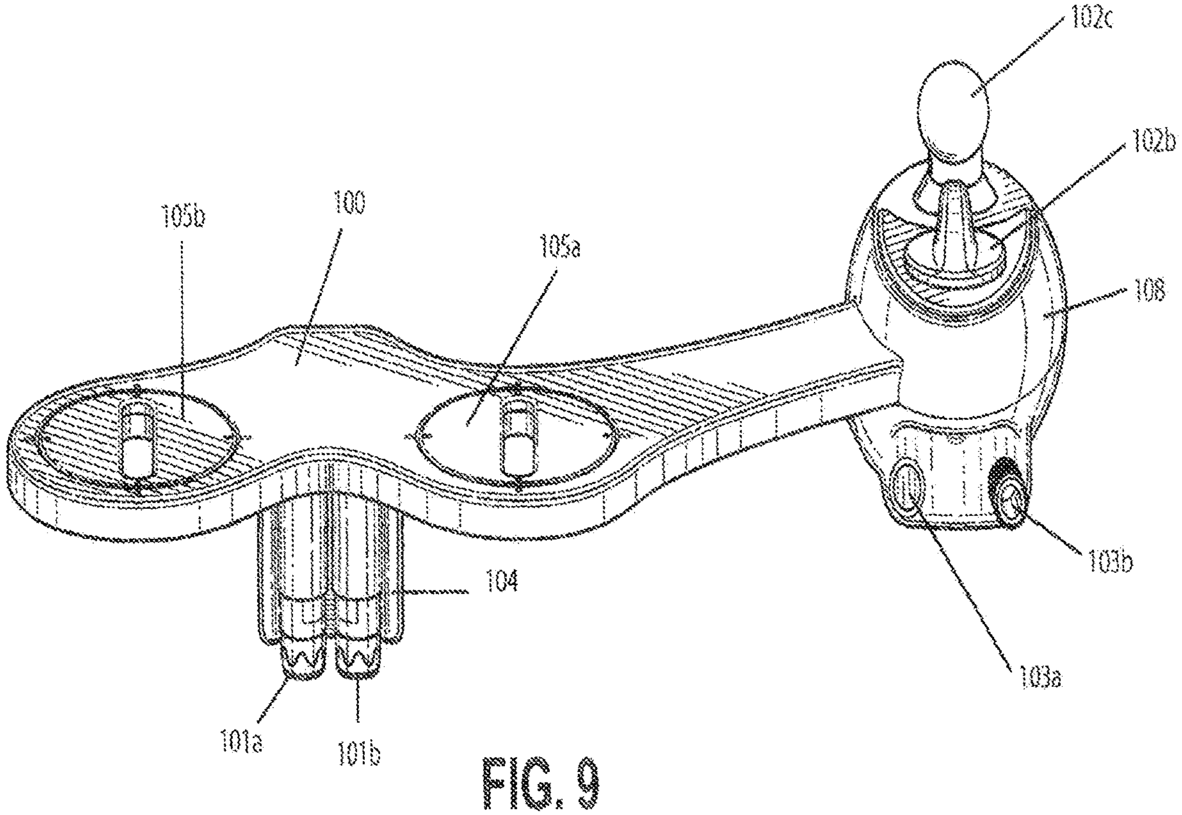
FIG. 9 illustrates an embodiment of a perspective view of an exemplary bidet washing apparatus.

On the other hand, FIG. 9 shows an embodiment of the disclosure where one of the control switches 102*b* is a knob and the other control switch 102*c* is a lever.

Furthermore, as shown in FIG. 1 and FIG. 2, the nozzle assembly 101 can have a protective shield gate 104 substantially or partially in front of it. The position of the protective shield gate 104 is such that it can act as a shield between the user's body and/or water in the toilet bowl 110 and the nozzle assembly 101 thus protecting the nozzle assembly 101 from pollutants during use.

Certain aspects of the bidet washing apparatus will be detailed hereinafter concerning FIGS. 3-9.

FIG. 3 shows a front perspective view of one embodiment described herein. Referring to FIG. 3, the bidet washing apparatus 100 includes the water inlets 103*a* and 103*b* to feed water into the bidet. The water inlet can be controlled by the user using the control switches 102*a* and 102*b* situated on the control unit 108. The water from the water inlets 103*a* and 103*b* can be ultimately provided to the nozzle assembly 101 via tubes (as described in greater detail concerning FIG. 7, for example). The nozzle assembly shown in this aspect of the disclosure has two washing nozzles 101*a* and 101*b*. The protective shield gate 104 protects the nozzle assembly 101 from excrement and pollutants as described above. In this example, the protective shield gate 104 is positioned in front of the nozzle assembly 101 of the bidet such that it is between the user sitting on the toilet seat, for example, and the nozzle assembly. Hence, when the user is using, the toilet, the nozzles are shielded behind the protective shield gate 104 and do not become polluted.

Figure 5:
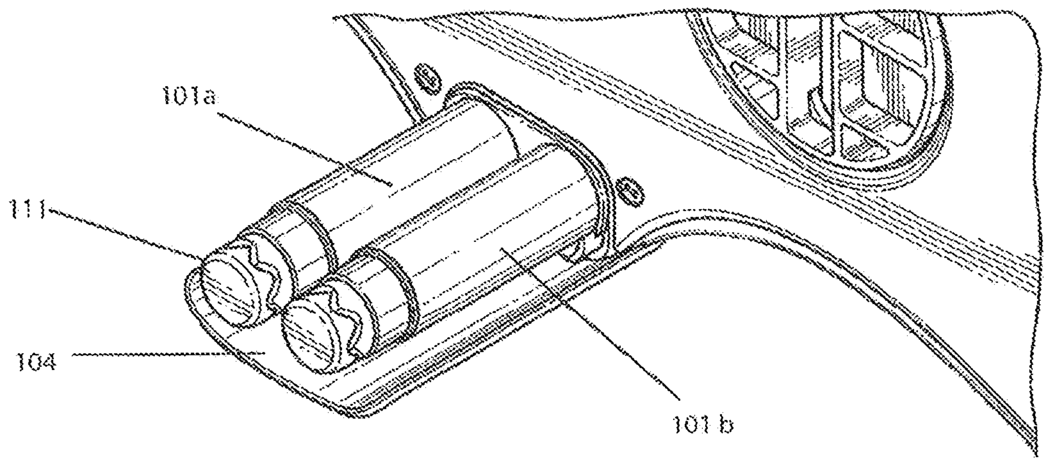
FIG. 5 illustrates an embodiment of a fragmentary view of an exemplary bidet washing apparatus illustrating a gate shield protecting the nozzle assembly in a closed position.
Figure 6:
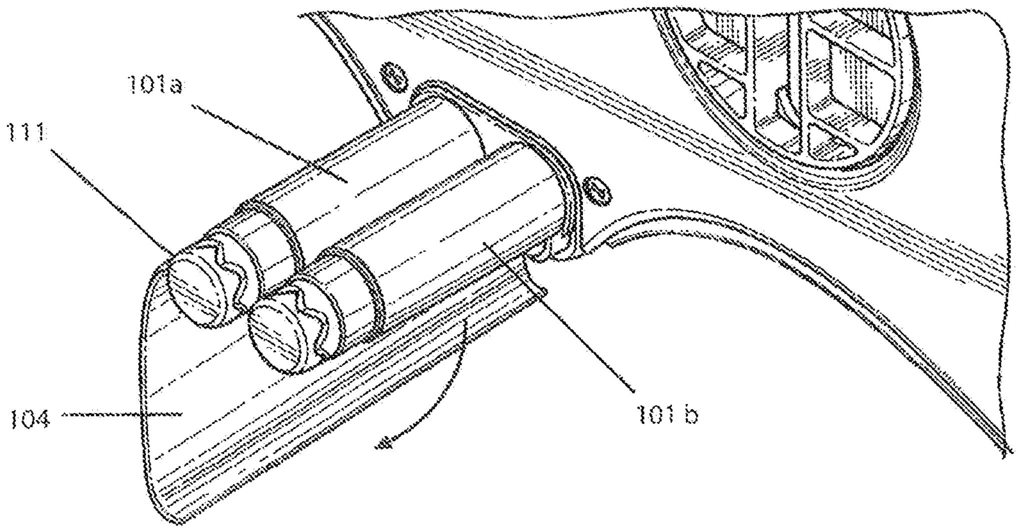
FIG. 6 illustrates an embodiment of a fragmentary view of an exemplary bidet washing apparatus illustrating a shield gate protecting the nozzle assembly in an open position.

Referring to FIGS. 5-6, the protective shield gate 104 can be movable along a hinged edge 111 to provide for further hygiene. The protective shield gate 104 rotates and thus can be manual, for example, opened (FIG. 6) and closed (FIG. 5), after using the toilet to clean any minute leftover pollutants on the outer covering of the nozzle assembly to ensure complete cleanliness. In the embodiment, the user can open and close the gate manually and, thus, the gate can stay in the opened or closed position that the user places the gate. In certain embodiments, the gate can be opened and closed by an electrical signal using a control switch located on the control unit 108, which can allow the gate to remain open until the user closes the gate via the control switch, so the user can clean the nozzle. In other embodiments, the hinged edge 111 is on the top of the protective shield gate 104, and not, on the side edge as shown in the illustrative FIGS. 5-6. hi. yet other embodiments, the user may be able to completely remove the protective shield gate 104 for cleaning the nozzle(s) and reattach it after cleaning. Of course, one of ordinary skill in the art would understand that the hinged edge could comprise any rotatable joint mechanism that allows for, the rotation of the protective shield gate 104 to provide efficient access to the nozzle(s). If the protective shield gate 104 is completely removable, a grooved and slideable mechanism can be employed so that the protective shield gate 104 can slide in and out to be attached and removed. Of course, other mechanisms can be utilized for removably attaching the protective shield gate 104, e.g., a magnet or a snap structure.

In certain embodiments, the protective shield gate 104 has a flap portion perpendicular to the protective shield gate 104 such that it covers the bottom of the nozzle assembly 101. Additionally, the flap can have a spring mechanism such that it is pushed out and aligns with the protective shield gate 104 by the force of the water stream when water flows out of the nozzle assembly 101. When the water flow stops, the flap can spring hack into its original position perpendicular to the shield gate 101.

The protective shield gate 104 of the disclosure can be made from a material selected from plastic, metal, a material having anti-microbial properties, and material with increased pollutant repellant properties.

In certain embodiments, the angle of the washing nozzles can be adjusted using a control switch located on the control unit 108. Thus, when a user wants to clean certain body parts, water can be sprayed on the desired body part by adjusting the angle of the washing nozzle(s). As shown in FIG. 3, the height of the protective shield gate is such that it allows for an uninterrupted spray of water from the nozzle assembly 101, since the nozzle assembly 101 can extend beyond the bottom edge of the protective shield gate 104.

Figure 4:
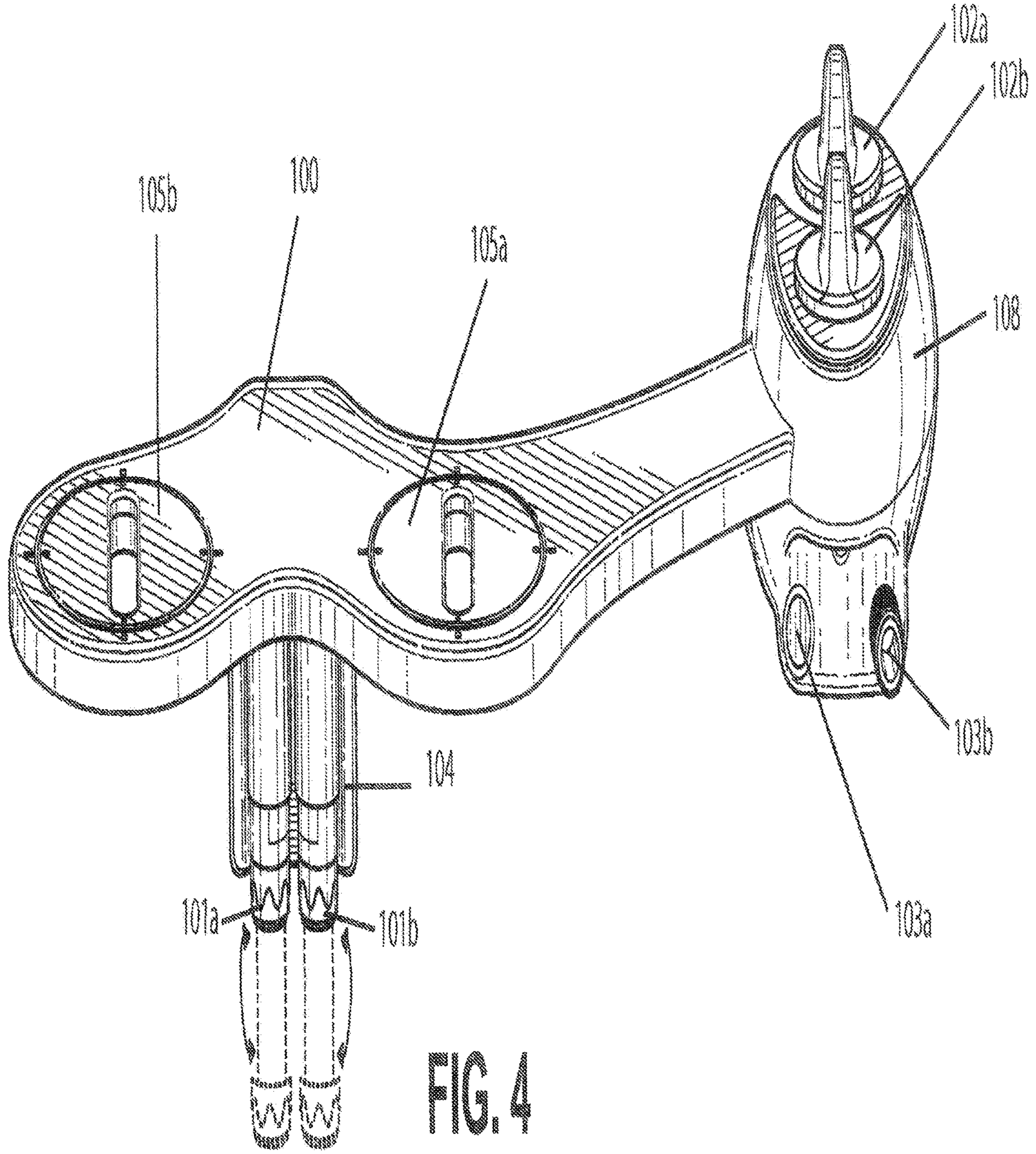
FIG. 4 illustrates an embodiment of a perspective view of an exemplary bidet washing apparatus, with dotted lines showing nozzles extended outwards.

FIG. 4 shows another embodiment wherein the height of the protective shield gate is equal to or greater than that of the washing nozzles 101*a* and 101*b*. Here, the washing nozzles 101*a* and 101*b* are housed within an outer covering including a spring mechanism for pushing the washing nozzles out when water flows through the washing nozzles such that the water flow is not interrupted by the protective shield gate 104. Each washing nozzle includes an outer covering and an inner nozzle operated slidably hack and firth with hydraulic pressure of the supplied washing water by an instruction from the control unit 108. During the use of the washing nozzles, the nozzles are extended from their outer covering below the length of the shield gate by the hydraulic force of the washing water, and water is sprayed on the user for cleaning purposes. After use, when the water flow is stopped, the nozzles are retracted in their outer covering which is hidden behind the shield gate. In certain other embodiments, the user may control the movement of the washing nozzle by using the control unit 108, instead of the hydraulic pressure. When an instruction of a washing operation is given by the control unit 108, a washing nozzle driving unit is activated to advance the nozzle. The washing nozzle angle can also be adjusted by an instruction given by the control unit 108 to position the nozzle for cleaning. Thus, the washing nozzle can reach the user's desired washing position by the combined advancement of the nozzle and/or the angular positioning.

According to the embodiment, nozzle assembly 101 includes at least one washing nozzle in yet another embodiment, the bidet washing apparatus 100 further includes a self-cleaning cleaning nozzle for cleaning the nozzle assembly itself. The self-cleaning nozzle can be positioned to spray water onto the nozzle assembly 101 and/or washing nozzle(s) before and/or after the usage for additional hygiene. The self-cleaning nozzle can be adapted to be controlled by the control unit 108, and thus provides an additional hygiene level.

Another embodiment includes a toilet cleaning nozzle for cleaning the toilet and the bidet before and after use of the toilet. The toilet cleaning nozzle can be positioned to spray water on the toilet bowl 110 and/or the bidet washing apparatus 100 and can be controlled by the control unit to provide additional hygiene. Yet, another embodiment includes a shield cleaning nozzle for cleaning the protective shield gate 104. The shield cleaning nozzle can be similarly controlled by the control unit 108. Additionally, the shield cleaning nozzle can be positioned to clean the protective shield gate 104 in an open and/or closed position.

Any or all of the washing nozzles can be connected to the nozzle assembly 101 via a ball joint, for example. which could allow the user to manually swivel a washing nozzle around 360 degrees, to direct the spray of water in a desired and precise direction. Of course, other types of joints and connectors could be implemented to allow for the manual swivel or direction correction, as desired by the user to spray water to the desired body part, for example.

Moreover, according to an exemplary embodiment, e or more of the washing nozzle(s) 101*a* and 101*b* can be connected to the nozzle assembly 101 by a mechanism allowing for the easy removal of the nozzle(s) 101*a* and 101*b*. For example, the washing nozzle(s) 101*a* and 101*b* can slide into place via a grooved portion of the nozzle assembly 101 or could otherwise snap into place. Any conventional mechanism of removably attaching the nozzle(s) 101*a* and 101*b* can be implemented, so that the user can swap the nozzle(s) 101*a* and 101*b* with other nozzles or increase or reduce the number of washing nozzle(s) 101*a* and 101*b* connected to the nozzle assembly 101.

Figure 7:
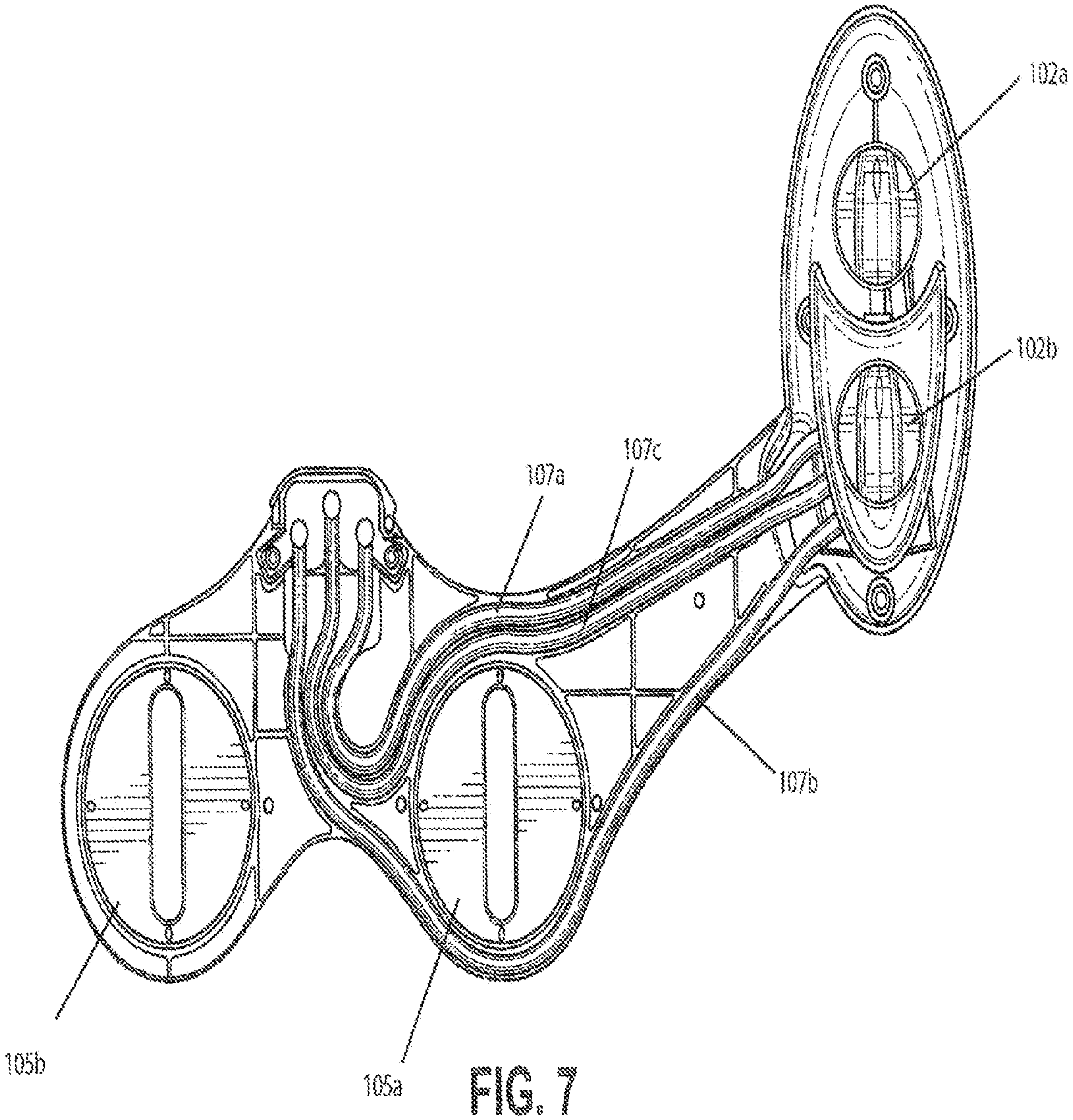
FIG. 7 illustrates an embodiment of a top plan view of an exemplary embodiment.
Figure 8:
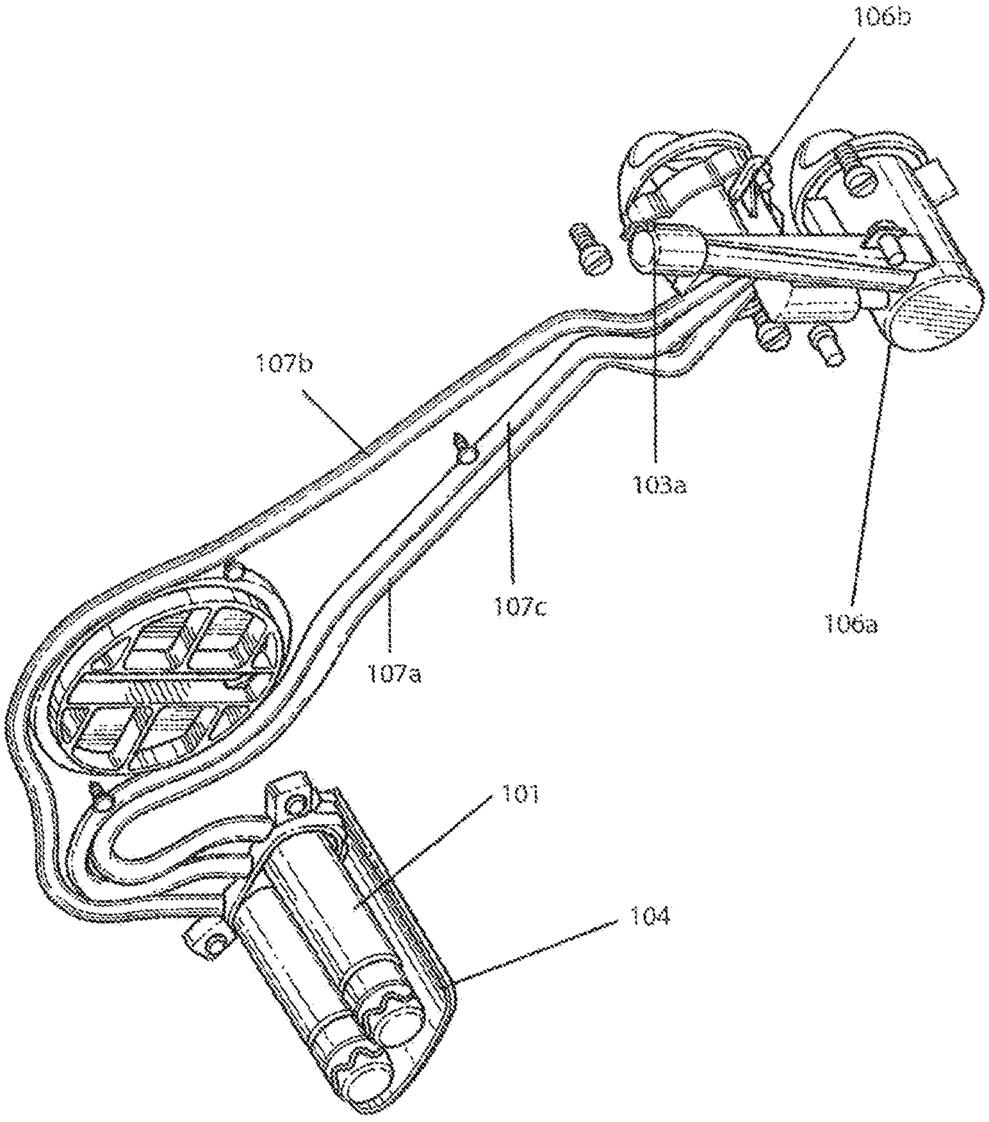
FIG. 8 illustrates an embodiment of a bottom plan view of a perspective view of a bidet washing apparatus.

An exemplary water supply system to the nozzle assembly 101 will be detailed hereinafter concerning FIGS. 7-8. The control unit 108 can house the control valves 106*a* and 106*b* (as shown in FIG. 8), to control the flow of water to the water tubes and has the control switches 102*a* and 102*b*, for giving instructions to the control valves. Two control valves and control switches are depicted for exemplary purposes, but it should be understood that any number of control valves and corresponding switches can be employed.

The control valves 106*a* and 106*b* can be situated at the entrance to the water tubes 107*a*, 107*b*, and 107*c* in this example. The control valves 106*a* and 106*b* are designed to open, close, or partially obstruct the water inlet 103*a* opening into the water tubes 107*a*, 107*b*, and 107*c*, such that the volume of the water flowing through any tube at any given time can be easily controlled by the user by giving simple instructions through the control switches. The water tubes 107*a*, 107*b*, and 107*c* connect the control valves 106*a* and 106*b* at one end to the nozzle assembly 101 at the other end. Thus, the control valves 106*a* and 106*b* can effectively control the volume of water flowing to the nozzle assembly 101. In the embodiment, one water tube 107*b* passes through the back of the bidet washing apparatus 100, and two water tubes 107*a* and 107*c* pass through the front of the bidet washing apparatus 100. However, it is to be noted that in an embodiment, more than one water tube could pass through the back of the bidet washing apparatus 100, and the number of water tubes passing through the front of the bidet washing apparatus 100 could be more or less than two.

According to an embodiment, the bidet washing apparatus 100 can include a vacuum breaker (not depicted), which can be situated at various locations within the bidet washing apparatus 100. The vacuum breaker can be located anywhere between the water supply (e.g., the water tank supplying water to the toilet bowl) and the washing nozzle(s) e.g., 101*a* and 101*b*) output. The vacuum breaker can be intended to halt the flow of water that is not expelled by the washing nozzle(s) back into the water supply. According to one exemplary embodiment, the vacuum breaker(s) can be housed within the control unit 108, located between a valve 106*a* and 106*b* and the nozzle assembly 101; however, one of ordinary skill in the art would realize that various locations of one or more vacuum breakers can be implemented within the scope of this disclosure to perform the desired function.

Figure 10:
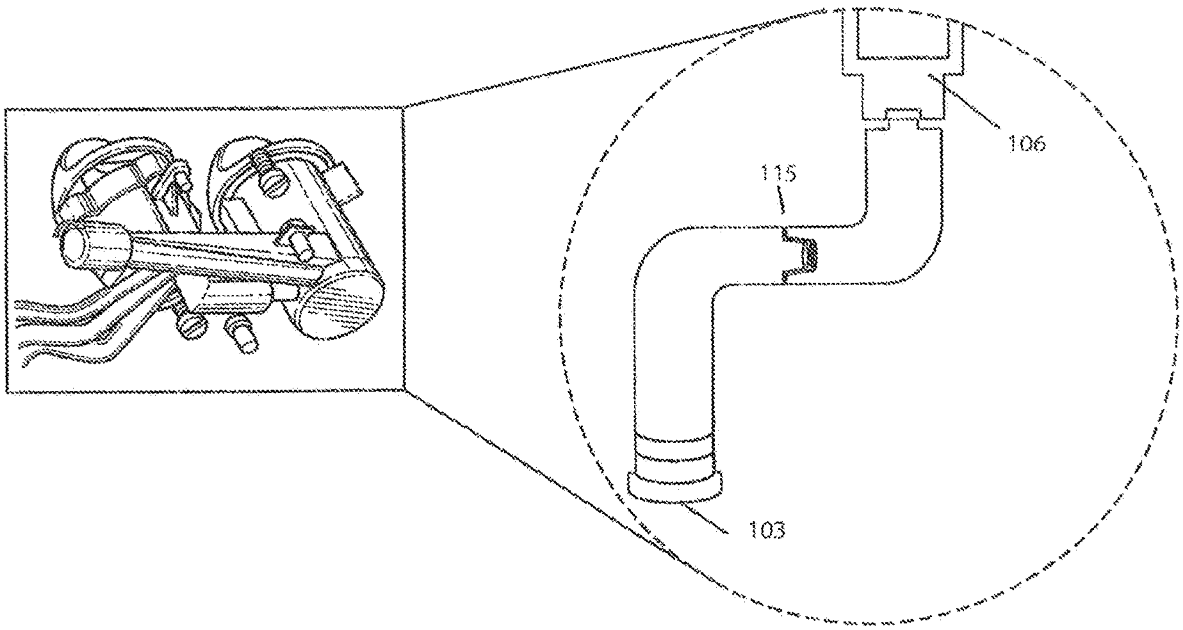
FIG. 10 illustrates an embodiment of a schematic showing a single connection between a water inlet and a control valve inside a control, panel.

In one exemplary embodiment, each water inlet 103*a* and 103*b* is connected to a control valve 106*a* and 106*b* by a single, non-jointed, connection 115 (see FIG. 10) thereby removing any intervening parts and extra connections, which can considerably increase the durability and lifetime of the bidet system. Of course, multiple water inlets 103*a* and 103*b* could be connected to a single control valve; however, each connection between the water inlets 103*a* and 103*b* and the single control valve can be a single-body structure, according to one embodiment.

In an embodiment, the washing nozzle can be replaced with a nozzle that is configured to hold materials such as soap, disinfectant, or any cleaning or medicinal, a substance that can be expelled along with water as it flows through the nozzle. For example, such materials could be in a solid, semi-solid, or liquid form, which dissolves at a predetermined and desired rate, as the water flows through the nozzle and is carried out of the nozzle by the spraying water.

In another embodiment, the bidet washing apparatus can contain one or more reservoir dispensers or chambers, which can be configured to hold materials such as soap, disinfectant, or any cleaning or medicinal substance that can be expelled along with water through one or more water tubes to the nozzle assembly and car be carried out of one or more nozzles by the spraying water. As before, the above-mentioned materials are provided merely for exemplary purposes and are not intended to limit the disclosure in any way. Other known substances and/or materials could be held and/or stored in a nozzle or reservoir dispenser to be expelled with water through the nozzle.

Figure 11:
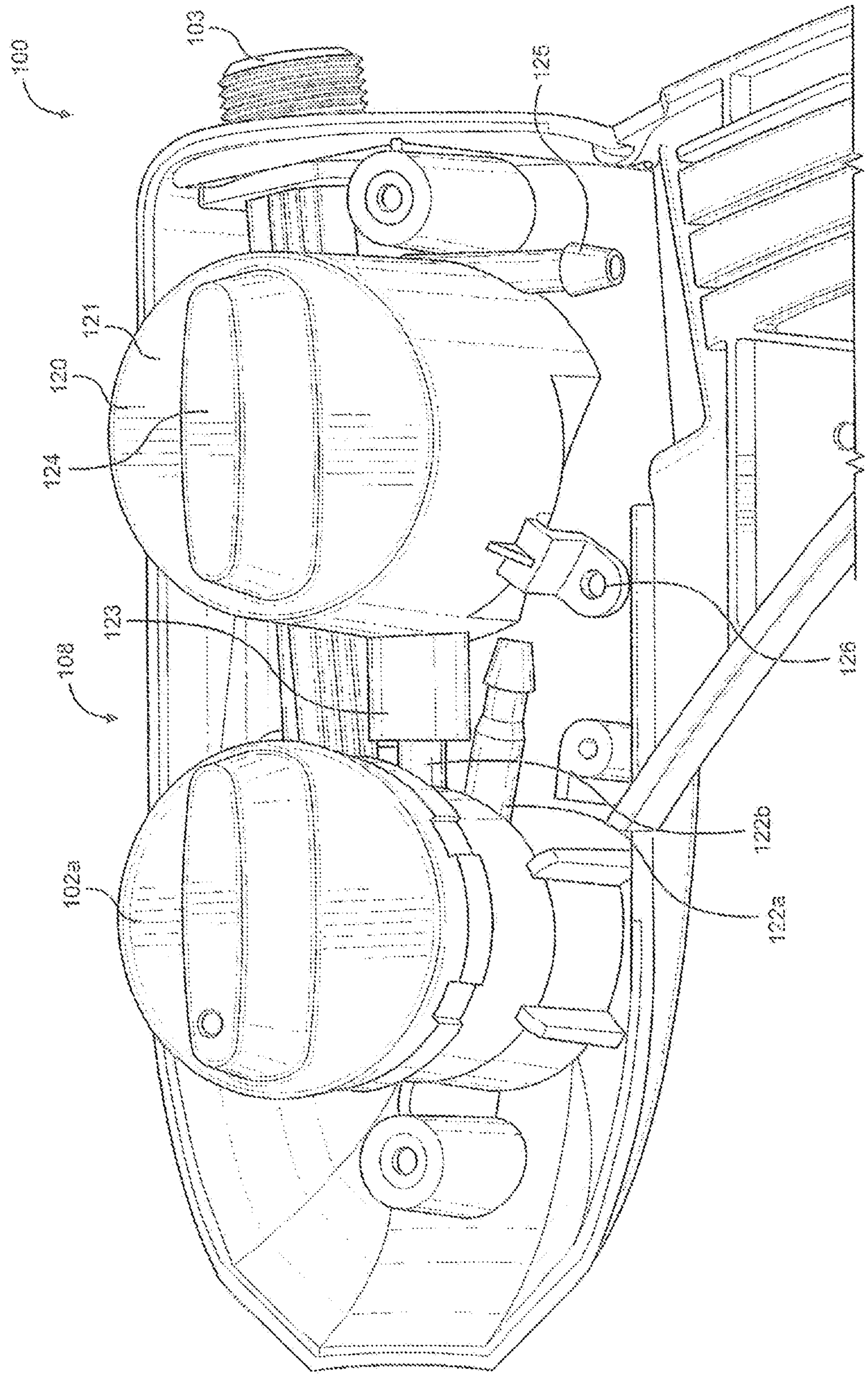
FIG. 11 illustrates a cut-away view fan embodiment of a top view of a bidet washing apparatus.

FIG. 11 illustrates a cut-away view of an embodiment of a top view of a bidet washing apparatus 100, i.e., without showing the entire body of the apparatus. In this figure, the apparatus includes water inlet 103*a*, which is fluidically connected to control unit 108 to supply water. The control unit includes control unit switch 102*a*, which is configured to operate one or more control unit valves or openings (not shown) for controlling water flow from the water inlet and control unit outlets 122*a* and 122*b*.

As shown, the apparatus also includes a reservoir dispenser 120 having one or more compartments (not shown) with a removable lid 121 for holding soap and/or disinfectant. The control unit outlets, 122*a* and 122*b* allow for the transfer of water from the control unit to the nozzle assembly 101 via water tube 107*a* and/or 107*c* (see FIGS. 3-9); and to a reservoir dispenser 120 via reservoir dispenser inlet 123, respectively.

The reservoir dispenser 120 allows for mixing of the transferred water with the soap and/or disinfectant present in the one or more compartments of the dispenser to provide a soapy and/or disinfectant solution or mixture. The reservoir dispenser 120 includes reservoir dispenser switch 124, which is configured to operate one or more reservoir dispenser valves or openings (not shown) for controlling water flow from the control unit and/or from reservoir dispenser outlet 125.

Once mixed, the solution or mixture in the one or more compartments of the reservoir dispenser 120 can be transferred through the reservoir dispenser outlet 125 to the nozzle assembly 101 via water tube 107*a*, 107*b*, or 107*c* (see FIG. 9), and provide the solution or mixture for washing and cleaning the nozzle assembly and shield gate.

Also shown in this figure is a plurality of tabs with openings 126, which can be used as a securing mechanism for securing the control unit and reservoir dispenser to the body of the apparatus using screws, bolts, snaps, and the like.

Figure 12:
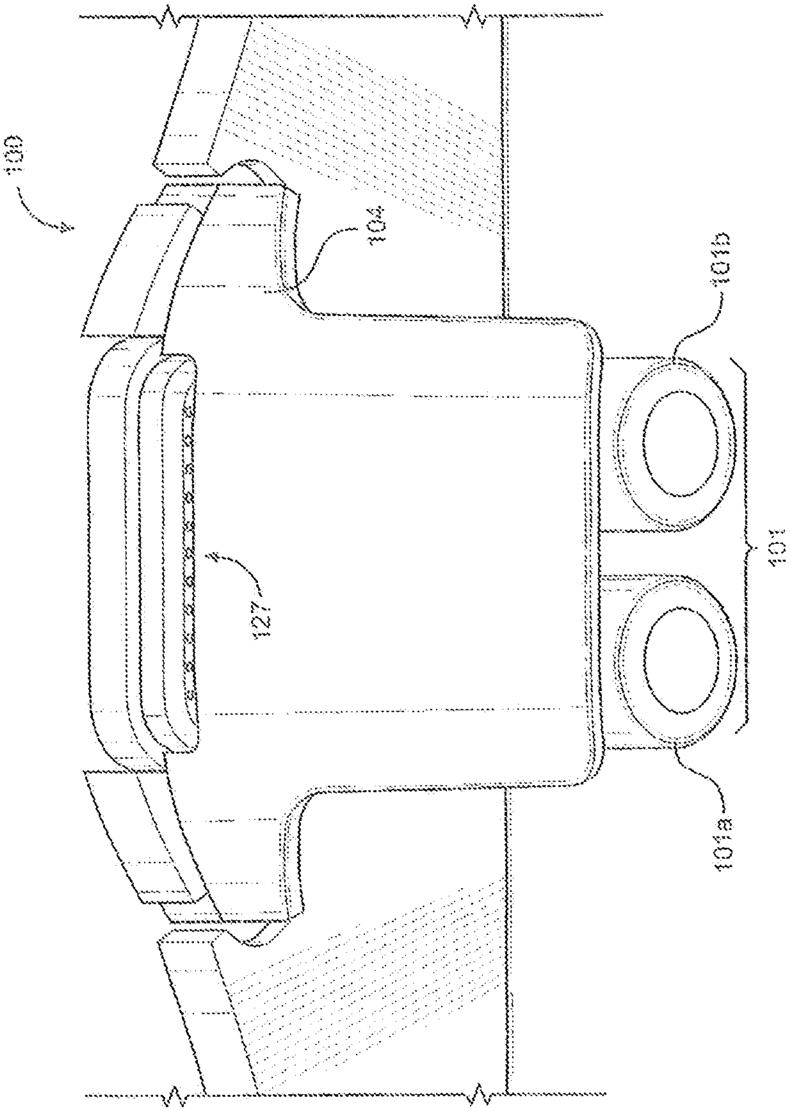
FIG. 12 illustrates a cut-away view of an embodiment of a bottom view of a bidet washing apparatus, showing nozzle assembly including washing nozzles and a shield gate.

FIG. 12 illustrates a cut-away view of an embodiment of a bottom view of a bidet washing apparatus 100, showing nozzle assembly 101 including washing nozzles 101*a* and 101*b*, and protective shield gate 104. This figure also illustrates one or more water openings 127 located above the nozzle assembly, which allow the solution or mixture transferred through water tube 107*a*, 107*b*, or 107*c* to wash and/or clean the nozzle assembly and shield gate.

Figure 13A:
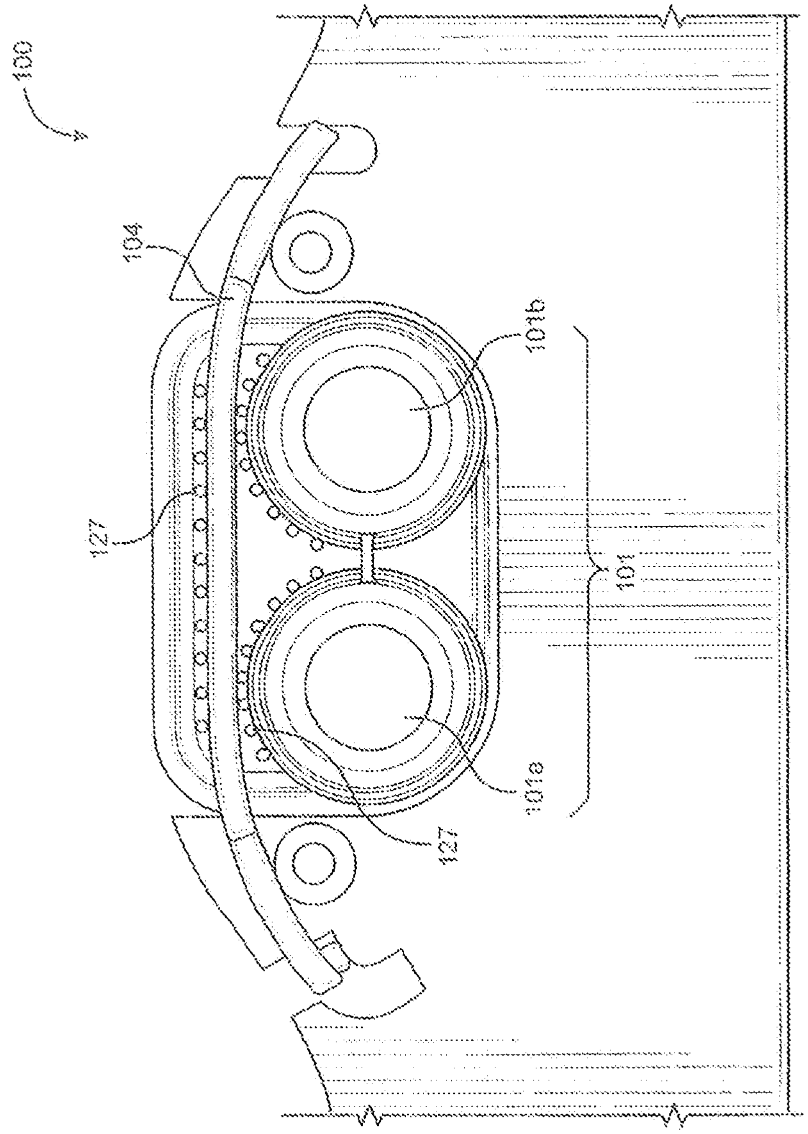
Figure 13B:
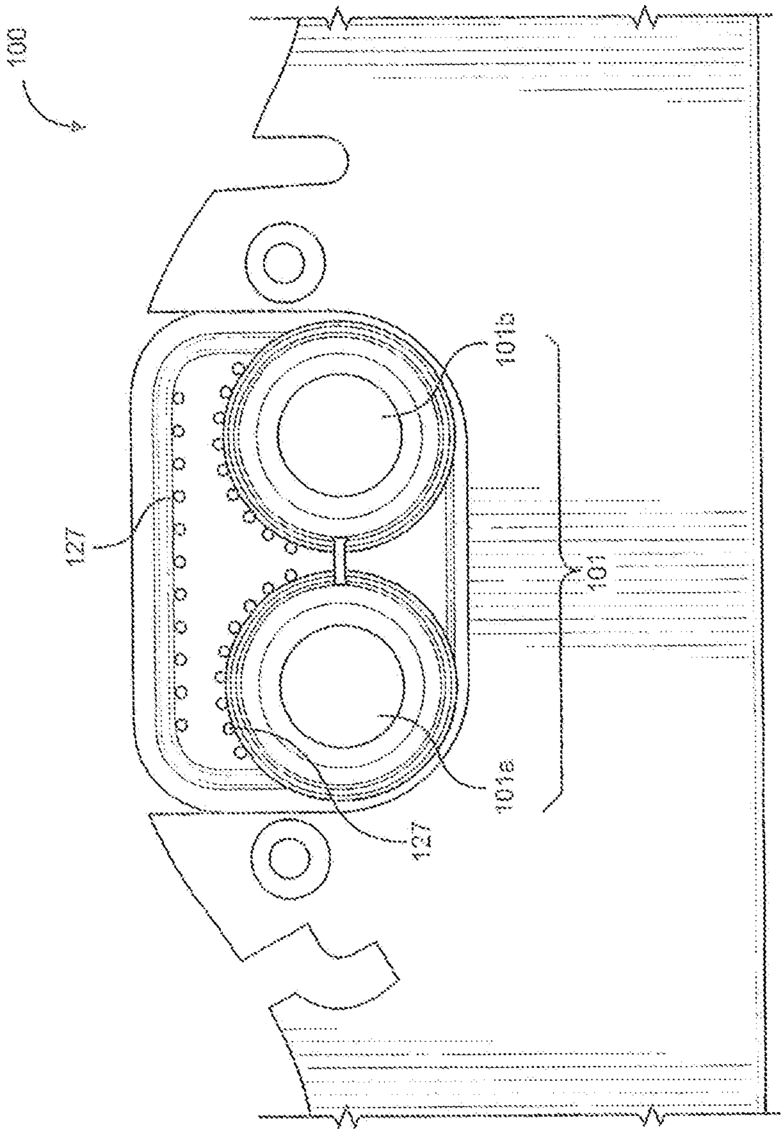

FIGS. 13*a* and 13*b* illustrate a cut-away view of an embodiment of a bottom view of the nozzle assembly 101, washing nozzles 101*a* and 101*b*, and the one or more water openings 127 with and without the protective shield gate 104, respectively. As shown in these figures, one or more openings can be configured to wash one or both sides of the shield gate.

FIG. 14 illustrates a cut-away view of an embodiment of a top view of a bidet washing apparatus 100, showing a one compartment reservoir dispenser 120 with the lid removed.

As shown, inside the reservoir dispenser 120 is an opening 128 in the reservoir dispenser inlet 123, which allows for the flow of water from the control unit switch 102*a* into the compartment of the reservoir dispenser.

Also shown in this figure are the water inlet 103*a*, control unit 108, control unit outlets 122*a* and 122*b*, reservoir dispenser inlet 123 reservoir dispenser outlet 125, and securing mechanisms 126.

FIG. 15 illustrates a view of lid 121, which can be removably attached to the reservoir dispenser. The lid 121 can include the reservoir dispenser switch 124 and a lower securing gate 129 for securing cleaning and/or disinfection materials in solid or tablet form. Alternatively, the lower securing gate can include one or more filters or screens for securing the cleaning material, which can allow water to flow over the cleaning and/or disinfection materials to provide the desired solution.

The reservoir dispenser and lid can be of any type of complementary securing device to make up the dispenser, e.g. a threaded dispenser and screw-on lid, a dispenser with a snap-on lid, etc. In addition, the dispenser and or lid can include one or more washers or O-rings (not shown), or any other similar type of device for securing a water-tight seal between the dispenser and lid.

FIG. 16 illustrates a cut-away view of an embodiment of a bidet washing apparatus 100 with a reservoir dispenser 120 and a removable lid 121. In this figure, the apparatus includes water inlet 103*a* connected to control unit 108 having control switch 102*a*. The first control switch can act as an on/off switch for the incoming and outgoing water. In the on position, water can be transferred from the first control switch to control switch 102*b* via control unit outlet 122*a* and control unit inlet 130. The control switch 102*b* includes two water outlets 122*c* and 122*d* for transferring water to the nozzle assembly 101 via water tubes 107*a*, 107*b*, or 107*c*. The control switch 102*b* also includes a water outlet 122*b* (not shown) for transferring water to the reservoir dispenser 120 via reservoir dispenser inlet 123. Ultimately, the resulting solution or mixture in the reservoir dispenser can be transferred, to nozzle assembly 101 for cleaning purposes via reservoir dispenser outlet 125 and water tube 107*a*, 107*b*, or 107*c* (not shown).

FIG. 17 illustrates a cut-away view of an embodiment of a bidet washing apparatus 100 with a reservoir dispenser 120 and a removable lid 121. In this figure, the apparatus includes separate water inlets 103*a* and 103*b*, which can be used for transporting cold and/or hot water to the control switch 102*a*. The apparatus also includes water inlet 103*a* connected to control unit 108 having control switch 102*a*, which can be configured as a handle or lever. As before, the first control switch can act as an on/off switch for the incoming and outgoing water. In the on position, water can be transferred from the first control switch to control switch 102*b* via water outlet 127*a* and water inlet 130. The control switch 102*b* includes two water outlets 122*c* and 122*d* for transferring water to the nozzle assembly 101 via water tubes 107*a*, 107*b*, or 107*c*. The control switch 102*b* also includes a water outlet 122*b* (not shown) for transferring water to the reservoir dispenser 120 via reservoir dispenser inlet 123. Ultimately, the resulting solution or mixture in the reservoir dispenser can be transferred to nozzle assembly 101 for cleaning purposes via reservoir dispenser outlet 125 and water tube 107*a*, 107*b*, or 107*c* (not shown).

FIG. 18 illustrates a cut-away view of an embodiment of a bidet washing apparatus 100 with, a reservoir dispenser 120 and a removable lid 121. In this figure, the apparatus includes water inlet 103*a* or 103*b* connected to control unit 108 with control switch 102*a*. In the on position, water can be independently transferred from control unit 108 to the reservoir dispenser 120 via first water outlets 122*a* and 122*b* (now shown) and reservoir dispenser inlets 123*a* and 123*b*, respectively. Here, the reservoir dispenser 120 includes two separate compartments 120*a* and 120*b* (see, FIG. 19), in which each compartment can independently contain soap and/or disinfectant. The resulting solution and mixture in each of these compartments can be transferred to nozzle assembly 101 for cleaning purposes via the reservoir dispenser switch 124, reservoir dispenser outlets 125*a* and 125*b*, and water tubes 107*c* and 107*d* (not shown), respectively.

FIG. 19 illustrates a cut-away view of an embodiment of a bidet washing apparatus 100 with a reservoir dispenser 120 the removable lid removed. In this figure, the apparatus includes water inlet 103*a* or 103*b* connected to control unit 108 with control switch 102*a*, in the on position, water can be independently transferred from control unit 108 to the reservoir dispenser 120 via first water outlets 122*a* and 122*b* (now shown) and reservoir dispenser inlets 123*a* and 123*b*, respectively. Here, the reservoir dispenser 120 includes two separate compartments 121*a* and 121*b*, in which each compartment can independently contain soap and/or disinfectant. The resulting solution or mixture in each of these compartments can be transferred to nozzle assembly 101 for cleaning purposes via the reservoir dispenser switch 124, reservoir dispenser outlets 125*a* and 125*b*, and water tubes 107*e* and 107*d* (not shown), respectively.

FIG. 20 illustrates a cut-away view of an embodiment of a bidet washing apparatus 100 with reservoir dispensers 120*a* and 120*b* with a removable lid 122*a* and 120*b*, respectively. In this figure, the apparatus includes water inlet 103*a* connected to control unit 108 with control switch 102*a*. Control switch 102*a* can act as an on/off switch for the incoming and outgoing water. In the on position, water can be transferred from control switch 102*a* to control switch 102*b* via water outlet 122*a* and water inlet 130. The control switch 102*b* includes water outlet 122*b* for transferring water to the reservoir dispenser 120 via reservoir dispenser inlet 123*a*. The control switch 102*b* further includes water outlet 122*c* liar transferring water to the reservoir dispenser 120*b* via reservoir dispenser inlet 123*b*. Ultimately, the resulting solution or mixture in the reservoir dispensers can be transferred to nozzle assembly 101 for cleaning purposes via reservoir dispenser outlets 125*a* and/or 125*d*. Finally, the control switch 102*b* also includes water outlet 122*d*, which can transfer water to the nozzle assembly directly.

FIG. 21 illustrates a cut-away view of an embodiment of a bidet washing apparatus 100 with a reservoir dispenser 120 with a removable lid 121. In this figure, the apparatus includes water inlet 103*a* connected to control unit 108 with control switch 102*a*. Control switch 102*a* can act as an on/off switch for the incoming and outgoing water. In the on position, water can be transferred from control switch 102*a* to control switch 102*b* via water outlet 122*a* and water inlet 130. The control switch 102*b* includes water outlet 122*b* for transferring water to the reservoir dispenser 120 via reservoir dispenser inlet 123. Ultimately, the resulting solution or mixture in the reservoir dispenser can be transferred to nozzle assembly 101 for cleaning purposes via reservoir dispenser outlets 125*a*, 125*b*, and/or 125*c*.

FIG. 22 illustrates an embodiment of a reservoir dispenser lid with a built-in check valve system 131 and air vent 132 for securing the reservoir dispenser of a bidet washing apparatus.

A check valve (clack valve, non-return valve, reflux valve, retention valve, or a one-way valve) is a valve that normally allows fluid to flow through it in only one direction. Check valves are two-port valves, meaning they have two openings in the body, one for air or fluid to enter and the other for air or fluid to leave. Check valves work automatically and are not controlled by a person or any external control; accordingly, most check valves do not have any valve handle or stem. The bodies (external shells) of most check valves are typically made of plastic or metal but can be made of any suitable material.

A reservoir dispenser lid with a built-in check valve allows the reservoir dispenser system described herein to vent when the bidet washing apparatus is not in use. A check valve allows the flow of air or liquid in one direction but not in the other direction. In this case, the lid allows air into the lid (venting the disinfectant/soap reservoir) when the bidet is not in use. When the bidet is in use, the reservoir will be pressurized with water, but no liquid can flow out of the lid. This allows the water-filled in the disinfectant/soap reservoir to be flushed out at the end of each use. It is necessary to flush the water in the reservoir because the chemical ingredients of the disinfectant/soap can grow mold and/or dissolve if water is present in the reservoir for a prolonged period.

An important concept in check valves is the cracking pressure (unseating head pressure or opening pressure), which is the minimum differential upstream pressure inlet and at which the valve will operate. Typically, the check valve is designed for and can be specified for a specific cracking pressure. Reseal pressure (sealing pressure, seating pressure, seating head pressure, or closing pressure) refers to the pressure differential between the inlet and outlet of the valve during the closing process of the check valve, at which there is no visible leak rate. Backpressure refers to a pressure higher at the outlet of a fitting than that at the inlet or a point upstream.

A ball check valve in the open position allows forward flow and the closed position, allows the device to block reverse flow. A ball check valve is a check valve in which the closing member, the movable part to block the flow, is a ball. In some ball check valves, the ball can be spring-loaded to help keep it shut. For those designs without a spring, reverse flow is required to move the ball toward the seat and create a seal. The interior surface of the main seats of ball check valves is more or less conically tapered to guide the ball into the seat and form a positive seal when stopping reverse flow.

By contrast, a diaphragm check valve uses a flexing rubber diaphragm positioned to create a normally closed valve. Pressure on the upstream side must be greater than the pressure on the downstream side by a certain amount known as the pressure differential, for the check valve to open allowing flow. Once positive pressure stops, the diaphragm automatically flexes back to its original closed position.

FIG. 23 illustrates an embodiment of reservoir dispenser lid with a built-in check valve system 131 and air vent 132 for securing to the reservoir dispenser 120, the control unit 108, control switches 102*a* and 102*b* of a bidet washing apparatus 100. The soap container (not shown) in the reservoir dispenser can be secured within the control panel using screws. As shown, the lid with the built-in check valve system 131 can be exposed for easy removal.

FIG. 24 illustrates an embodiment of a reservoir dispenser lid 121 with a built-in check valve system 131 and air vent 132 secured to the reservoir dispenser 120 by being screwed onto or attached to the dispenser, i.e., the lid and dispenser can be threaded together, and the lid and dispenser can be snapped together.

FIG. 25A illustrates an embodiment of the exterior view of the reservoir dispenser lid 121 with a built-in check valve system 131 and air vent 132; and FIG. 25B illustrates an embodiment of a cut-away view of the reservoir dispenser lid 121 and air vent 132. As shown, the inside top of the reservoir dispenser lid 121 can include a check valve 133 and a moveable rubber disk 134, which can be secured to the reservoir dispenser lid 121 via a complementary lip 135.

FIG. 26 illustrates an embodiment of the reservoir dispenser lid 121 with a built-in check valve 133 having moveable rubber disk 134. As shown in this figure, air can flow through the valve via air vent openings 136.

FIG. 27 illustrates an embodiment of a cut-away cross-sectional view of a reservoir dispenser lid with a built-in check valve system 131 and air vent 132. As shown, air can flow into the lid and the reservoir dispenser 120 through air vent 132 and air vent openings 136. That is the movable rubber disk 134 of the check valve 133 is in the open position, which allows air to enter the reservoir dispenser through the air vent of the lid.

FIG. 28 illustrates an embodiment of a cut-away cross-sectional view of a reservoir dispenser lid with a built-in check valve system 131 and air vent 132. As shown, air cannot flow into the lid and, into the reservoir dispenser 120 through air vent 132 because it is blocked by the movable rubber disk 134. That is, the movable rubber disk 134 of the check valve 133 is in the closed position due to the high internal pressure of the water pushing up against the rubber disk, which prevents air from entering the reservoir dispenser through the air vent of, the lid and prevents, any liquid from escaping.

In other embodiments, the disclosure provides a reservoir dispenser for a bidet washing apparatus having a plurality of chambers, wherein a first chamber holds a liquid wash solution, and a second chamber holds water for flow through the apparatus. In these embodiments, the liquid wash solution from the first chamber can be added to the water present in the second chamber and mixed therein, in a controlled, measured manner without backflow of water into the first chamber.

It is understood by those of skill in the art that the phrase "liquid wash solution" or "wash solution" is meant in a non-limiting sense and can include any combination of soap or detergent in a solution of water along with other additives. Additives in this type of solution can include but are not limited to disinfectants, antibacterial, anti-inflammatory, moisturizing, antiseptic, anti-fungal, germicidal, soothing, detoxifying, cooling, antipruritic, hydrating, antiviral, cleansing, cleaning, and deodorizing additives, or a combination thereof.

FIG. 29 illustrates the principle of the Venturi effect. The Venturi effect is the reduction in fluid pressure that results when a fluid flows through a constricted section of a pipe, i.e., the choke. As shown in this figure, the pipe 200 includes a first section 201 (contraction section), the choke 202 (throat section), wherein the speed of the flow of the fluid at the choke is faster than the speed of the flow of the fluid at the first section, and a second section 204 (diffusion section). When the cross-sectional area at the choke 202 is smaller than at the first section 201 of the pipe 200, the resulting reduced fluid pressure in the choke entrains or pulls the fluid from a secondary tubing, i.e., a suction tube 203 into the choke 202 and out through the second section 204 of the pipe. As used herein, a suction tube is a short pipe with a constricted inner surface used to pull or entrain a liquid wash solution in a chamber into the choke and out through the water inlet due to reduced pressure in the choke.

For the Venturi effect, the most important parameter is the ratio k, the constriction diameter (d) over the general diameter (D) of the pipe as shown in equation 1:

$$k=d/D \tag{1}$$

For the Venturi effect to function properly, it has been found that k can be in the range from about 0.15 to about 0.70. In general, the reduction in pressure in the choke increases as k becomes smaller. Other parameters for optimization of the Venturi effect include the length and the constriction angle (α) and diffusion angle (β) of the choke, which can be modified to adjust how much reduced pressure is achieved. In particular, the diffusion angle can affect the degree of vacuum in the suction tube: as the diffusion angle decreases, the vacuum degree increases.

In the instant case, the reduced pressure in the choke can be used to pull in a liquid wash solution present in a first chamber and/or a second chamber into the water flow in a bidet washing apparatus.

FIG. 30 illustrates an embodiment of a front view of a reservoir dispenser 120 with a water inlet 123 and water outlet 125, with a choke 202 and a suction tube 203 therein. As shown, the reservoir dispenser 120 includes a first chamber 151, a second chamber 152, and a lid 121, which can be attached to a first chamber 151. In embodiments, the lid 121 can be permanently or reversibly attachable to the first chamber 151. Included within the lid 121 is an opening 150, in which a means for activation such as an activator 153 can fill and protrude therethrough. In some embodiments, the opening 150 can be centrally located within the lid 121. In other embodiments, the activator 153 can include a combination of the lid 121 and the first chamber 151 (see, FIGS. 33-34).

As used herein, an "activator" includes but is not limited to a push-button, twist-button, pull up and push down button, a slide button, a plunger button, a lever, a knob, or other similar devices.

In embodiments, the activator 153 can be engaged by manually pushing it downwards to allow for the introduction of the liquid wash solution present in the first chamber 151 to pass into the suction tube 203.

Also shown in this figure is a securing mechanism or tab 126 for attaching the reservoir dispenser 120 to a bidet washing apparatus (not shown); and a water inlet 123 and water outlet 125 for the second chamber 152, which allows water to flow into and out of the second chamber, respectively.

FIG. 31 illustrates an embodiment of a side cut-away view of a reservoir dispenser 120, which uses a suction tube 203 to pull in a liquid wash solution present in a first chamber 151 to water flowing between the water inlet 123 and the water outlet 125 without the use of an activator. As shown, the flow of water follows a linear path through the choke 202, and the suction tube 203 can be vertically inclined relative to the choke. In other embodiments, the flow of water follows a circular path through the choke 202 and the suction tube 203 can be horizontally inclined relative to the choke.

As shown in this figure, the suction tube 203 can be fluidically joined with the choke 202 located between the water inlet 123 and water outlet 125 water. When water from the water inlet 123 flows through the choke 202, the resulting reduced pressure in the choke 202 entrains the liquid wash solution present in the first chamber 151 or second chamber 152, resulting in a flow of the wash solution out through the suction tube 203, into the choke 202 and out through the water outlet 125. In this embodiment, the water inlet 123, choke 202, and water outlet 125 are presented in a linear arrangement, however, other embodiments include a non-linear arrangement including a V-shape or circular shape arrangement for these components.

The first chamber 151 can be reversibly connected to the lid 121 through a screw-on, threaded type mechanism **168*a*, or can be snapped on, or can be secured permanently or reversibly or by any other means known in the art. In addition, a gasket 185** can be used between the first chamber 151 and the lid 121, which prevents leakage of the liquid wash solution present in the first chamber 151.

FIG. 32 illustrates an embodiment of an exploded view of a reservoir dispenser 120, which uses a suction tube 203 to pull in a liquid wash solution present in a first chamber 151 to water flowing between the water inlet 123 and the water outlet 125 with O-rings 215*b* and 215*c*. As shown in this figure, the reservoir dispenser 120 includes a lid 121, a first chamber 151, a second chamber 152, and a spring loaded-in-line check valve 210 located between the first and second chambers. The check valve 210 includes a check valve body 211, an inverted T-bar disc 212 having a proximal end 213*a* and a distal end 213*b*, a spring 214, and an O-ring 215*a*. Also shown is a piston 220, a cylinder 221, the floor 222 of the first chamber 151, the floor 223 of the second chamber 152, several second chamber posts 224, and a first chamber opening 225. As shown, a piston spring 226 is present between the first chamber 151 and second chamber 152 and encircles the piston 220 and can encircle or sit upon the cylinder 221. The check valve 210 separates the first chamber 151 from the second chamber 152 and keeps the liquid wash solution present in the first chamber. Not shown in this figure is the suction tube 203 and choke, which are located between the water inlet 123 and water outlet 125.

A check valve allows the flow of liquid in one direction. Typically, a check valve has two openings: a check valve input side, and a check valve output side. Since a check valve only allows fluid to flow in one direction, they are commonly referred to as 'one-way valves or 'nonreturn valves.' The main purpose of a check valve is to prevent backflow into the system.

A check valve device relies on a pressure differential to work. They require a higher pressure (cracking pressure) on the input side than the output side to open the valve. When the pressure is higher on the outlet side, the valve will close. Depending on the valve type, the closing mechanism can be different. In short, the back pressure can push a gate, ball, diaphragm, or disc against an orifice and seal it. Depending on the design, the closing process can be assisted by a spring or gravity. Common types of check valves include but are not limited to spring-loaded check valves, diaphragm check valves, umbrella check valves, duckbill check valves, and others.

FIG. 33 illustrates an embodiment of a side cut-away view of the reservoir dispenser 120 as per FIG. 32 when in an inactivated position. As shown, the reservoir dispenser 120 includes the first chamber 151, the second chamber 152 and the lid 121. Also shown is the water inlet 123, choke 202, the choke 202, and the water outlet 125. The check valve 210, located between the first chamber 151 and the second chamber 152, includes the check valve body 211, T-bar disc 212 having a proximal end 213*a* and a distal end 213*b*, a spring 214, an O-ring 215*a*, and a piston 220 located underneath the floor 222 of the first chamber 151, and a cylinder 221 located on the floor 223 of the second chamber in which the piston 220 can ride up and down upon to raise and lower the first chamber 151. Also shown are several second chamber posts 224 located on the floor 223 of the second chamber 152 and directly beneath the check valve 210 and T-bar disc 212 and proximal end 213*a*; and a first chamber opening 225 located directly above the check valve 210 and T-bar disc 212 and distal end 213*b*. As shown in this figure, when in the resting or inactivated position, the check valve 210 keeps the liquid wash solution present in the first chamber 151 from flowing out. Thus, water flows from the water inlet 123 through the choke 202 and out through the water outlet 125 without the addition of any liquid wash solution present in the first chamber 151.

FIG. 34 illustrates an embodiment of a side cut-away view of the reservoir dispenser 120 as per FIG. 32 when in an activated position. As shown, the activator 153 is comprised of the lid 121 and first chamber 151. That is, when the activator 153 is activated, for example, through a downward motion of the lid 121 and the first chamber 151, the first chamber 151 rides down on the piston 220, piston spring 226, and onto the cylinder 221 and into the second chamber 152. In addition, the check valve 210 also moves downwards to the floor 223 of the second chamber 152. The T-bar disc 212 is stopped from complete downward movement by the second chamber posts 224. This compresses the spring 214 and causes the distal end 213*b* of the T-bar disc 212 to protrude through the opening 225 in the first chamber 151. Once opened, the liquid wash solution in the first chamber 151 is free to flow into the check valve 210 down to the suction tube 203. Thus, water flows from the water inlet 123 through the choke 202 and out through the water outlet 125 with the addition of liquid wash solution present in the first chamber 151, which is entrained into the choke 202 through the suction tube 203.

FIG. 35 illustrates another embodiment of a side cut-away view of a reservoir dispenser 120, which uses a pump 250 and a check valve 210 to deliver a liquid wash solution. As shown in this figure, reservoir dispenser 120 includes a lid 121, a first chamber 151 and a pump chamber 251. An activator 153 is present within an opening 150 of the lid 121 and extends into the first chamber 151 through a hollow closed ended upper tube 252, the pump chamber 251, and a hollow open ended lower tube 253 to reach the stored liquid wash solution.

The first chamber 151 can be reversibly connected to the lid 121 through a screw-on, threaded type mechanism 168*a*, or can be snapped on, or can be secured permanently or reversibly or by any other means known in the art. In addition, a gasket 254 can be used between the first chamber 151 and the lid 121, which prevents leakage of the liquid wash solution present in the first chamber 151.

As shown in this figure, the hollow closed ended upper tube 252 connects to the pump chamber 251, which then can connect into the hollow open ended lower tube 253. Within the pump chamber 251 is a spring 255 and a ball 256, which are located between the hollow closed ended upper tube 252 and the hollow open ended lower tube 253, respectively. The spring 255 and ball 256 can act to open and close the hollow open ended lower tube 253. Also shown is a pump outlet tube 257, which connects the pump chamber 251 with the spring loaded-in-line check valve 210.

FIG. 36 illustrates an embodiment of a side cut-away view of the pump chamber 251 when in an inactivated position. As shown in this figure, the hollow closed ended upper tube 252 includes a longitudinal groove 260 having a proximal end 261 and a distal end 262, in which a piston 263 can ride within. The hollow closed ended upper tube 252 also includes one or more openings 264 in the proximal end 261. When in the inactivated position, the piston 263 is present in the distal end 262 of the hollow closed ended upper tube 252 and covers the one or more openings 264 and therefore, prevents the liquid wash solution present in the first chamber 151 and/or the pump chamber 251 from entering the hollow closed ended upper tube 252 and out through the pump outlet tube 257 to the check valve 210.

FIG. 37 illustrates an embodiment of a side cut-away view of the pump chamber 251 when in an activated position. When the activator 153 is pressed, the hollow closed ended upper tube 252 compresses the spring 255 and ball 256 against and closes off the hollow open ended lower tube 253. The piston 263 is now present in the proximal end 261 of the hollow closed ended upper tube 252, which uncovers the one or more openings 264. With the increased pressure in the pump chamber 251, the wash solution present in the pump chamber 251 can now exit the chamber through the uncovered one or more openings 264 and flow through the pump outlet tube 257 to the check valve 210. As before, the increased pressure on the check valve 210 causes the valve to open. Moreover, the Venturi effect of the flowing water from the water inlet 123 through the choke 202, pulls the check valve 210 open due to the reduced pressure present in the choke region.

FIG. 38 illustrates an embodiment of a side cut-away view of the check valve 210, located between the first chamber 151 and the second chamber 152. The check valve 210 and pump outlet tube 257 are held in place by a pump outlet tube/check valve holder 259 via a threaded mechanism 168*b* or by any other suitable mechanism known in the art. The check valve 210 includes the check valve body 211, O-ring 265*d*, T-bar disc 212 having a proximal end 213*a* and a distal end 213*b*, a spring 214, and a ridge or an edge 216 that supports the check valve body 211, O-rings 265*b* and 265*c*, and a gasket 258. As shown in this figure, when in the resting or inactivated position, the check valve 210 keeps the liquid wash solution in the pump outlet tube 257. Thus, water flows from the water inlet 123 through the choke 202 and out through the water outlet 125 without the addition of any liquid wash solution present in the first chamber 151 through the suction tube 203. In addition, the piston 263 in the pump chamber 251 covers the one or more openings 264 in the hollow closed ended upper tube 252, which keeps a build-up of liquid wash solution from entering the pump outlet tube 257 as described above.

FIG. 39 illustrates an embodiment of a side cut-away view of the check valve 210 as per FIG. 38 when in an activated position. As shown, when the activator 153 is activated, for example, through a downward motion, wherein the liquid wash solution present in the pump outlet tube 257 now presses against the T-bar disc 212, compresses the spring 214 and causes the distal end 213*b* of the T-bar disc 212 to protrude through the opening 228 of the second chamber 152. Once opened, the liquid wash solution in the pump outlet tube 257 is free to flow through the check valve down to the suction tube 203, which is entrained to enter the flow of water due to the reduced pressure. Thus, water flows from the water inlet 123 through the choke 202 and out through the water outlet 125 with the addition of liquid wash solution present in the pump outlet tube 257 through the suction tube 203.

FIG. 40 illustrates an embodiment of a cut-away view of the lower half of a chamber of a reservoir dispenser 120, which uses a suction tube 203 to pull in a liquid wash solution present in a chamber to water flowing between the water inlet 123 and the water outlet 125 due to the Venturi effect. As shown in this figure, the flow of water follows a circular path. That is, water flows around the circumference of the chamber through the choke 202, wherein the suction tube 203 is horizontally or radially inclined relative to the choke. When water from the water inlet 123 flows through the choke 202, the resulting reduced pressure in this region entrains the liquid wash solution present in a chamber, resulting in a flow of the liquid wash solution out through the suction tube 203, into the choke 202 and out through the water outlet 125. As shown, the inlet diameter d1 and exit diameter d3 are both larger than the choke diameter d2, which provides the reduced pressure in the choke to entrain the liquid wash solution.

FIG. 41 illustrates an embodiment of a cross-sectional view of a reservoir dispenser 120, which uses a suction tube 203 to pull in a liquid wash solution present in a first chamber 151 to the water flowing in the choke 202 between the water inlet 123 and the water outlet 125 as per FIG. 40 using a check valve 301.

The reservoir dispenser 120 includes a first chamber 151, second chamber 152 and the lid 121, which can be attached to a first chamber 151. In embodiments, the lid can be permanently or reversibly attachable to the first chamber. Included within the lid 121 is an opening 150, in which a means for activation such as an activator 153 can fill and protrude therethrough. In some embodiments, the opening 150 can be centrally located within the lid 121.

The activator 153 can include an activator stem 154 and an activator stem end 155. The lid 121 can include an activator guide 157 having an activator stopper 158 thereon. The activator 153, for example a push button, can fill the activator guide 157, and the activator stem 154 and activator stem end 155 can run the length of the first chamber 151 to the first chamber floor 308. Also shown is a spring 156, which is located between the activator stopper 158 and the activator 153 and surrounds the activator stem 154.

The first chamber 151 can be reversibly connected to the lid 121 through a screw-on, threaded type mechanism 168*a*, or can be snapped on, or can be secured permanently or reversibly or by any other means known in the art. In addition, a gasket 185 can be used between the first chamber 151 and the lid 121, which prevents leakage of the liquid wash solution present in the first chamber 151.

The check valve 301 can be located between the first chamber 151 and the second chamber 152, and includes the check valve body 302, a disc 303 having a proximal end 303*a* and a distal end 303*b*, a spring 304, an O-ring 305*a*, and a piston 306 located on the distal end 303*b* of the disc 303. Also shown is a cylinder 307 on the floor of the second chamber 309 directly beneath the check valve 301 and disc 303, in which the piston 306 can ride up and down into.

As shown in this figure, when in the resting or inactivated position, the check valve 303 keeps the liquid wash solution in the first chamber 151. Thus, water flows from the water inlet 123 through the choke 202 (not shown) and out through the water outlet 125 without the addition of any liquid wash solution present in the first chamber 151 through the suction tube 203.

FIG. 42 illustrates an embodiment of an exploded view of a reservoir dispenser 120, which uses a suction tube 203 to pull in a liquid wash solution present in a first chamber 151 to the water flowing in the choke 202 between the water inlet 123 and the water outlet 125. As shown, the reservoir dispenser 120 includes the lid 121 with an opening 150, a first chamber 151, a second chamber 152, an activator 153, an activator stem 154, an activator stem end 155, an activator guide 157, a spring 156, an activator stopper 158, junctions 168*a* and 168*b*, a water inlet 123 and water outlet 125, a choke 202, and a suction tube 203. In addition, the reservoir dispenser 120 includes a check valve 301, including a check valve body 302, a disc 303 having a proximal end 303*a* and a distal end 303*b*, a spring 304, an O-ring 305*a*, a piston 306, a cylinder 307, a floor of the first chamber 308, a floor of the second chamber 309, and a first chamber opening 310.

FIG. 43 illustrates an embodiment of a side cut-away view of the reservoir dispenser 120 when in an inactivated position. As shown, the check valve 301 is in the closed or inactivated position, with the check valve disc 303 being flush with the check valve body 302 and the floor of the first chamber 308. While the activator end 155 of the activator stem 154 of the activator 153 is up against the check valve disc 303, there is insufficient pressure on the stem and disc to open the check valve 301. As shown, the spring 304 encircles the cylinder 307 and is expanded between the floor of the second chamber 309 and the distal end of the disc 303*b*, keeping the check valve disc 303 closed. In addition, the O-ring 305*a* ensures a tight seal between the first chamber 151, the check valve 301 and the second chamber 152.

FIG. 44 illustrates an embodiment of a side cut-away view of the check valve 301 in the reservoir dispenser 120 when in a closed or an inactivated position. As shown, the check valve 301 is in the closed or inactivated position, with the check valve disc 303 being flush with the check valve body 302 and the floor of the first chamber 308.

FIG. 45 illustrates an embodiment of a side cut-away view of the reservoir dispenser 120 when in an activated position. That is, when the activator 153 is activated, for example, through a downward motion, the activator stem 154 and activator end 155 presses against the check valve 301, including the check valve disc 303, which compresses the spring 304 and opens the disc to the first chamber 151. In addition, the piston 306 on the distal end of the disc 303*b* can enter the cylinder 307 on the floor of the second chamber 309. Consequently, the liquid wash solution present in the second chamber 152 enters the check valve 301, passes the disc 303, spring 304, and enter the suction tube 203 and mixes with water passing through the choke 202. In addition, the liquid wash solution is entrained into the choke due to the Venturi effect.

FIG. 46 illustrates an embodiment of a side cut-away view of the check valve 301 in the reservoir dispenser 120 when in an open or activated position. That is, when the activator 153 is activated, the check valve 301, including the check valve disc 303, compresses the spring 304 and opens the disc to the second chamber 152.

While the inventive natures have been particularly shown and described concerning preferred embodiments thereof, it will be understood by those in the art that the foregoing and other changes can be made therein without departing from the spirit and the scope of the disclosure. Likewise, the various diagrams may depict an example architectural or other configuration for the disclosure, which is done to aid in understanding the features and functionality that can be included in the disclosure. The disclosure is not restricted to the illustrated example architectures or configurations but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus, the breadth and scope of the disclosure should not be limited by any of the above-described exemplary embodiments.

What is claimed is:

1. A reservoir dispenser for a bidet washing apparatus, comprising:

a housing unit having at least one chamber, wherein the at least one chamber is capable of holding a liquid wash solution;

a water inlet, a connecting tube, and a water outlet, wherein the water inlet, connecting tube and water outlet are in fluid communication, wherein the connecting tube is located between the water inlet and the water outlet, wherein the connecting tube includes a choke, and wherein the water inlet, connecting tube, and the water outlet are connectable to the housing unit; and a suction tube located between and in fluid communication with the at least one chamber and the choke.

2. The reservoir dispenser of claim 1, wherein the connecting tube is a linear connecting tube located between the water inlet and the water outlet.

3. The reservoir dispenser of claim 1, wherein the connecting tube is a non-linear connecting tube located between the water inlet and the water outlet.

4. The reservoir dispenser of claim 3, wherein the connecting tube is a circular connecting tube located between the water inlet and the water outlet.

5. The reservoir dispenser of claim 1, wherein the suction tube is vertically inclined or horizontally inclined relative to the choke.

6. The reservoir dispenser of claim 1, wherein a ratio of a constriction diameter of the choke to a general diameter of the connecting tube is from about 0.15 to about 0.70.

7. The reservoir dispenser of claim 1, wherein a length, and/or a constriction angle ($\alpha$), and/or a diffusion angle ($\beta$) of the choke can be modified to adjust how much reduced pressure is achieved in the choke.

8. The reservoir dispenser of claim 1, wherein when water flows through the choke, a resulting reduced pressure in the choke causes a liquid wash solution present in the at least one chamber to be pulled into the choke through the suction tube.

9. A reservoir dispenser for a bidet washing apparatus, comprising:

a housing unit having a first chamber and a second chamber, wherein the first chamber is capable of holding a liquid wash solution separate from the second chamber;

a lid attachable to the first chamber;

an activator, wherein the activator includes the lid and the first chamber;

a water inlet, a connecting tube, and a water outlet, wherein the water inlet, connecting tube and water outlet are in fluid communication, wherein the connecting tube is located between the water inlet and the water outlet, wherein the connecting tube includes a choke, and wherein the water inlet, connecting tube, and the water outlet are connectable to the housing unit; and a check valve located between the first chamber and the choke; and a suction tube located between the check valve and the choke.

10. The reservoir dispenser of claim 9, wherein the suction tube is vertically inclined relative to the choke.

11. The reservoir dispenser of claim 9, wherein the second chamber includes a piston, a spring, and a cylinder.

12. The reservoir dispenser of claim 11, wherein engaging or disengaging the activator causes the piston to go into or out of the cylinder and compresses or decompresses the spring, respectively.

13. The reservoir dispenser of claim 9, wherein the check valve is a spring-loaded check valve, a ball and seat check valve, a diaphragm check valve, an umbrella check valve, or a duckbill check valve.

14. The reservoir dispenser of claim 9, wherein the check valve includes:

a check valve body;

a T-bar shaped check valve disc, wherein the disc includes a proximal pole end and a distal bar end; and a check valve spring.

15. The reservoir dispenser of claim 14, further comprising at least one post located below the distal bar end of the T-bar shaped check valve disc.

16. The reservoir dispenser of claim 15, wherein the proximal pole end of the disc closes off the first chamber from the check valve when the activator is disengaged, and wherein the distal bar end of the disc engages with the at least one post and the proximal pole end of the disc opens the first chamber to check valve and suction tube when the activator is engaged.

17. The reservoir dispenser of claim 9, wherein engaging the activator allows transfer of the liquid wash solution from the first chamber through the check valve to the suction tube and choke.

18. The reservoir dispenser of claim 9, wherein disengaging the activator blocks transfer of the liquid wash solution from the first chamber to the check valve, suction tube and choke.

19. The reservoir dispenser of claim 9, wherein a ratio of a constriction diameter of the choke to a general diameter of the connecting tube is from about 0.15 to about 0.70.

20. The reservoir dispenser of claim 9, wherein a length, and/or a constriction angle ($\alpha$), and/or a diffusion angle ($\beta$) of the choke can be modified to adjust how much reduced pressure is achieved in the choke.

21. A reservoir dispenser for a bidet washing apparatus, comprising:

at least one chamber capable of holding a liquid wash solution;

a lid attachable to the at least one chamber;

an activator, wherein the activator includes a hollow closed ended upper tube, a hollow open ended lower tube that extends into the at least one chamber, and an outlet tube;

a pump chamber, wherein the pump chamber connects the hollow closed ended upper tube and the hollow open ended lower tube;

a housing unit, wherein the outlet tube is connectable to the housing unit;

a water inlet, a connecting tube, and a water outlet, wherein the water inlet, connecting tube and water outlet are in fluid communication, wherein the connecting tube is located between the water inlet and the water outlet, wherein the connecting tube includes a choke, and wherein the water inlet, connecting tube, and the water outlet are connectable to the housing unit; and a check valve located in the housing unit between the outlet tube and the choke; and a suction tube located between the check valve and the choke.

22. The reservoir dispenser of claim 21, wherein the pump chamber includes a spring and a ball located between the hollow closed ended upper tube and the hollow open ended lower tube, respectively.

23. The reservoir dispenser of claim 21, wherein the check valve includes:

a check valve body;

a check valve disc; and a check valve spring.

24. The reservoir dispenser of claim 21, wherein engaging the activator transfers the liquid wash solution from the pump chamber to the outlet tube, housing unit, check valve, suction tube and choke.

25. The reservoir dispenser of claim 23, wherein disengaging the activator blocks transfer of the liquid wash solution from the pump chamber to the outlet tube, housing unit, check valve, suction tube and choke.

26. The reservoir dispenser of claim 21, wherein a ratio of a constriction diameter of the choke to a general diameter of the connecting tube is from about 0.15 to about 0.70.

27. The reservoir dispenser of claim 21, wherein a length, and/or a constriction angle ($\alpha$), and/or a diffusion angle ($\beta$) of the choke can be modified to adjust how much reduced pressure is achieved in the choke.

28. A reservoir dispenser for a bidet washing apparatus, comprising:

a housing unit having at least one chamber, wherein the at least one chamber is capable of holding a liquid wash solution;

a water inlet, a connecting tube, and a water outlet, wherein the water inlet, connecting tube and water outlet are in fluid communication, wherein the connecting tube is located between the water inlet and the water outlet, wherein the connecting tube includes a choke, and wherein the water inlet, connecting tube, and the water outlet are connectable to the housing unit; and a lid attachable to the at least one chamber;

an activator having a stem and a stem end;

an activator guide surrounding the activator stem;

a check valve located between the at least one chamber and the choke; and a suction tube located between the check valve and the choke.

29. The reservoir dispenser of claim 28, wherein the suction tube is horizontally inclined relative to the choke.

30. The reservoir dispenser of claim 28, wherein the connecting tube is a non-linear or circular connecting tube located between the water inlet and the water outlet.

31. The reservoir dispenser of claim 28, wherein the lid includes an opening therein, and the activator is within the opening of the lid.

32. The reservoir dispenser of claim 28, wherein the activator is a push-button, a twist-button, a pull up and push down button, a slide button, a plunger button, a lever, or a knob.

33. The reservoir dispenser of claim 28, wherein the check valve is a spring-loaded check valve, a ball and seat check valve, a diaphragm check valve, an umbrella check valve, or a duckbill check valve.

34. The reservoir dispenser of claim 28, wherein the activator guide includes an activator stopper and a spring, wherein the activator compresses and decompresses the spring against the activator stopper when engaging and disengaging the activator, respectively.

35. The reservoir dispenser of claim 28, wherein the check valve includes:

a check valve body a check valve disc having a proximal end and a distal end shaped piston; and a check valve spring.

36. The reservoir dispenser of claim 35, further comprising a cylinder, wherein the cylinder is located under the distal end shaped piston of the check valve disc, and wherein the piston slides into and out of the cylinder upon engaging and disengaging the activator, respectively.

37. The reservoir dispenser of claim 28, wherein engaging the activator allows transfer of the liquid wash solution from the at least one chamber through the check valve to the suction tube and choke.

38. The reservoir dispenser of claim 28, wherein disengaging the activator blocks transfer of the liquid wash solution from the at least one chamber to the check valve, suction tube and choke.

39. The reservoir dispenser of claim 28, wherein a ratio of a constriction diameter of the choke to a general diameter of the connecting tube is from about 0.15 to about 0.70.

40. The reservoir dispenser of claim 28, wherein a length, and/or a constriction angle ($\alpha$), and/or a diffusion angle ($\beta$) of the choke can be modified to adjust how much reduced pressure is achieved in the choke.

* * * * *